US012801809B2

(12) United States Patent
Kawakatsu et al.

(10) Patent No.: US 12,801,809 B2
(45) Date of Patent: Nov. 17, 2026

(54) BURIED PIPING REPLACEMENT PERIOD PREDICTION APPARATUS, BURIED PIPING REPLACEMENT PERIOD PREDICTION METHOD, AND NON-TRANSITORY COMPUTER-READABLE RECORDING MEDIUM

(71) Applicant: KUBOTA Corporation, Osaka (JP)

(72) Inventors: Tomo Kawakatsu, Amagasaki (JP); Goro Funahashi, Amagasaki (JP); Yuta Okumura, Amagasaki (JP); Satoshi Takizawa, Tokyo (JP)

(73) Assignee: KUBOTA Corporation, Osaka (JP)

( * ) Notice: Subject to any disclaimer, the term of this patent is extended or adjusted under 35 U.S.C. 154(b) by 908 days.

(21) Appl. No.: 18/028,343

(22) PCT Filed: Aug. 27, 2021

(86) PCT No.: PCT/JP2021/031499
§ 371 (c)(1),
(2) Date: Mar. 24, 2023

(87) PCT Pub. No.: WO2022/070706
PCT Pub. Date: Apr. 7, 2022

(65) Prior Publication Data

US 2023/0376647 A1 Nov. 23, 2023

(30) Foreign Application Priority Data

Sep. 29, 2020 (JP) ................................ 2020-162867

(51) Int. Cl.
*G06F 30/20* (2020.01)
*G06F 113/14* (2020.01)

(52) U.S. Cl.
CPC .......... *G06F 30/20* (2020.01); *G06F 2113/14* (2020.01)

(58) Field of Classification Search
CPC ..... G06F 30/20; G06F 2113/14; G06Q 10/04; G06Q 10/20
See application file for complete search history.

(56) References Cited

U.S. PATENT DOCUMENTS

2003/0023404 A1* 1/2003 Moselhi .............. G01N 21/954 702/181
2009/0326865 A1* 12/2009 Ziegel ...................... F17D 5/00 702/179

(Continued)

FOREIGN PATENT DOCUMENTS

CN 1492735 A 4/2004
CN 103460006 A 12/2013

(Continued)

OTHER PUBLICATIONS

Kawakatsu, Satoshi et al., "Examination of Iron-Part Life Prediction Process of Cast Iron Piping and Creation of Highly-accurate Prediction Expression Taking Lag Time of Corrosion into Consideration," 2019 National Conference (Water Works Research Presentation), Nov. 2019, pp. 468-469.

(Continued)

*Primary Examiner* — Brian W Wathen
(74) *Attorney, Agent, or Firm* — Faegre Drinker Biddle & Reath LLP

(57) ABSTRACT

A buried piping replacement period prediction apparatus includes a buried piping attribute data acquisition unit and an exceedance-probability-of-corrosion-depth prediction unit. The buried piping attribute data acquisition unit acquires attribute data of buried piping. The attribute data of the buried piping includes a first environmental factor of the buried piping, a first burial period of time of the buried piping, and a nominal pipe wall thickness or an allowable corrosion depth of the buried piping. The exceedance-probability-of-corrosion-depth prediction unit calculates an (Continued)

exceedance probability of corrosion depth of the buried piping in a certain period from an exceedance-probability-of-corrosion-depth prediction model for the first environmental factor, the first burial period of time, and the nominal pipe wall thickness or the allowable corrosion depth.

9 Claims, 40 Drawing Sheets

(56) References Cited

U.S. PATENT DOCUMENTS

| | | | | |
|---|---|---|---|---|
| 2012/0089346 | A1* | 4/2012 | Huyse | G06Q 10/06 702/34 |
| 2014/0013833 | A1 | 1/2014 | Hosoda | |
| 2017/0030850 | A1* | 2/2017 | Castaneda-Lopez | G01N 27/20 |
| 2019/0271441 | A1* | 9/2019 | Zhang | F17D 5/06 |
| 2019/0303791 | A1* | 10/2019 | Yoshikawa | G01M 3/00 |
| 2021/0388950 | A1* | 12/2021 | Solomon | G06Q 10/20 |
| 2022/0205353 | A1* | 6/2022 | Liu | E21B 47/006 |
| 2023/0034897 | A1* | 2/2023 | Silakorn | G05B 23/0283 |

FOREIGN PATENT DOCUMENTS

| | | | |
|---|---|---|---|
| CN | 109668820 | A | 4/2019 |
| JP | S58-37398 | A | 3/1983 |
| JP | 2004-184344 | A | 7/2004 |
| JP | 2007-107882 | A | 4/2007 |
| JP | 2009-97887 | A | 5/2009 |
| JP | 2016-114564 | A | 6/2016 |
| JP | 2020-51801 | A | 4/2020 |
| WO | WO-02/067688 | A1 | 9/2002 |
| WO | WO-2020/085327 | A1 | 4/2020 |

OTHER PUBLICATIONS

Taiwan IPO Examination Report issued on May 2, 2024 in counterpart patent application No. 110133547 (with attached English-language translation) (6 pages).

* cited by examiner

FIG.3

| PIPELINE NUMBER | FIRST ENVIRONMENTAL FACTOR | | FIRST BURIAL PERIOD OF TIME $T_1$ (YEAR) | ALLOWABLE CORROSION DEPTH (mm) | |
|---|---|---|---|---|---|
| | TYPE OF SOIL | SOIL RESISTIVITY (Ω・cm) | | | |
| ABC-1 | SANDY | 1575 | 32 | 6.0 | 16 |
| PQR-2 | SILTY | 1908 | 19 | 4.0 | 16 |
| ・・・ | ARGILLIFEROUS | 2127 | ・・・ | ・・・ | 16 |
| ・・・ | SANDY | 1108 | ・・・ | ・・・ | 16 |
| ・・・ | ARGILLIFEROUS | 2575 | ・・・ | ・・・ | 16 |
| ・・・ | SILTY | 1308 | ・・・ | ・・・ | 16 |
| ・・・ | SANDY | 1762 | ・・・ | ・・・ | 16 |

FIG.4

| PIPELINE NUMBER | BURIAL PLACE | INSTALLATION YEAR | NOMINAL DIAMETER | TYPE OF JOINT | TYPE OF PIPE WALL THICKNESS | DEPTH OF EARTH COVER (m) | HYDROSTATIC PRESSURE (MPa) | WATER HAMMER PRESSURE (MPa) | |
|---|---|---|---|---|---|---|---|---|---|
| ABC-1 | 1-CHOME KITA WARD, OSAKA CITY | 1987 | 100 | K | 3 | 1.2 | 0.75 | 0.55 | 17 |
| PQR-2 | 1-CHOME NISHI WARD, OSAKA CITY | 2000 | 150 | NS | 1 | 0.6 | 0.75 | 0.55 | 17 |
| | | | | | | | | | |

FIG.5

41

| PLACE | ENVIRONMENTAL FACTOR | |
|---|---|---|
| | TYPE OF SOIL | SOIL RESISTIVITY (Ω・cm) |
| 1-CHOME KITA WARD, OSAKA CITY | SANDY | 1575 |
| 1-CHOME NISHI WARD, OSAKA CITY | SILTY | 1908 |

FIG.6

42

| INSTALLATION YEAR | NOMINAL DIAMETER | TYPE OF JOINT | TYPE OF PIPE WALL THICKNESS | NOMINAL PIPE WALL THICKNESS (mm) |
|---|---|---|---|---|
| 1987 | 100 | K | 3 | ... |
| 2000 | 150 | NS | 1 | ... |

FIG.7

43

| NOMINAL PIPE WALL THICKNESS (mm) | TOLERANCE ON WALL THICKNESS (mm) |
|---|---|
| ... | ... |
| ... | ... |

| PIPELINE NUMBER | SECOND ENVIRONMENTAL FACTOR | | SECOND BURIAL PERIOD OF TIME $T_2$ (YEAR) | REFERENCE CORROSION DEPTH (mm) | |
|---|---|---|---|---|---|
| | TYPE OF SOIL | SOIL RESISTIVITY (Ω · cm) | | | |
| EFG-1 | SANDY | 1670 | 22 | 1.5 | 18 |
| STU-2 | SILTY | 1822 | 10 | 0.0 | 18 |
| ··· | ARGILLIFEROUS | 2170 | ··· | ··· | 18 |
| ··· | SILTY | 1822 | ··· | ··· | 18 |
| ··· | SANDY | 870 | ··· | ··· | 18 |
| ··· | ARGILLIFEROUS | 1322 | ··· | ··· | 18 |
| ··· | SANDY | 1765 | ··· | ··· | 18 |

45

| SECOND ENVIRONMENTAL FACTOR | SECOND BURIAL PERIOD OF TIME $T_2$ (YEAR) | REFERENCE CORROSION DEPTH (mm) | LAG TIME $t_L$ OF CORROSION (YEAR) |
|---|---|---|---|
| SANDY (SOIL RESISTIVITY OF 1500 (Ω・cm) OR MORE) | 10–15 | 0.0–0.5 | 17.5 |
| ... | ... | ... | ... |
| | | | |

FIG.19

SECOND ENVIRONMENTAL FACTOR
SANDY SOIL TYPE (SOIL RESISTIVITY OF 1500 (Ω·cm) OR MORE)

▽ DATA OF EXCEEDANCE PROBABILITY OF CORROSION DEPTH OF MODIFIED BURIAL PERIOD OF TIME OF 10 TO 20 YEARS
● DATA OF EXCEEDANCE PROBABILITY OF CORROSION DEPTH OF MODIFIED BURIAL PERIOD OF TIME OF 20 TO 30 YEARS
□ DATA OF EXCEEDANCE PROBABILITY OF CORROSION DEPTH OF MODIFIED BURIAL PERIOD OF TIME OF 30 TO 40 YEARS
▲ DATA OF EXCEEDANCE PROBABILITY OF CORROSION DEPTH OF MODIFIED BURIAL PERIOD OF TIME OF 40 TO 50 YEARS

EXCEEDANCE-PROBABILITY-OF-CORROSION-DEPTH PREDICTION MODEL OF MODIFIED BURIAL PERIOD OF TIME OF 10 TO 20 YEARS
EXCEEDANCE-PROBABILITY-OF-CORROSION-DEPTH PREDICTION MODEL OF MODIFIED BURIAL PERIOD OF TIME OF 20 TO 30 YEARS
EXCEEDANCE-PROBABILITY-OF-CORROSION-DEPTH PREDICTION MODEL OF MODIFIED BURIAL PERIOD OF TIME OF 30 TO 40 YEARS
EXCEEDANCE-PROBABILITY-OF-CORROSION-DEPTH PREDICTION MODEL OF MODIFIED BURIAL PERIOD OF TIME OF 40 TO 50 YEARS

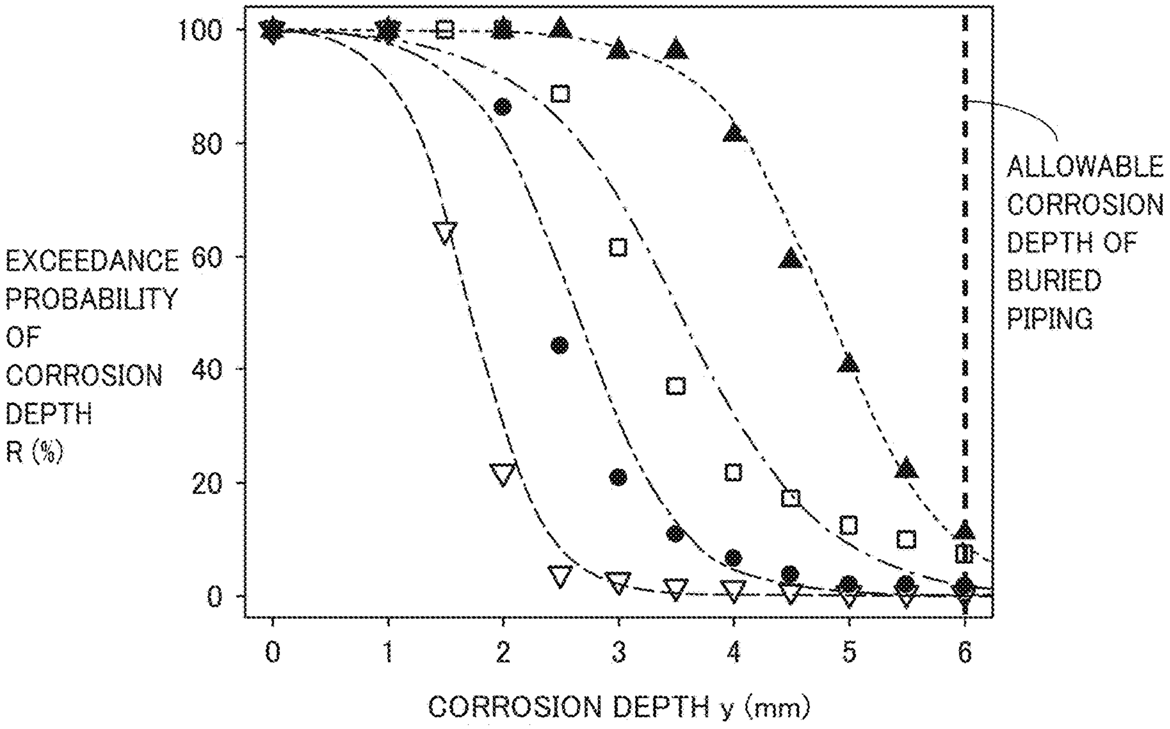

FIG.20

53

| PIPELINE NUMBER | FUTURE PERIOD | EXCEEDANCE PROBABILITY OF CORROSION DEPTH |
|---|---|---|
| ABC-1 | 23.5-33.5 YEARS LATER | 9% |
| ABC-1 | 13.5-23.5 YEARS LATER | 2% |
| PQR-2 | ··· | ··· |
| ··· | ··· | ··· |

FIG.32

| PIPELINE NUMBER | FIRST ENVIRONMENTAL FACTOR | | FIRST BURIAL PERIOD OF TIME $T_1$ (YEAR) | NOMINAL PIPE WALL THICKNESS (mm) | |
|---|---|---|---|---|---|
| | TYPE OF SOIL | SOIL RESISTIVITY (Ω・cm) | | | |
| ABC-1 | SANDY | 1575 | 32 | 7.5 | 16 |
| PQR-2 | SILTY | 1908 | 19 | 6.0 | 16 |
| ・・・ | ARGILLIFEROUS | 2127 | ・・・ | ・・・ | 16 |
| ・・・ | SANDY | 1108 | ・・・ | ・・・ | 16 |
| ・・・ | ARGILLIFEROUS | 2575 | ・・・ | ・・・ | 16 |
| ・・・ | SILTY | 1308 | ・・・ | ・・・ | 16 |
| ・・・ | SANDY | 1762 | ・・・ | ・・・ | 16 |

SECOND ENVIRONMENTAL FACTOR
SANDY SOIL TYPE (SOIL RESISTIVITY OF 1500 (Ω·cm) OR MORE)

FIG.40

| (A) PERCENTILE REGRESSION LINE | (B) COEFFICIENT j | (C) COEFFICIENT k | (D) PROBABILITY DENSITY OF PERCENTILE REGRESSION LINE | (E) REFERENCE CORROSION DEPTH (mm) | (F) MODIFIED BURIAL PERIOD OF TIME (YEAR) | (G) LAG TIME $t_L$ OF CORROSION (YEAR) | (H) SECOND BURIAL PERIOD OF TIME $T_2$ (F) + (G) (YEAR) | (I) PROBABILITY $Q(t_L)$ OF LAG TIME OF CORROSION | (J) PROBABILITY INDEX (D) × (I) |
|---|---|---|---|---|---|---|---|---|---|
| ⋮ | ⋮ | ⋮ | ⋮ | ⋮ | ⋮ | ⋮ | ⋮ | ⋮ | ⋮ |
| 50 | 0.333 | 0.605 | 0.40 | 0 | 0.0 | 0 | 0.0 | 0.045 | 0.018 |
| 50 | 0.333 | 0.605 | 0.40 | 0 | 0.0 | 1 | 1.0 | 0.043 | 0.017 |
| 50 | 0.333 | 0.605 | 0.40 | 0 | 0.0 | 2 | 2.0 | 0.041 | 0.016 |
| ⋮ | ⋮ | ⋮ | ⋮ | ⋮ | ⋮ | ⋮ | ⋮ | ⋮ | ⋮ |
| 50 | 0.333 | 0.605 | 0.40 | 0 | 0.0 | 79 | 79.0 | 0.001 | 0.001 |
| 50 | 0.333 | 0.605 | 0.40 | 0 | 0.0 | 80 | 80.0 | 0.001 | 0.000 |
| ⋮ | ⋮ | ⋮ | ⋮ | ⋮ | ⋮ | ⋮ | ⋮ | ⋮ | ⋮ |
| 50 | 0.333 | 0.605 | 0.40 | 1 | 5.6 | 0 | 5.6 | 0.045 | 0.018 |
| 50 | 0.333 | 0.605 | 0.40 | 1 | 5.6 | 1 | 6.6 | 0.043 | 0.017 |
| 50 | 0.333 | 0.605 | 0.40 | 1 | 5.6 | 2 | 7.6 | 0.041 | 0.016 |
| ⋮ | ⋮ | ⋮ | ⋮ | ⋮ | ⋮ | ⋮ | ⋮ | ⋮ | ⋮ |
| 95 | 0.568 | 0.602 | 0.10 | 0 | 0 | 0 | 0 | 0.045 | 0.005 |
| 95 | 0.568 | 0.602 | 0.10 | 0 | 0 | 1 | 1 | 0.043 | 0.004 |
| ⋮ | ⋮ | ⋮ | ⋮ | ⋮ | ⋮ | ⋮ | ⋮ | ⋮ | ⋮ |

FIG.41

| REFERENCE CORROSION DEPTH (mm) | 0 TO 10 YEARS | 10 TO 20 YEARS | 20 TO 30 YEARS | ... | 80 TO 90 YEARS |
|---|---|---|---|---|---|
| 0 | 0.12 | 0.05 | 0.03 | ... | 0.00 |
| 0.125 | 0.12 | 0.05 | 0.03 | ... | 0.00 |
| 0.25 | 0.12 | 0.05 | 0.03 | ... | 0.00 |
| 0.375 | 0.11 | 0.05 | 0.03 | ... | 0.00 |
| 0.5 | 0.11 | 0.06 | 0.03 | ... | 0.00 |
| 0.625 | 0.09 | 0.06 | 0.04 | ... | 0.00 |
| 0.75 | 0.08 | 0.06 | 0.04 | ... | 0.00 |
| 0.875 | 0.07 | 0.07 | 0.04 | ... | 0.00 |
| 1 | 0.05 | 0.07 | 0.04 | ... | 0.00 |
| 1.125 | 0.04 | 0.07 | 0.05 | ... | 0.00 |
| 1.25 | 0.03 | 0.07 | 0.05 | ... | 0.00 |
| 1.375 | 0.02 | 0.06 | 0.05 | ... | 0.00 |
| 1.5 | 0.01 | 0.06 | 0.05 | ... | 0.01 |
| 1.625 | 0.01 | 0.05 | 0.05 | ... | 0.01 |
| 1.75 | 0.00 | 0.04 | 0.05 | ... | 0.01 |
| 1.875 | 0.00 | 0.03 | 0.05 | ... | 0.01 |
| 2 | 0.00 | 0.03 | 0.05 | ... | 0.01 |
| 2.125 | 0.00 | 0.02 | 0.05 | ... | 0.01 |
| 2.25 | 0.00 | 0.01 | 0.04 | ... | 0.01 |
| ... | ... | ... | ... | ... | ... |
| TOTAL | 1.00 | 1.00 | 1.00 | ... | 1.00 |

17

| PIPELINE ID | INSTALLATION YEAR | NOMINAL DIAMETER | TYPE OF JOINT | TYPE OF PIPE WALL THICKNESS | PIPELINE LENGTH (m) |
|---|---|---|---|---|---|
| 1 | 1987 | 100 | K | 3 | 105 |
| 2 | 2000 | 150 | NS | 1 | 20 |
| | | | | | |

FIG.48

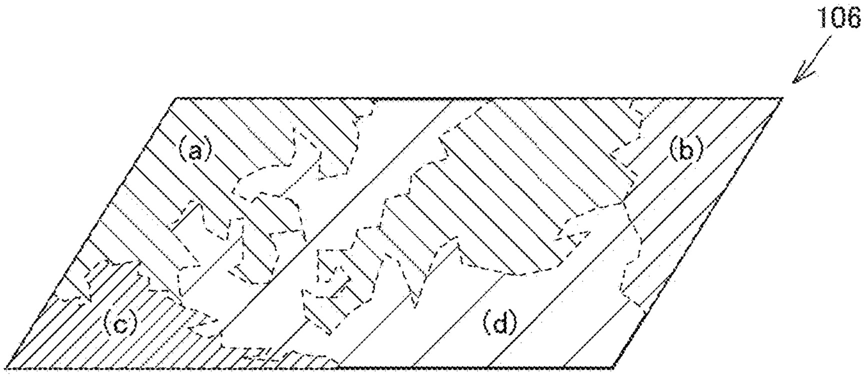

FIG.49

110

| GROUND CLASSIFICATION | SURFACE LAYER | TOPOGRAPHY | ENVIRONMENTAL FACTOR |
|---|---|---|---|
| (a) | LAND EQUIVALENT TO LAYER GROUP | ALL | SOIL RESISTIVITY LESS THAN 1500 Ωcm |
| | CONTAINING CLAY | LOWLAND (1) (SUCH AS WETLAND) | |
| (b) | HUMAN-MADE LAND | ALL | ARGILLACEOUS SOIL RESISTIVITY 1500 Ωcm OR MORE |
| | CONTAINING CLAY | LOWLAND (2) (NATURAL LEVEE) | |
| (c) | ROCKY LAND | ALL | SILTY SOIL RESISTIVITY 1500 Ωcm OR MORE |
| | CONTAINING CLAY | MOUNTAINOUS LAND | |
| (d) | SANDY LAND | ALL | SANDY SOIL RESISTIVITY 1500 Ωcm OR MORE |

FIG.50

| PIPELINE ID | FIRST ENVIRONMENTAL FACTOR | FIRST BURIAL PERIOD OF TIME $T_1$ (YEAR) | NOMINAL PIPE WALL THICKNESS (mm) | |
|---|---|---|---|---|
| 1 | SANDY | 32 | 7.5 | 16 |
| 2 | SILTY | 19 | 6.0 | 16 |
| 3 | ARGILLIFEROUS | ••• | ••• | 16 |
| 4 | SANDY | ••• | ••• | 16 |
| 5 | ARGILLIFEROUS | ••• | ••• | 16 |
| 6 | SILTY | ••• | ••• | 16 |
| 7 | LOW SPECIFIC RESISTANCE | ••• | ••• | 16 |
| | | | | |

FIG.51

| PIPELINE ID | EXCEEDANCE PROBABILITY OF CORROSION DEPTH (%) | NUMBER-OF-WATER-LEAKAGE-ACCIDENTS EVALUATION INDEX (% • km) |
|---|---|---|
| 1 | 3 | 0.315 |
| 2 | 22 | 0.44 |
| 3 | 40 | 1.8 |
| 4 | 12 | 0.78 |
| | | |

FIG.52

| PIPELINE ID | WATER LEAKAGE ACCIDENT INDEX OF CURRENT YEAR | | | WATER LEAKAGE ACCIDENT INDEX n = 30 YEARS LATER (WHEN PIPELINE IS NOT REPLACED) | | | WATER LEAKAGE ACCIDENT INDEX n = 30 YEARS LATER (PIPELINE IS REPLACED IN ORDER FROM PIPELINE OF WHICH BURIAL PERIOD OF TIME IS LONGEST) | | | WATER LEAKAGE ACCIDENT INDEX n = 30 YEARS LATER (PIPELINE IS REPLACED IN ORDER FROM PIPELINE OF WHICH PROBABILITY OF WATER LEAKAGE ACCIDENTS IS HIGHEST) | | |
|---|---|---|---|---|---|---|---|---|---|---|---|---|
| | BURIAL PERIOD OF TIME (YEAR) | PROBABILITY OF WATER LEAKAGE ACCIDENTS (NUMBER/YEAR/km) | NUMBER OF WATER LEAKAGE ACCIDENTS (NUMBER/YEAR) | BURIAL PERIOD OF TIME (YEAR) | PROBABILITY OF WATER LEAKAGE ACCIDENTS (NUMBER/YEAR/km) | NUMBER OF WATER LEAKAGE ACCIDENTS (NUMBER/YEAR) | BURIAL PERIOD OF TIME (YEAR) | PROBABILITY OF WATER LEAKAGE ACCIDENTS (NUMBER/YEAR/km) | NUMBER OF WATER LEAKAGE ACCIDENTS (NUMBER/YEAR) | BURIAL PERIOD OF TIME (YEAR) | PROBABILITY OF WATER LEAKAGE ACCIDENTS (NUMBER/YEAR/km) | NUMBER OF WATER LEAKAGE ACCIDENTS (NUMBER/YEAR) |
| 1 | 25 | ... | 0.000001 | 55 | ... | ... | 55 | ... | ... | 55 | ... | ... |
| 2 | 30 | ... | 0.000002 | 60 | ... | ... | 60 | ... | ... | 60 | ... | ... |
| 3 | 55 | ... | 0.000002 | 85 | ... | ... | 85 | ... | ... | 85 | ... | ... |
| ... | ... | ... | ... | ... | ... | ... | ... | ... | ... | ... | ... | ... |
| TOTAL NUMBER OF WATER LEAKAGE ACCIDENTS (NUMBER/YEAR) | – | – | 4.8 | – | – | 28.3 | – | – | 17.0 | – | – | 5.2 |

BURIED PIPING REPLACEMENT PERIOD PREDICTION APPARATUS, BURIED PIPING REPLACEMENT PERIOD PREDICTION METHOD, AND NON-TRANSITORY COMPUTER-READABLE RECORDING MEDIUM

TECHNICAL FIELD

The present disclosure relates to a buried piping replacement period prediction apparatus, a buried piping replacement period prediction method, a program, and a computer-readable recording medium.

BACKGROUND ART

Piping such as water piping is buried in the ground. The piping is cast iron piping or ductile piping, for example. Piping corrodes while the piping is used for a long period of time. Japanese Patent Laying-Open No. 2007-107882 (PTL 1) discloses a piping corrosion prediction method. Specifically, exploratory excavation of piping is performed in a plurality of places, and examination data of the piping including the corrosion depth of the piping and the burial period of time of the piping in each place is acquired. It is assumed that the corrosion depth of the piping is in accordance with a piping corrosion prediction expression of $y=kT^m$ (y: the corrosion depth of the piping, T: the burial period of time of the piping, k: a constant based on the burial geological features of the piping, m: a constant), and a constant k and a constant m are determined on the basis of examination data of the piping. The corrosion depth of the piping has been predicted on the basis of a piping corrosion prediction expression acquired as above.

CITATION LIST

Patent Literature

PTL 1: Japanese Patent Laying-Open No. 2007-107882

SUMMARY OF INVENTION

Technical Problem

However, the piping corrosion prediction method of PTL 1 has been insufficient to accurately predict the replacement period of the buried piping because there is great variation in the examination data of the corrosion depth of the piping. The present disclosure has been made in view of the problem described above, and an object thereof is to provide a buried piping replacement period prediction apparatus, a buried piping replacement period prediction method, a program, and a computer-readable recording medium capable of predicting the replacement period of buried piping more accurately.

Solution to Problem

A buried piping replacement period prediction apparatus of the present disclosure includes a buried piping attribute data acquisition unit and an exceedance-probability-of-corrosion-depth prediction unit. The buried piping attribute data acquisition unit acquires attribute data of buried piping. The attribute data of the buried piping includes a first environmental factor of the buried piping, a first burial period of time of the buried piping, and a nominal pipe wall thickness or an allowable corrosion depth of the buried piping. The exceedance-probability-of-corrosion-depth prediction unit calculates an exceedance probability of corrosion depth of the buried piping in a certain period from an exceedance-probability-of-corrosion-depth prediction model for the first environmental factor, the first burial period of time, and the nominal pipe wall thickness or the allowable corrosion depth. The exceedance probability of corrosion depth of the buried piping in a certain period is a probability of the corrosion depth of the buried piping exceeding the nominal pipe wall thickness or the allowable corrosion depth of the buried piping in a certain period. Reference data of a plurality of pieces of reference piping includes a second environmental factor, a second burial period of time, and a reference corrosion depth of the plurality of pieces of reference piping. The modified reference data of the plurality of pieces of reference piping includes the modified burial period of time and the reference corrosion depth of the plurality of pieces of reference piping. The modified burial period of time is calculated by subtracting the lag time of corrosion depending on the second burial period of time and the reference corrosion depth from the second burial period of time. The lag time of corrosion is a period of time from when the plurality of pieces of reference piping are buried to when the plurality of pieces of reference piping start corroding. The exceedance-probability-of-corrosion-depth prediction model is a model that predicts the exceedance probability of corrosion depth of the buried piping and is generated on a basis of a basic regression line that regresses the modified reference data having the second environmental factor that is same as the first environmental factor, a variation in corrosion speed of the plurality of pieces of reference piping, and a distribution of the lag time of corrosion. The variation in the corrosion speed is given by a distribution of the basic regression line due to a variation in the reference corrosion depth in the modified reference data. The distribution of the lag time of corrosion is given by a differential of a change in a rate of the number of data of which reference corrosion depth is more than 0 mm out of the reference data having the second environmental factor that is same as the first environmental factor with respect to the second burial period of time.

A buried piping replacement period prediction method of the present disclosure includes a step of acquiring attribute data of buried piping by a buried piping attribute data acquisition unit. The attribute data of the buried piping includes a first environmental factor of the buried piping, a first burial period of time of the buried piping, and a nominal pipe wall thickness or an allowable corrosion depth of the buried piping. The buried piping replacement period prediction method of the present disclosure further includes a step of calculating an exceedance probability of corrosion depth of the buried piping in a certain period from an exceedance-probability-of-corrosion-depth prediction model for the first environmental factor, the first burial period of time, and the nominal pipe wall thickness or the allowable corrosion depth. The exceedance probability of corrosion depth of the buried piping in the certain period is a probability of a corrosion depth of the buried piping exceeding the nominal pipe wall thickness or the allowable corrosion depth of the buried piping in the certain period. Reference data of a plurality of pieces of reference piping includes a second environmental factor, a second burial period of time, and a reference corrosion depth of the plurality of pieces of reference piping. Modified reference data of the plurality of pieces of reference piping includes a modified burial period of time and the reference corrosion depth of the plurality of pieces of reference piping, the modified burial period of time is calculated by subtracting a lag time of corrosion depending on the second burial period of time and the reference corrosion depth from the second burial period of time. The lag time of corrosion is a period of time from when the plurality of pieces of reference piping are buried to when the plurality of pieces of reference piping start corroding. The exceedance-probability-of-corrosion-depth prediction model is a model that predicts the exceedance probability of corrosion depth of the buried piping and is generated on a basis of a basic regression line that regresses the modified reference data having the second environmental factor that is same as the first environmental factor, a variation in corrosion speed of the plurality of pieces of reference piping, and a distribution of the lag time of corrosion. The variation in the corrosion speed is given by a distribution of the basic regression line due to a variation in the reference corrosion depth in the modified reference data. The distribution of the lag time of corrosion is given by a differential of a change in a rate of the number of data of which reference corrosion depth is more than 0 mm out of the reference data having the second environmental factor that is same as the first environmental factor with respect to the second burial period of time.

A program of the present disclosure causes a processor to execute the buried piping replacement period prediction method of the present disclosure.

The program of the present disclosure is recorded on a computer-readable recording medium of the present disclosure.

Advantageous Effect of Invention

According to the buried piping replacement period prediction apparatus, the buried piping replacement period prediction method, the program, and the computer-readable recording medium of the present disclosure, it is possible to predict the replacement period of the buried piping more accurately.

BRIEF DESCRIPTION OF DRAWINGS

FIG. 3 is a diagram showing a data structure of attribute data of buried piping of Embodiment 1.

FIG. 4 is a diagram showing a data structure of first data of the buried piping of Embodiment 1.

FIG. 5 is a diagram showing a data structure of an environmental factor database unit.

FIG. 6 is a diagram showing a data structure of a nominal-pipe-wall-thickness database unit.

FIG. 7 is a diagram showing a data structure of a tolerance-on-wall-thickness database unit.

FIG. 19 is a diagram showing a plurality of exceedance-probability-of-corrosion-depth prediction models of Embodiment 1.

FIG. 20 is a diagram showing a data structure of an exceedance-probability-of-corrosion-depth result.

FIG. 32 is a diagram showing a data structure of attribute data of buried piping of Embodiment 4.

FIG. 40 is a diagram showing a chart including a probability density of a percentile regression line, the probability of lag time of corrosion, and a probability index.

FIG. 41 is a diagram showing a chart indicating a burial period of time and the probability of the reference corrosion depth becoming a certain corrosion depth in the burial period of time.

FIG. 48 is a diagram showing an environmental factor map.

FIG. 49 is a diagram showing a ground-environmental factor correspondence data table.

FIG. 50 is a diagram showing a data structure of attribute data of buried piping of Embodiment 5.

FIG. 51 is a diagram showing an exceedance probability of corrosion depth and a number-of-water-leakage-accidents evaluation index for each pipeline ID that are calculated.

FIG. 52 is a diagram showing a water leakage accident index (the number of water leakage accidents, the probability of water leakage accidents, and the total number of water leakage accidents).

DESCRIPTION OF EMBODIMENTS

Embodiment 1

Figure 1:
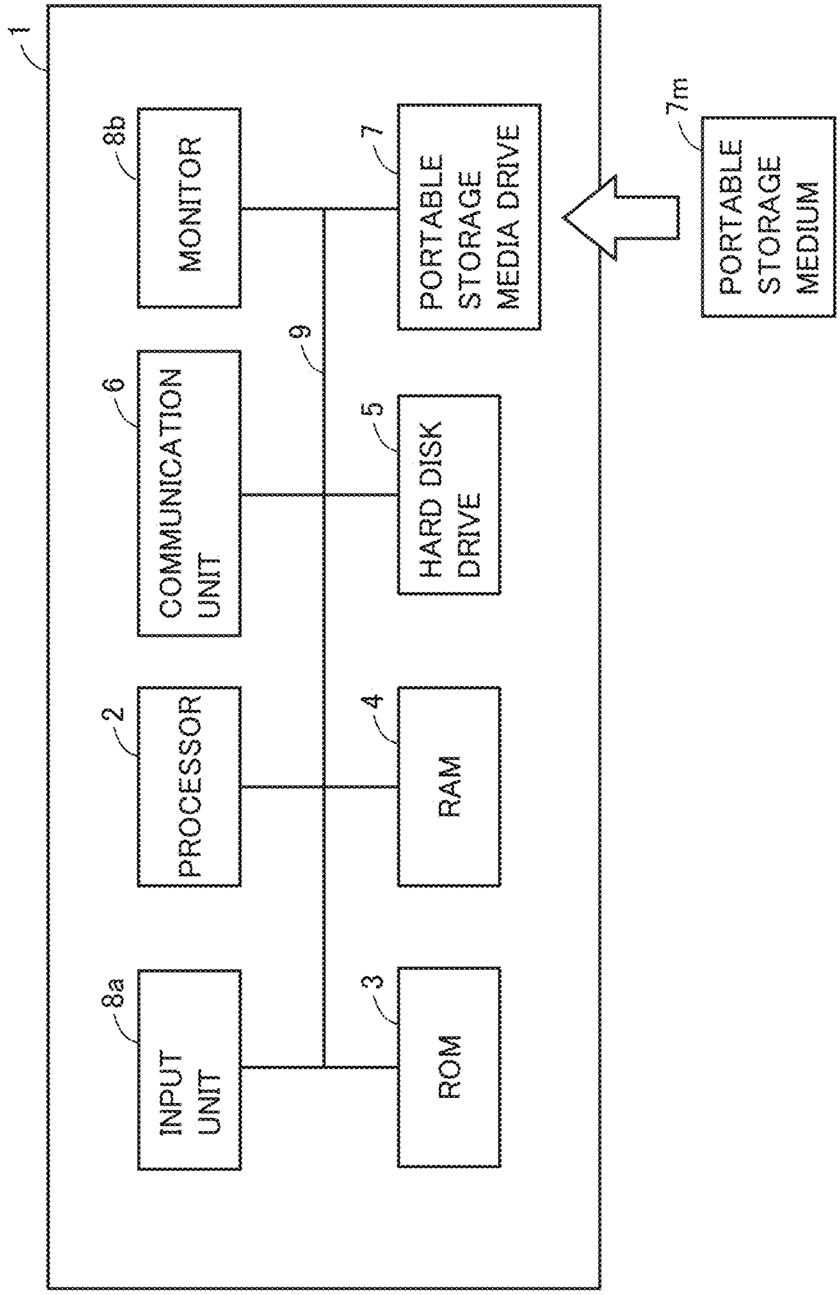
FIG. 1 is a schematic diagram showing a hardware configuration of a buried piping replacement period prediction apparatus of Embodiment 1, Embodiment 4, and Embodiment 5.

With reference to FIG. 1, a hardware configuration of a buried piping replacement period prediction apparatus 1 of this embodiment is described.

Buried piping replacement period prediction apparatus 1 mainly includes a processor 2 (for example, a central processing unit (CPU)) that executes a program, a read only memory (ROM) 3, a random access memory (RAM) 4, a hard disk drive 5, a communication unit 6, a portable storage media drive 7, an input unit 8*a*, and a monitor 8*b*, and the above are connected to each other by a bus 9. Buried piping replacement period prediction apparatus 1 is a computer such as a personal computer (PC), for example. In the present specification, the program includes a program in a source program format, a compressed program, an encrypted program, or the like in addition to a program directly executable by processor 2.

RAM 4 stores therein data generated by execution of a program by processor 2 or data input thereto via input unit 8*a* in a volatile manner. Hard disk drive 5 stores therein those data in a non-volatile manner. Communication unit 6 is a wired local area network (LAN), a wireless LAN, or a Bluetooth® interface, for example. Portable storage media drive 7 reads out information from a portable storage medium 7*m* and writes information into portable storage medium 7*m*. Portable storage medium 7*m* is a non-volatile recording medium such as a CD-ROM, a DVD-ROM, a flexible disk (FD), or a universal serial bus (USB) memory, for example. Input unit 8*a* includes a mouse, a keyboard, or a touch screen, for example. Monitor 8*b* is a liquid crystal display device, for example.

Processing in buried piping replacement period prediction apparatus 1 is realized by software executed by processor 2. The software may be stored in ROM 3 or hard disk drive 5 in advance. The software may be stored in portable storage medium 7*m* or other computer-readable non-volatile data recording medium (for example, a non-transitory computer-readable recording medium) and be distributed as a program product. The software may be provided as a program product downloadable by an information provider connected to the Internet or other networks. Such software may be read out from portable storage medium 7*m* by portable storage media drive 7 or may be downloaded via communication unit 6 and stored in hard disk drive 5. The software is read out from portable storage medium 7*m*, ROM 3, or hard disk drive 5 by processor 2 and is stored in RAM 4 in a format of a program executable by processor 2.

Processor 2 executes a program. By executing the program by processor 2, buried piping replacement period prediction apparatus 1 realizes functions as a buried piping attribute data acquisition unit 10, an exceedance-probability-of-corrosion-depth prediction model selection unit 32, and an exceedance-probability-of-corrosion-depth prediction unit 38 as shown in FIG. 2.

Figure 2:
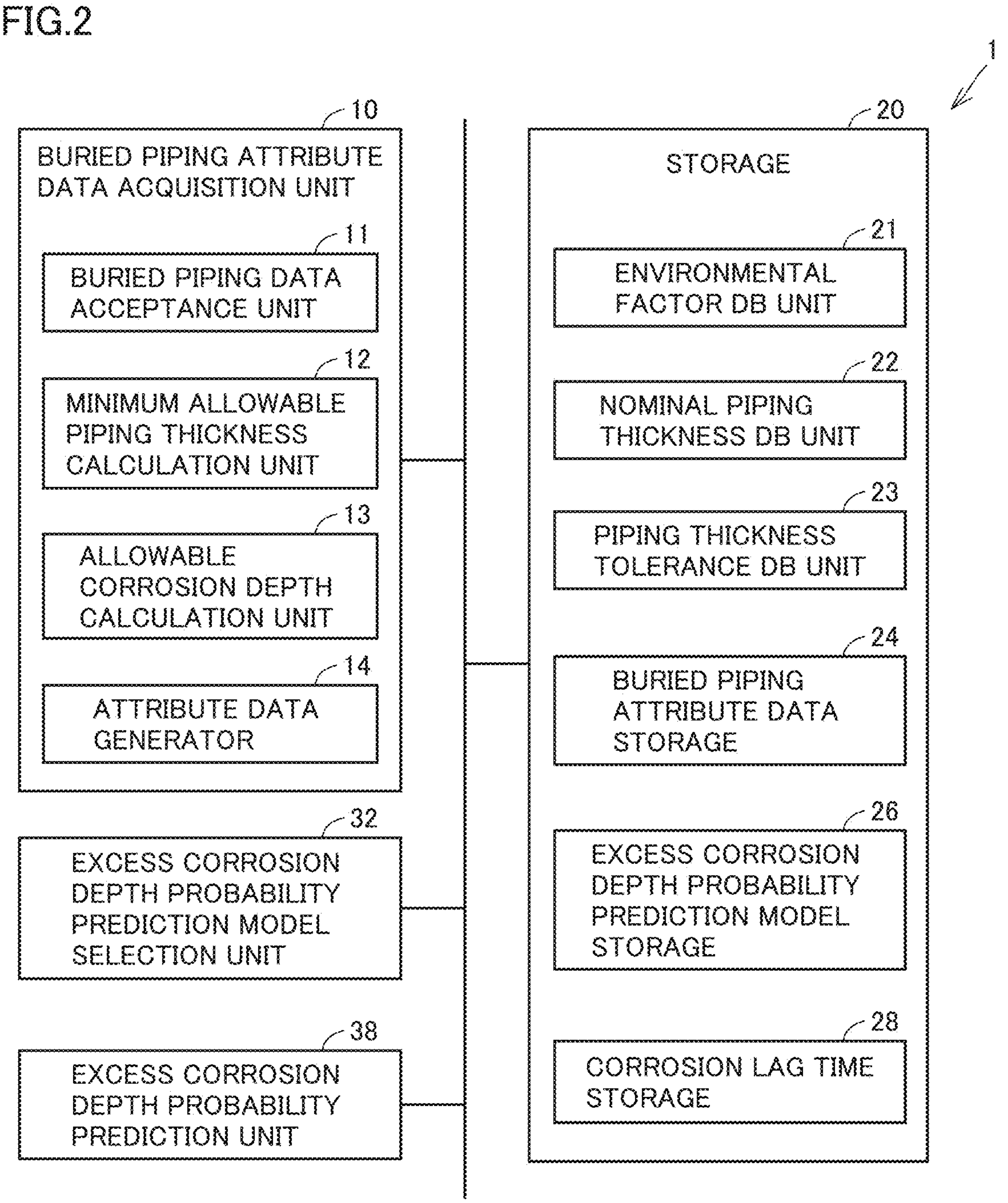
FIG. 2 is a block diagram describing a functional configuration of the buried piping replacement period prediction apparatus of Embodiment 1.

With reference to FIG. 2, an example of a functional configuration of buried piping replacement period prediction apparatus 1 is described. Buried piping replacement period prediction apparatus 1 mainly includes buried piping attribute data acquisition unit 10, exceedance-probability-of-corrosion-depth prediction model selection unit 32, and exceedance-probability-of-corrosion-depth prediction unit 38. Buried piping replacement period prediction apparatus 1 may further include a storage 20.

<Storage 20>

Storage 20 corresponds to at least one of ROM 3, RAM 4, hard disk drive 5, and portable storage medium 7*m* shown in FIG. 1. As shown in FIG. 2, storage 20 includes an environmental factor database unit 21, a nominal-pipe-wall-thickness database unit 22, a tolerance-on-wall-thickness database unit 23, a buried piping attribute data storage 24, an exceedance-probability-of-corrosion-depth prediction model storage 26, and a corrosion lag time storage 28.

<Buried Piping Attribute Data Acquisition Unit 10>

The buried piping is water piping, for example. The buried piping is buried in the ground. The buried piping is cast iron piping or ductile piping, for example. Buried piping attribute data acquisition unit 10 acquires attribute data 16 (see FIG. 3) of the buried piping. Attribute data 16 of the buried piping includes a pipeline number of the buried piping, a first environmental factor, a first burial period of time $T_1$, and an allowable corrosion depth, for example. The first environmental factor is a factor that defines an environment in which the buried piping is buried. The first environmental factor includes a type of soil and a soil resistivity. First burial period of time $T_1$ is a period of time for which the buried piping is buried. The allowable corrosion depth is a corrosion depth defined in consideration of a minimum required safety for the buried piping.

Buried piping attribute data acquisition unit 10 acquires attribute data 16 of the buried piping from first data 17 (see FIG. 4) of the buried piping provided from a customer, for example. As shown in FIG. 2, buried piping attribute data acquisition unit 10 includes a buried piping data acceptance unit 11, a minimum-pipe-wall-thickness calculation unit 12, an allowable corrosion depth calculation unit 13, and an attribute data generator 14, for example.

Buried piping data acceptance unit 11 accepts first data 17 of the buried piping provided from the customer. As shown in FIG. 4, first data 17 of the buried piping includes a pipeline number, a burial place, an installation (burial) year, a nominal diameter, a type of joint, the type of the pipe wall thickness, depth of earth cover, hydrostatic pressure, and water hammer pressure of the buried piping, for example. An A-type, a K-type, a T-type, an NS-type, or the like can be exemplified as the type of joint. Grade 1, grade 2, grade 3, or the like can be exemplified as the type of the pipe wall thickness. First data 17 of the buried piping may be stored in portable storage medium 7*m* provided from the customer, for example. First data 17 of the buried piping may be stored in hard disk drive 5 in advance, for example.

Buried piping attribute data acquisition unit 10 refers to environmental factor database unit 21 and acquires a first environmental factor of the buried piping from a burial place included in first data 17 of the buried piping. As shown in FIG. 5, a data table 41 on which the place and the environmental factor are caused to correspond to each other is stored in environmental factor database unit 21, for example.

Buried piping attribute data acquisition unit 10 calculates a difference between the installation year of the buried piping included in first data 17 and the current year (the year in which the prediction of the replacement period of the buried piping is executed) stored in storage 20 as a first burial period of time $T_1$.

Buried piping attribute data acquisition unit 10 refers to nominal-pipe-wall-thickness database unit 22 and acquires a nominal pipe wall thickness of the buried piping from the installation year, the nominal diameter, the type of joint, and the type of the pipe wall thickness of the buried piping included in first data 17 of the buried piping. As shown in FIG. 6, for example, a data table 42 on which the installation year, the nominal diameter, the type of joint, the type of the pipe wall thickness, and the nominal pipe wall thickness of the piping are caused to correspond to each other is stored in nominal-pipe-wall-thickness database unit 22. The nominal pipe wall thickness of the buried piping is a standard pipe wall thickness of the buried piping. The nominal pipe wall thickness of the piping is given by a sum of a tolerance on wall thickness, a margin thickness (corrosion allowance), a calculated pipe wall thickness calculated with a safety factor of 2.0 times, and depth of earth cover, hydrostatic pressure, and water hammer pressure of the buried piping included in first data 17 of the buried piping, for example. The safety factor may be specified with use of input unit 8*a* or may be stored in storage 20 in advance.

Buried piping attribute data acquisition unit 10 refers to tolerance-on-wall-thickness database unit 23 and acquires a tolerance on wall thickness of the buried piping. In a first example, as shown in FIG. 7, a data table 43 on which the nominal pipe wall thickness and the tolerance on wall thickness of the piping are caused to correspond to each other is stored in tolerance-on-wall-thickness database unit 23. Buried piping attribute data acquisition unit 10 acquires the tolerance on wall thickness of the buried piping from the nominal pipe wall thickness (see FIG. 6) of the buried piping. In a second example, a data table on which the type of the pipe wall thickness and the tolerance on wall thickness are caused to correspond to each other is stored in tolerance-on-wall-thickness database unit 23. Buried piping attribute data acquisition unit 10 acquires the tolerance on wall thickness of the buried piping from the type of the pipe wall thickness (see FIG. 6) of the buried piping. In a third example, a data table on which the nominal diameter and the tolerance on wall thickness are caused to correspond to each other is stored in tolerance-on-wall-thickness database unit 23. Buried piping attribute data acquisition unit 10 acquires the tolerance on wall thickness of the buried piping from the nominal diameter (see FIG. 6) of the buried piping.

Minimum-pipe-wall-thickness calculation unit 12 calculates the minimum pipe wall thickness of the buried piping from first data 17 of the buried piping. The minimum pipe wall thickness is a minimum thickness required for the buried piping in order to ensure the minimum required safety for the buried piping. The minimum pipe wall thickness is given by a calculated pipe wall thickness calculated with a safety factor of 1.0 times and depth of earth cover, hydrostatic pressure, and water hammer pressure of the buried piping included in first data 17 of the buried piping, for example.

Allowable corrosion depth calculation unit 13 calculates the allowable corrosion depth of the buried piping from the nominal pipe wall thickness, the tolerance on wall thickness, and the minimum pipe wall thickness of the buried piping. Specifically, the allowable corrosion depth of the buried piping is calculated by subtracting the tolerance on wall thickness and the minimum pipe wall thickness from the nominal pipe wall thickness of the buried piping.

Attribute data generator 14 generates attribute data 16 (see FIG. 3) of the buried piping in which the pipeline number of the buried piping, and the first environmental factor, first burial period of time $T_1$, and the allowable corrosion depth of the buried piping are caused to correspond to each other. Buried piping attribute data acquisition unit 10 outputs attribute data 16 of the buried piping to buried piping attribute data storage 24. Attribute data 16 of the buried piping is stored in buried piping attribute data storage 24.

When first data 17 of the buried piping includes attribute data 16 of the buried piping, buried piping attribute data acquisition unit 10 accepts first data 17 of the buried piping including attribute data 16 of the buried piping from the customer. In this case, minimum-pipe-wall-thickness calculation unit 12, allowable corrosion depth calculation unit 13, attribute data generator 14, environmental factor database unit 21, nominal-pipe-wall-thickness database unit 22, and tolerance-on-wall-thickness database unit 23 may be omitted.

<Plurality of Exceedance-Probability-of-Corrosion-Depth Prediction Models>

A plurality of exceedance-probability-of-corrosion-depth prediction models (see FIG. 19) are stored in an exceedance-probability-of-corrosion-depth prediction model storage 26 (see FIG. 2). The plurality of exceedance-probability-of-corrosion-depth prediction models are generated from reference data 18 (see FIG. 8) of the plurality of pieces of reference piping. The exceedance probability of corrosion depth is a probability of the corrosion depth of the piping exceeding the allowable corrosion depth (see FIG. 3) in a future period of time.

Figures 8, 9:
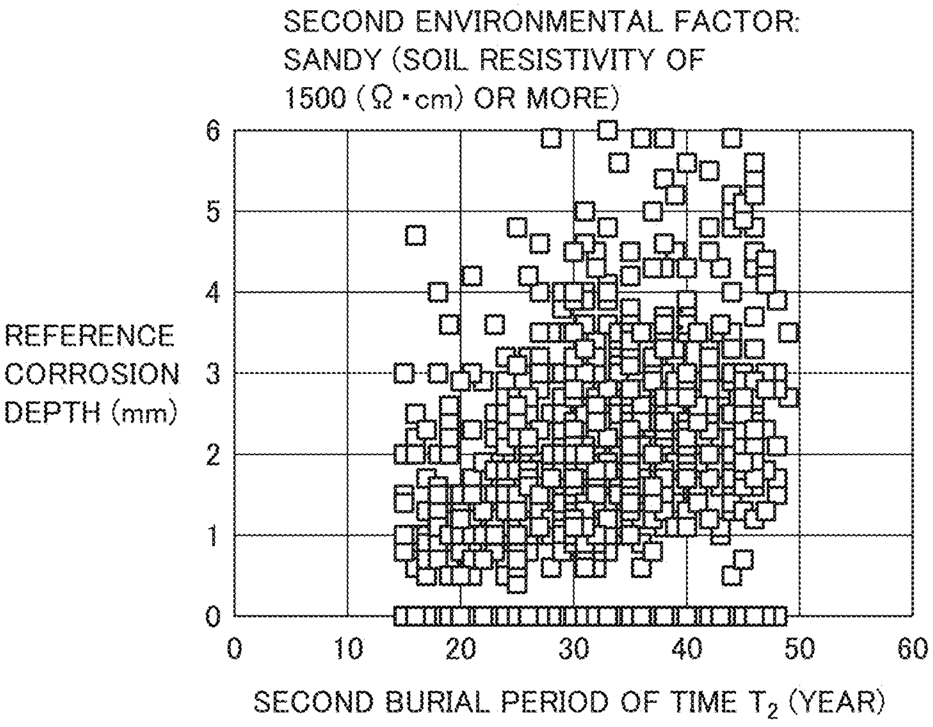
FIG. 8 is a diagram showing a data structure of reference data of a plurality of pieces of reference piping.
FIG. 9 is a diagram showing a relationship between a second burial period of time and a reference corrosion depth of the plurality of pieces of reference piping.

Reference data 18 of the plurality of pieces of reference piping (examination data of the plurality of pieces of reference piping) shown in FIG. 8 is acquired by performing exploratory excavation of a plurality of pieces of reference piping in a plurality of places. Reference data 18 of the plurality of pieces of reference piping includes a second environmental factor, a second burial period of time $T_2$, and a reference corrosion depth of the plurality of pieces of reference piping. The second environmental factor is a factor that defines an environment in which the plurality of pieces of reference piping are buried. The second environmental factor includes a type of soil and a soil resistivity. Second burial period of time $T_2$ is a period of time for which the plurality of pieces of reference piping are buried. The reference corrosion depth is the corrosion depth of the plurality of pieces of reference piping.

In this embodiment, reference data 18 of the plurality of pieces of reference piping includes the examination data of the plurality of pieces of reference piping in 5490 spots all over Japan. Reference data 18 of the plurality of pieces of reference piping may be provided from the customer or may be acquired by examining a region specified by the customer by a user of buried piping replacement period prediction apparatus 1. Reference data 18 of the plurality of pieces of reference piping may be provided by portable storage medium 7$m$ (FIG. 1) or through a communication network such as the Internet. Reference data 18 of the plurality of pieces of reference piping may be stored in hard disk drive 5 (FIG. 1).

The plurality of exceedance-probability-of-corrosion-depth prediction models are generated for each second environmental factor. There is a statistically meaningful difference among a corrosion depth in a sandy (hereinafter simply referred to as "sandy") soil type having a soil resistivity of 1500 Ω·cm or more, a corrosion depth in a silty (hereinafter simply referred to as "silty") soil type having a soil resistivity of 1500 Ω·cm or more, a corrosion depth in an argilliferous (hereinafter simply referred to as "argilliferous") soil type having a soil resistivity of 1500 Ω·cm or more, and a corrosion depth in a type of soil (hereinafter may be simply referred to as a "low-specific-resistance soil type") having a soil resistivity less than 1500 Ω·cm. The number of reference data 18 of the plurality of pieces of reference piping having those four second environmental factors accounts for 82% of the total number of reference data 18 of the plurality of pieces of reference piping collected from all over Japan.

Thus, the plurality of exceedance-probability-of-corrosion-depth prediction models are generated for each second environmental factor. The plurality of exceedance-probability-of-corrosion-depth prediction models are generated for each of those four second environmental factors, for example. In other words, the plurality of exceedance-probability-of-corrosion-depth prediction models include an exceedance-probability-of-corrosion-depth prediction model for sandy soil type, an exceedance-probability-of-corrosion-depth prediction model for silty soil type, an exceedance-probability-of-corrosion-depth prediction model for argilliferous soil type, and an exceedance-probability-of-corrosion-depth prediction model for low-specific-resistance soil type having a soil resistivity less than 1500 Ω·cm. The plurality of exceedance-probability-of-corrosion-depth prediction models may be generated for each second environmental factor and modified burial period of time of a predetermined range.

Reference data 18 of the plurality of pieces of reference piping buried in the sandy soil type shown in FIG. 9 is acquired from reference data 18 of the plurality of pieces of reference piping. From FIG. 9, it can be understood that reference data 18 of the plurality of pieces of reference piping buried in the sandy soil type includes a large number of data with a reference corrosion depth of 0 mm and there is great variation in the data. Therefore, it is difficult to construct a prediction model capable of accurately predicting the replacement period of the buried piping by directly using reference data 18.

The inventors of the present disclosure have conceived that reference data 18 of the plurality of pieces of reference piping has a large number of data with a reference corrosion depth of 0 mm and there is great variation in data due to a coating film formed on an outer surface of the piping. The corrosion of the piping starts for the first time after the corrosion passes through the coating film. It is conceived that reference data 18 of the plurality of pieces of reference piping includes a large number of data with a reference corrosion depth of 0 mm because there is time from when the piping is buried to when the piping starts corroding (hereinafter referred to as "lag time $t_L$ of corrosion"). Thus, the inventors of the present disclosure have conceived to construct a prediction model that can predict the replacement period of the buried piping more accurately on the basis of reference data 18 (hereinafter referred to as "modified reference data") of the plurality of pieces of reference piping modified on the basis of lag time $t_L$ of corrosion estimated by a statistical method.

A method of generating the plurality of exceedance-probability-of-corrosion-depth prediction models (see FIG. 19) from reference data 18 of the plurality of pieces of reference piping (in other words, a manufacturing method of buried piping replacement period prediction apparatus 1) is described below. Out of the four second environmental factors, the exceedance-probability-of-corrosion-depth prediction model for sandy soil type is described as an example. The exceedance-probability-of-corrosion-depth prediction models for other types of soil are also generated in a manner similar to that of the exceedance-probability-of-corrosion-depth prediction model for sandy soil type.

Figure 10:
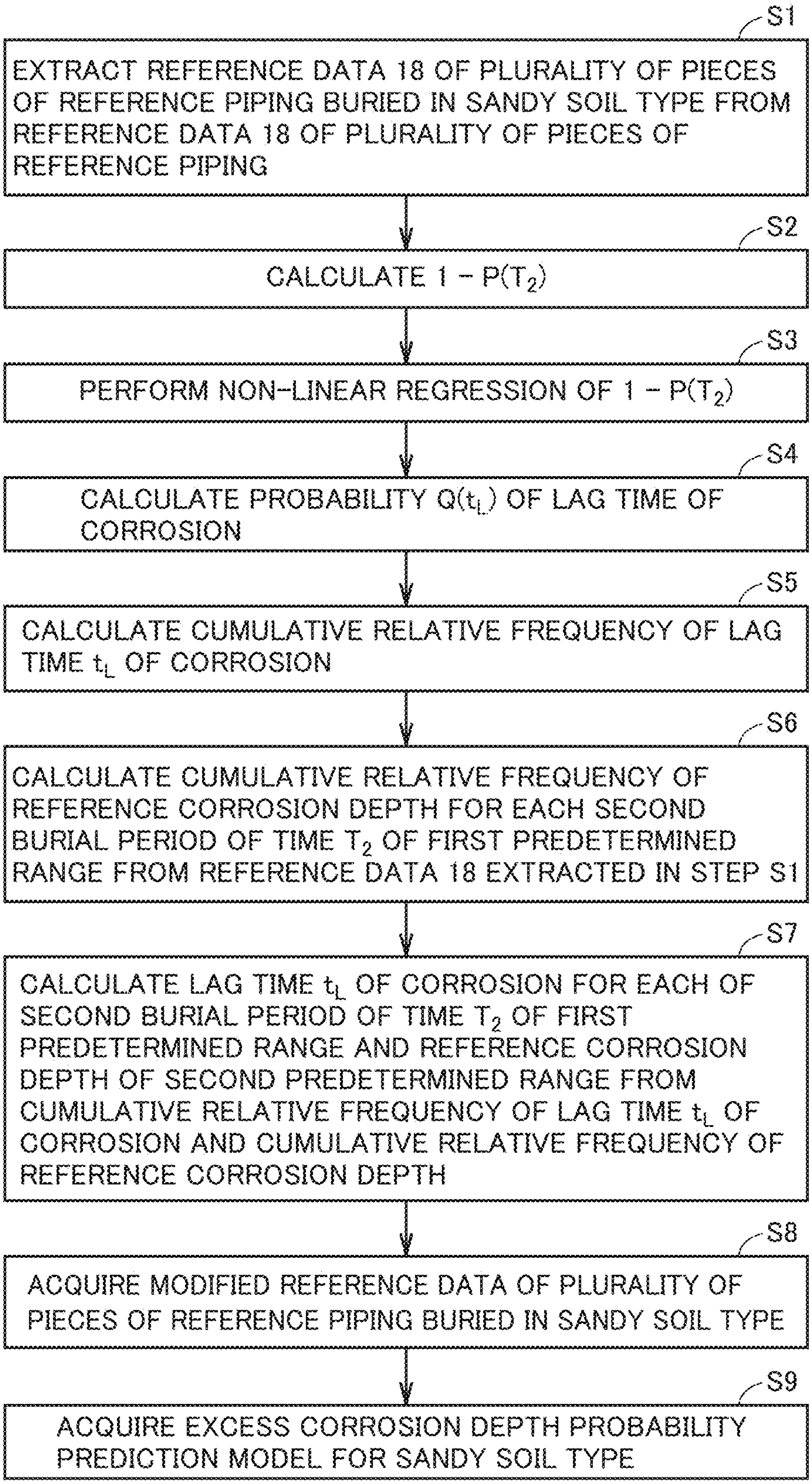
FIG. 10 is a diagram showing a flowchart of a generation method of an exceedance-probability-of-corrosion-depth prediction model of Embodiment 1.

With reference to FIG. 10, processor 2 extracts reference data 18 of the plurality of pieces of reference piping buried in the sandy soil type from reference data 18 of the plurality of pieces of reference piping stored in storage 20 (S1).

Processor 2 calculates, for reference data 18 of the plurality of pieces of reference piping relating to the sandy soil type extracted in step S1, a rate $1-P(T_2)$ (see FIG. 13) of the number of data with the reference corrosion depth that is more than 0 mm for each second burial period of time $T_2$ (S2). Here, $P(T_2)$ is a rate of the number of data with the reference corrosion depth of 0 mm for each second burial period of time $T_2$.

Figure 12:
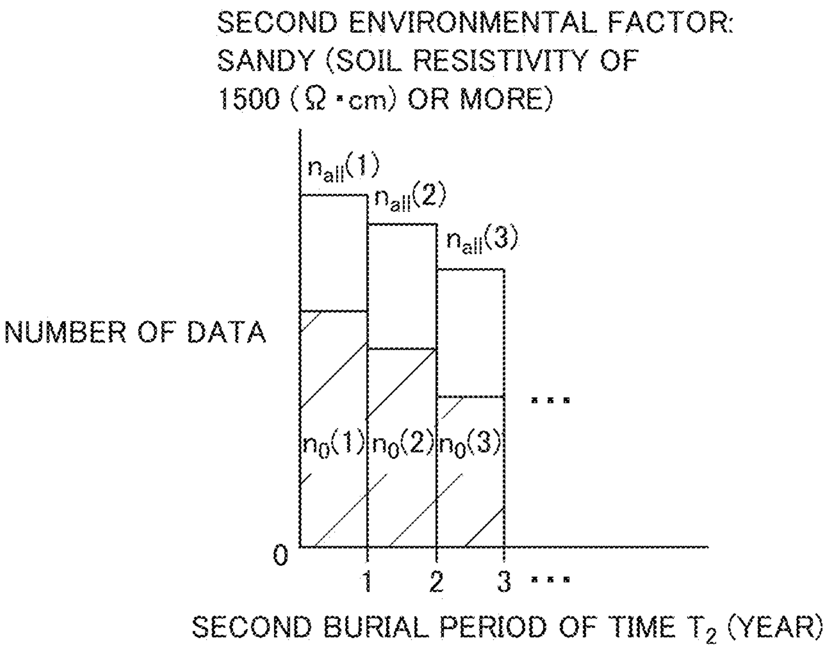
FIG. 12 is a histogram showing the distribution of the number of the reference data of the plurality of pieces of reference piping with respect to the second burial period of time of the plurality of pieces of reference piping.

Specifically, processor 2 counts a total number of data $n_{all}(T_2)$ for each second burial period of time $T_2$ and the number of data $n_0(T_2)$ with the reference corrosion depth of 0 mm for each second burial period of time $T_2$ shown in FIG. 12. Processor 2 calculates rate $P(T_2)$ of the number of data $n_0(T_2)$ having the reference corrosion depth of 0 mm for each second burial period of time $T_2$ with respect to the total number of data $n_{all}(T_2)$ for each second burial period of time $T_2$. Here, $P(T_2)$ is given by $no(T_2)/n_{all}(T_2)$. Processor 2 calculates $1-P(T_2)$. Here, $1-P(T_2)$ is a rate of the reference piping having a corrosion depth that is more than 0 mm in second burial period of time $T_2$.

Figure 13:
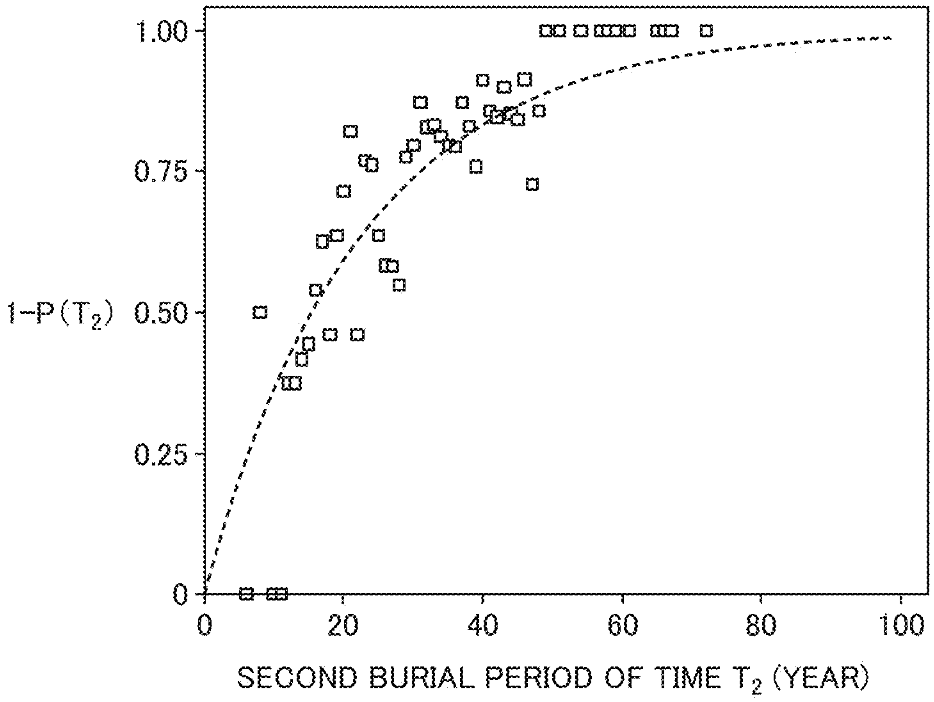
FIG. 13 is a diagram showing $1-P(T_2)$.

Processor 2 performs non-linear regression of $1-P(T_2)$ (S3). Here, $1-P(T_2)$ is a rate (probability) as described above and asymptotically approaches 1 from zero in a non-linear manner as $T_2$ increases as shown in FIG. 13. Therefore, $1-P(T_2)$ is regressed with use of a non-linear regression model that regresses the rate (probability) in a non-linear manner. Examples of the non-linear regression model include an exponential distribution model and a fractional function model. One example of the exponential distribution model is an exponential distribution model expressed by Expression (1). A coefficient defined in accordance with $1-P(T_2)$ is represented by a. One example of the fractional function model is a linear fractional function model expressed by Expression (2). Coefficients defined in accordance with $1-P(T_2)$ are represented by g and h. In this embodiment, processor 2 calculates coefficient α by performing non-linear regression of $1-P(T_2)$ by the exponential distribution model expressed by Expression (1) below with use of a least squares method and the like.

$$1-P(T_2)=1-1\times\exp(-\alpha T_2) \tag{1}$$

$$1-P(T_2)=gT_2/(1+hT_2) \tag{2}$$

The change rate of $1-P(T_2)$, in other words, a differential value of $1-P(T_2)$ is a rate of the reference piping that starts corroding in second burial period of time $T_2$ out of all of the reference piping buried in the sandy soil type. The rate of the reference piping that starts corroding in second burial period of time $T_2$ is a rate of the reference piping of which lag time $t_L$ of corrosion is second burial period of time $T_2$ out of all of the reference piping buried in the sandy soil type. In other words, the differential value of $1-P(T_2)$ is a probability $Q(T_2)$ of the lag time of corrosion in the sandy soil type. Probability $Q(T_2)$ of the lag time of corrosion in the sandy soil type is a probability of lag time $t_L$ of corrosion being second burial period of time $T_2$ out of all of lag time $t_L$ of corrosion that all of the reference piping buried in the sandy soil type has.

Figure 14:
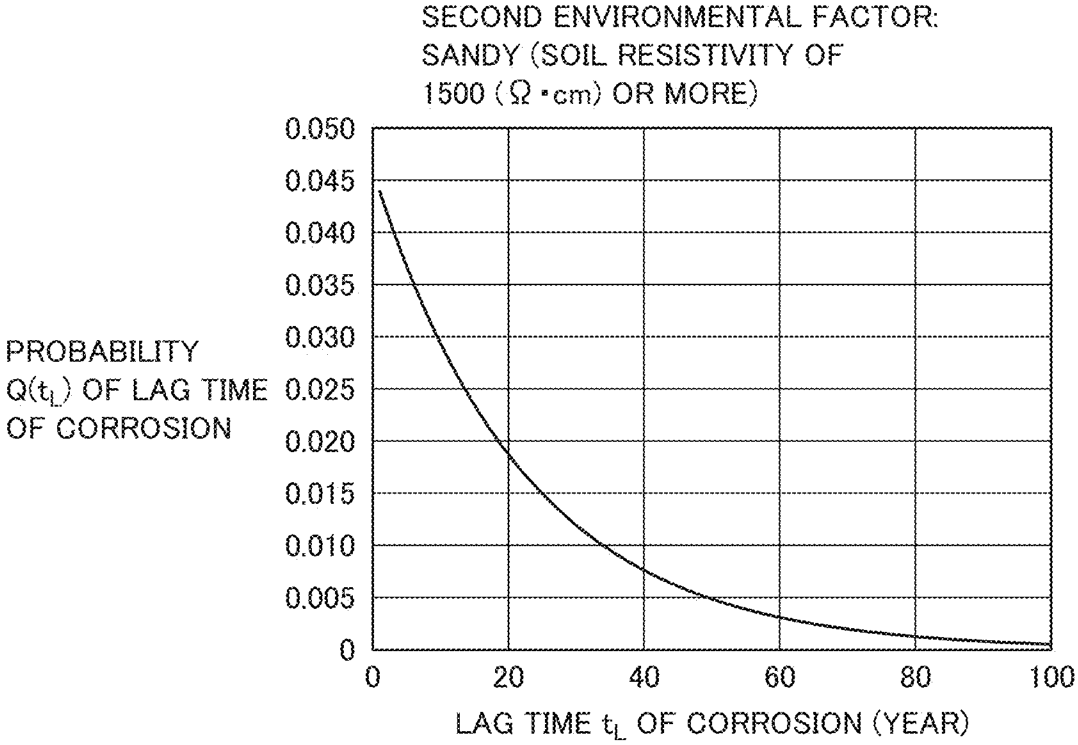
FIG. 14 is a diagram showing a probability $Q(t_L)$ of lag time of corrosion.

Thus, processor 2 calculates a probability $Q(t_L)$ of the lag time of corrosion (see FIG. 14) (S4). Specifically, processor 2 calculates a differential curve of an approximation curve of $1-P(T_2)$ on which non-linear regression has been performed. A sum of probability $Q(t_L)$ of the lag time of corrosion for all lag time $t_L$ of corrosion, in other words, an area of a region sandwiched by a curve of probability $Q(t_L)$ of the lag time of corrosion and a straight line of Q=0 shown in FIG. 14 is equal to 1.

Processor 2 calculates a cumulative relative frequency (see FIG. 15) of lag time $t_L$ of corrosion from probability $Q(t_L)$ of the lag time of corrosion (S5). The cumulative relative frequency of lag time $t_L$ of corrosion of n years is a cumulative sum of a relative frequency of lag time $t_L$ of corrosion of which lag time $t_L$ of corrosion is n years or more and is given by a sum of probability $Q(t_L)$ of the lag time of which corrosion lag time $t_L$ of corrosion is n years or more. Processor 2 calculates the sum of probability $Q(t_L)$ of the lag time of corrosion of which lag time $t_L$ of corrosion is n years or more as a cumulative relative frequency of lag time $t_L$ of corrosion=n years. Processor 2 saves the cumulative relative frequency of lag time $t_L$ of corrosion in corrosion lag time storage 28.

Processor 2 calculates a cumulative relative frequency of a reference corrosion depth (see FIG. 15) for each second burial period of time $T_2$ of a first predetermined range from reference data 18 of the plurality of pieces of reference piping relating to the sandy soil type extracted in step S1 (S6). The cumulative relative frequency of the reference corrosion depth is calculated for each reference corrosion depth of a second predetermined range. The cumulative relative frequency of the reference corrosion depth of the second predetermined range is a cumulative sum of a relative frequency of a reference corrosion depth of the second predetermined range or less.

Figure 11:
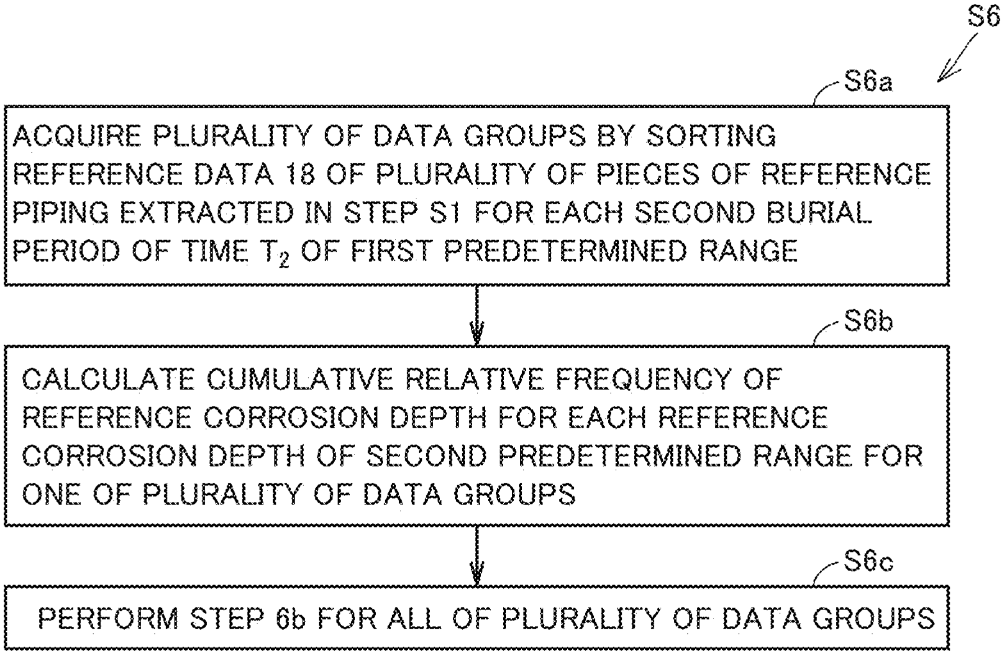
FIG. 11 is a diagram showing a flowchart of a method of calculating a cumulative relative frequency of the reference corrosion depth.

Specifically, as shown in FIG. 11, processor 2 acquires a plurality of data groups by sorting reference data 18 of the plurality of pieces of reference piping relating to the sandy soil type extracted in step S1 for each second burial period of time $T_2$ of the first predetermined range (S6*a*). Processor 2 acquires a plurality of data groups by sorting reference data 18 of the plurality of pieces of reference piping relating to the sandy soil type for each second burial period of time $T_2$ of 5 years, for example. The plurality of data groups include a data group having second burial period of time $T_2$ that is 15 years or more and less than 20 years, for example.

Processor 2 calculates a cumulative relative frequency of a reference corrosion depth for each reference corrosion depth of the second predetermined range for one of the plurality of data groups (S6*b*). The cumulative relative frequency of the reference corrosion depth of the second predetermined range is the rate of the number of data having a reference corrosion depth of the second predetermined range or less out of one of the plurality of data groups. Processor 2 calculates the rate of the number of data having a reference corrosion depth of the second predetermined range or less out of one of the plurality of data groups as the cumulative relative frequency of the reference corrosion depth of the second predetermined range.

Figures 15, 16:
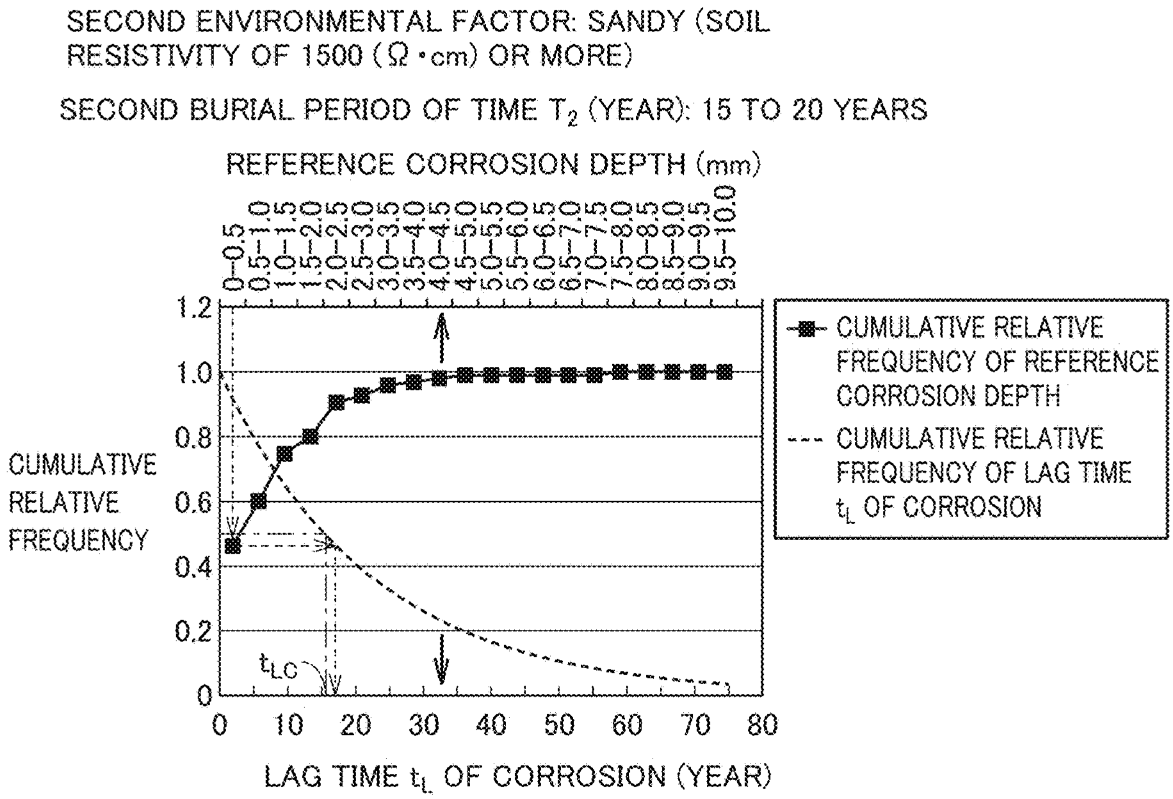
FIG. 15 is a diagram showing a cumulative relative frequency of lag time of corrosion and a cumulative relative frequency of the reference corrosion depth.
FIG. 16 is a diagram showing a data structure of a data table of the lag time of corrosion.

As shown in FIG. 15, processor 2 calculates a cumulative relative frequency of the reference corrosion depth for each reference corrosion depth of 0.5 mm for a data group having second burial period of time $T_2$ that is 15 years or more and less than 20 years, for example. For example, a cumulative relative frequency of the reference corrosion depth that is 1.0 mm or more and less than 1.5 mm in a data group having second burial period of time $T_2$ that is 15 years or more and less than 20 years is the rate of the number of data having a reference corrosion depth that is 0 mm or more and less than 1.5 mm out of the data group. In other words, the cumulative relative frequency of the reference corrosion depth that is 1.0 mm or more and less than 1.5 mm in a data group having second burial period of time $T_2$ that is 15 years or more and less than 20 years is calculated as the rate of a sum of the number of data having the reference corrosion depth that is 0 mm or more and less than 0.5 mm, the number of data having the reference corrosion depth that is 0.5 mm or more and less than 1.0 mm, and the number of data having the reference corrosion depth that is 1.0 mm or more and less than 1.5 mm in the data group with respect to the total number of data in the data group.

Processor 2 performs step 6*b* for all of the plurality of data groups (S6*c*). As a result, the cumulative relative frequency of the reference corrosion depth is calculated for each second burial period of time $T_2$ of the first predetermined range regarding the sandy soil type.

In general, it is conceived that corrosion starts in a shorter period of time after the piping is buried, and lag time $t_L$ of corrosion becomes shorter as the corrosion depth of the piping becomes greater. Therefore, it is conceived that there is correlation between the cumulative relative frequency of lag time $t_L$ of corrosion and the cumulative relative frequency of the reference corrosion depth. Processor 2 calculates lag time $t_L$ of corrosion for each of second burial period of time $T_2$ of the first predetermined range and the reference corrosion depth of the second predetermined range from the cumulative relative frequency of lag time $t_L$ of corrosion and the cumulative relative frequency of the reference corrosion depth for reference data 18 of the plurality of pieces of reference piping buried in the sandy soil type (S7).

Specifically, as indicated by thin dotted arrows in FIG. 15, processor 2 acquires lag time $t_L$ (for example, 17.5 years) of corrosion with which the cumulative relative frequency of lag time $t_L$ of corrosion becomes equal to a cumulative relative frequency of a reference corrosion depth of a second predetermined range (for example, a corrosion depth that is 0.0 mm or more and less than 0.5 mm) in second burial period of time $T_2$ of the first predetermined range (for example, 15 years or more and less than 20 years) as lag time $t_L$ (for example, 17.5 years) of corrosion corresponding to a reference corrosion depth (for example, a corrosion depth that is 0.0 mm or more and less than 0.5 mm) of a second predetermined range in second burial period of time $T_2$ of a first predetermined range (for example, 15 years or more and less than 20 years).

Processor 2 acquires a data table 45 of lag time $t_L$ of corrosion shown in FIG. 16 by associating the second environmental factor, second burial period of time $T_2$, the reference corrosion depth, and lag time $t_L$ of corrosion with each other. Data table 45 of lag time $t_L$ of corrosion includes the second environmental factor, second burial period of time $T_2$, the reference corrosion depth, and lag time $t_L$ of corrosion. Processor 2 outputs data table 45 of lag time $t_L$ of corrosion to corrosion lag time storage 28. Data table 45 of lag time $t_L$ of corrosion is stored in corrosion lag time storage 28.

Processor 2 acquires modified reference data (see FIG. 17) of the plurality of pieces of reference piping buried in the sandy soil type (S8). The modified reference data includes the second environmental factor, the modified burial period of time, and the reference corrosion depth. Specifically, processor 2 reads out the second environmental factor, second burial period of time $T_2$, the reference corrosion depth, and lag time $t_L$ of corrosion from data table 45 of lag time $t_L$ of corrosion stored in corrosion lag time storage 28. Processor 2 calculates a modified burial period of time by subtracting lag time $t_L$ (see FIG. 16) of corrosion depending on the second environmental factor, second burial period of time $T_2$, and the reference corrosion depth from second burial period of time $T_2$. As a result, the modified reference data of the plurality of pieces of reference piping is acquired.

Figure 17:
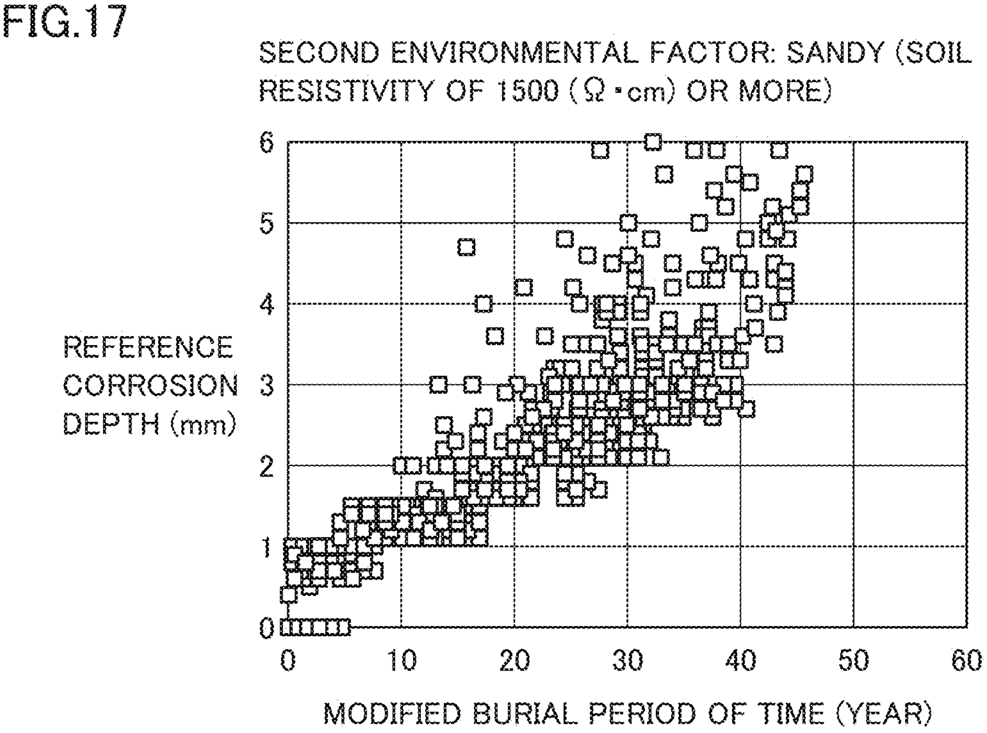
FIG. 17 is a diagram showing modified reference data (a relationship between a modified burial period of time and the reference corrosion depth of the plurality of pieces of reference piping).

A graph of the modified reference data shown in FIG. 17 is obtained by moving each of points in a graph of reference data 18 shown in FIG. 9 in the left direction by lag time $t_L$ of corrosion corresponding to each of the points. It can be understood that the modified reference data (see FIG. 17) is reduced in the number of data with the reference corrosion depth of 0 mm and reduced in the variation in data as compared to reference data 18 (see FIG. 9).

Next, in the generation method of the plurality of exceedance-probability-of-corrosion-depth prediction models, processor 2 acquires the exceedance-probability-of-corrosion-depth prediction model for sandy soil type from the modified reference data (see FIG. 17) (S9).

Figure 18:
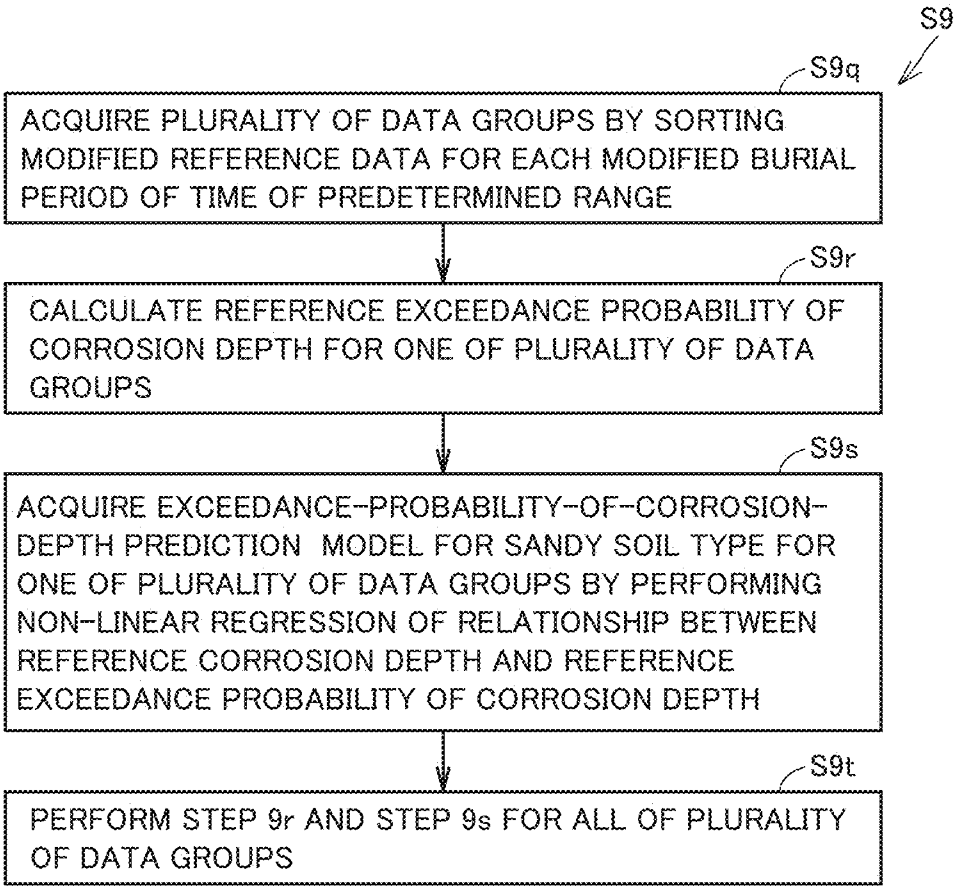
FIG. 18 is a diagram showing a flowchart of steps for acquiring the exceedance-probability-of-corrosion-depth prediction model of Embodiment 1.

Specifically, as shown in FIG. 18, processor 2 acquires a plurality of data groups by sorting the modified reference data (see FIG. 17) for each modified burial period of time of a predetermined range (S9*q*). Processor 2 acquires a plurality of data groups by sorting the modified reference data relating to the sandy soil type for each modified burial period of time of 10 years, for example. The plurality of data groups includes a data group having a modified burial period of time that is 40 years or more and less than 50 years, for example.

Processor 2 calculates a reference exceedance probability of corrosion depth for one of the plurality of data groups (S9*r*). The reference exceedance probability of corrosion depth means a probability of the reference corrosion depth of the reference piping exceeding a predetermined corrosion depth in a modified burial period of time of a predetermined range. Specifically, processor 2 lines up data of each set of a modified burial period of time and a reference corrosion depth included in one of the plurality of data groups (for example, a data group having a modified burial period of time that is 40 years or more and less than 50 years) from the greatest reference corrosion depth. Processor 2 calculates the rate of the number of data exceeding a predetermined corrosion depth (for example, 0 mm, 0.5 mm, 1.0 mm, 1.5 mm, 2.0 mm, 2.5 mm, 3.0 mm, 3.5 mm, 4.0 mm, 4.5 mm, 5.0 mm, 5.5 mm, 6.0 mm) out of the data group as the reference exceedance probability of corrosion depth at the predetermined corrosion depth.

Processor 2 acquires the exceedance-probability-of-corrosion-depth prediction model for sandy soil type for one of the plurality of data groups by performing non-linear regression of a relationship (see FIG. 19) between the reference corrosion depth and the reference exceedance probability of corrosion depth acquired in step S9*r* (S9*s*). As described above, the reference exceedance probability of corrosion depth is a probability of a first event out of the first event and a second event occurring. The first event is an event where the reference corrosion depth of the reference piping exceeds a predetermined corrosion depth in a modified burial period of time of a predetermined range, and the second event is an event where the reference corrosion depth of the reference piping does not exceed the predetermined corrosion depth in the modified burial period of time of the predetermined range. Therefore, non-linear regression of the reference exceedance probability of corrosion depth may be performed by a cumulative distribution function of binomial distribution. As one example, processor 2 calculates coefficients b, c by performing non-linear regression of the relationship between the reference corrosion depth and the reference exceedance probability of corrosion depth acquired in step S9*r* by Expression (3) below that is one of the cumulative distribution functions of the binomial distribution.

$$R=100\times\exp(b+cx)/(1+\exp(b+cx)) \quad (3)$$

Here, R represents an exceedance probability of corrosion depth (%), b, c represent coefficients, and x represents a corrosion depth.

Processor 2 performs step 9*r* and step 9*s* above for all of the plurality of data groups (S9*t*). For example, processor 2 performs step 9*r* and step 9*s* above for a data group having a modified burial period of time that is 10 years or more and less than 20 years, a data group having a modified burial period of time that is 20 years or more and less than 30 years, and a data group having a modified burial period of time that is 30 years or more and less than 40 years. As a result, the exceedance-probability-of-corrosion-depth prediction model for sandy soil type is acquired for each modified burial period of time of the predetermined range shown in FIG. 19.

Processor 2 acquires an exceedance-probability-of-corrosion-depth prediction model for silty soil type (not shown) from reference data 18 (see FIG. 8) of the plurality of pieces of reference piping buried in the silty soil type by performing similar arithmetic processing. Processor 2 acquires an exceedance-probability-of-corrosion-depth prediction model for argilliferous soil type (not shown) from reference data 18 (see FIG. 8) of the plurality of pieces of reference piping buried in the argilliferous soil type by performing similar arithmetic processing. Processor 2 acquires an exceedance-probability-of-corrosion-depth prediction model for low-specific-resistance soil type having a soil resistivity less than 1500 Ω·cm (not shown) from reference data 18 (see FIG. 8) of the plurality of pieces of reference piping buried in the type of soil having a soil resistivity less than 1500 Ω·cm by performing similar arithmetic processing.

Processor 2 saves the plurality of exceedance-probability-of-corrosion-depth prediction models (for example, the exceedance-probability-of-corrosion-depth prediction model for sandy soil type, the exceedance-probability-of-corrosion-depth prediction model for silty soil type, the exceedance-probability-of-corrosion-depth prediction model for argilliferous soil type, and the exceedance-probability-of-corrosion-depth prediction model for the type of soil having a soil resistivity less than 1500 Ω·cm) in exceedance-probability-of-corrosion-depth prediction model storage 26.

<Exceedance-Probability-of-Corrosion-Depth Prediction Model Selection Unit 32>

Exceedance-probability-of-corrosion-depth prediction model selection unit 32 shown in FIG. 2 selects the exceedance-probability-of-corrosion-depth prediction model for the first environmental factor of the buried piping from the plurality of exceedance-probability-of-corrosion-depth prediction models acquired for each second environmental factor of the plurality of pieces of reference piping.

Specifically, exceedance-probability-of-corrosion-depth prediction model selection unit 32 reads out the first environmental factor (see FIG. 3) of the buried piping from buried piping attribute data storage 24. For example, when an exceedance probability of corrosion depth of the buried piping identified by a pipeline number ABC-1 (see FIG. 3) is acquired, exceedance-probability-of-corrosion-depth prediction model selection unit 32 refers to attribute data 16 (see FIG. 3) of the buried piping stored in buried piping attribute data storage 24 and reads out the first environmental factor (the sandy soil type having a soil resistivity of 1500 Ω·cm or more) of the buried piping corresponding to pipeline number ABC-1.

Next, exceedance-probability-of-corrosion-depth prediction model selection unit 32 selects an exceedance-probability-of-corrosion-depth prediction model for the first environmental factor from the plurality of exceedance-probability-of-corrosion-depth prediction models stored in exceedance-probability-of-corrosion-depth prediction model storage 26. For example, when the exceedance probability of corrosion depth of the buried piping of pipeline number ABC-1 is acquired, exceedance-probability-of-corrosion-depth prediction model selection unit 32 selects an exceedance-probability-of-corrosion-depth prediction model for sandy soil type (see FIG. 19) from the plurality of exceedance-probability-of-corrosion-depth prediction models stored in exceedance-probability-of-corrosion-depth prediction model storage 26.

<Exceedance-Probability-of-Corrosion-Depth Prediction Unit 38>

Exceedance-probability-of-corrosion-depth prediction unit 38 shown in FIG. 2 calculates an exceedance probability of corrosion depth of the buried piping in a future period of time from the exceedance-probability-of-corrosion-depth prediction model selected by exceedance-probability-of-corrosion-depth prediction model selection unit 32, and first burial period of time $T_1$ and the allowable corrosion depth of the buried piping. The exceedance probability of corrosion depth of the buried piping is a probability of the corrosion depth of the buried piping exceeding the allowable corrosion depth (FIG. 3) in a future period of time.

Specifically, exceedance-probability-of-corrosion-depth prediction unit 38 reads out the pipeline number, first burial period of time $T_1$, and the allowable corrosion depth of the buried piping of which exceedance probability of corrosion depth is to be acquired from buried piping attribute data storage 24. For example, when the exceedance probability of corrosion depth of the buried piping identified by pipeline number ABC-1 (see FIG. 3) is to be acquired, exceedance-probability-of-corrosion-depth prediction unit 38 refers to attribute data 16 of the buried piping stored in buried piping attribute data storage 24, and reads out pipeline number ABC-1, first burial period of time $T_1$ (for example, 32 years) corresponding to pipeline number ABC-1, and the allowable corrosion depth (for example, 6.0 mm) of the buried piping corresponding to pipeline number ABC-1.

Next, exceedance-probability-of-corrosion-depth prediction unit 38 calculates the exceedance probability of corrosion depth of the buried piping in the modified burial period of time of the predetermined range from the exceedance-probability-of-corrosion-depth prediction model for the first environmental factor selected by exceedance-probability-of-corrosion-depth prediction model selection unit 32 and the allowable corrosion depth of the buried piping. For example, when the exceedance probability of corrosion depth of the buried piping identified by pipeline number ABC-1 (see FIG. 3) is to be acquired, exceedance-probability-of-corrosion-depth prediction unit 38 calculates an exceedance probability of corrosion depth of the buried piping that is 9% in a modified burial period of time that is 40 years or more and less than 50 years by applying the allowable corrosion depth (6.0 mm) of the buried piping corresponding to pipeline number ABC-1 to the exceedance-probability-of-corrosion-depth prediction model for sandy soil type (see FIG. 19) selected by exceedance-probability-of-corrosion-depth prediction model selection unit 32.

As described above, the modified burial period of time is obtained by subtracting the amount of lag time $t_L$ of corrosion depending on second burial period of time $T_2$ and the reference corrosion depth from second burial period of time $T_2$. A difference between the calculated modified burial period of time and second burial period of time $T_2$ needs to be compensated for in order to calculate a future period of time of the calculated exceedance probability of corrosion depth. The buried piping is already buried during first burial period of time $T_1$ at a time point of calculating the exceedance probability of corrosion depth. The calculated modified burial period of time needs to be adjusted by the amount of first burial period of time $T_1$ in order to calculate the future period of time of the calculated exceedance probability of corrosion depth.

Thus, exceedance-probability-of-corrosion-depth prediction unit 38 calculates a median $t_{LC}$ of the lag time of corrosion from the cumulative relative frequency (see FIG. 15) of lag time t of corrosion stored in corrosion lag time storage 28. Specifically, as indicated by a long dashed short dashed line in FIG. 15, exceedance-probability-of-corrosion-depth prediction unit 38 calculates a value of lag time $t_L$ of corrosion with which the cumulative relative frequency (FIG. 15) of lag time $t_L$ of corrosion becomes 0.5 as median $t_{LC}$ (for example, 15.5 years) of the lag time of corrosion. Exceedance-probability-of-corrosion-depth prediction unit 38 saves median $t_{LC}$ of the lag time of corrosion in corrosion lag time storage 28.

Exceedance-probability-of-corrosion-depth prediction unit 38 calculates the future period of time in which the corrosion depth of the buried piping exceeds the allowable corrosion depth of the buried piping by adding median $t_{LC}$ of the lag time of corrosion to the modified burial period of time of which exceedance probability of corrosion depth is calculated and further subtracting first burial period of time $T_1$ of the buried piping therefrom. Specifically, exceedance-probability-of-corrosion-depth prediction unit 38 acquires a future period of time that is 23.5 years or more and less than 33.5 years (FIG. 20) by adding median $t_{LC}$ (15.5 years) of lag time of corrosion for sandy soil type to the modified burial period of time that is 40 years or more and less than 50 years (see FIG. 19) and further subtracting first burial period of time $T_1$ (32 years) of the buried piping corresponding to pipeline number ABC-1 therefrom.

Exceedance-probability-of-corrosion-depth prediction unit 38 generates and outputs an exceedance-probability-of-corrosion-depth result 53 (see FIG. 20) in which the pipeline number, the future period of time, and the exceedance probability of corrosion depth of the buried piping are caused to correspond to each other. Exceedance-probability-of-corrosion-depth result 53 is output to at least one of RAM 4, hard disk drive 5, portable storage medium 7*m*, and monitor 8*b*, for example. Exceedance-probability-of-corrosion-depth result 53 is stored in at least one of RAM 4, hard disk drive 5, and portable storage medium 7*m*. Exceedance-probability-of-corrosion-depth result 53 is displayed on monitor 8*b*.

<Buried Piping Replacement Period Prediction Method>

With reference to FIG. 21 to FIG. 24, a buried piping replacement period prediction method of this embodiment is described.

Figure 21:
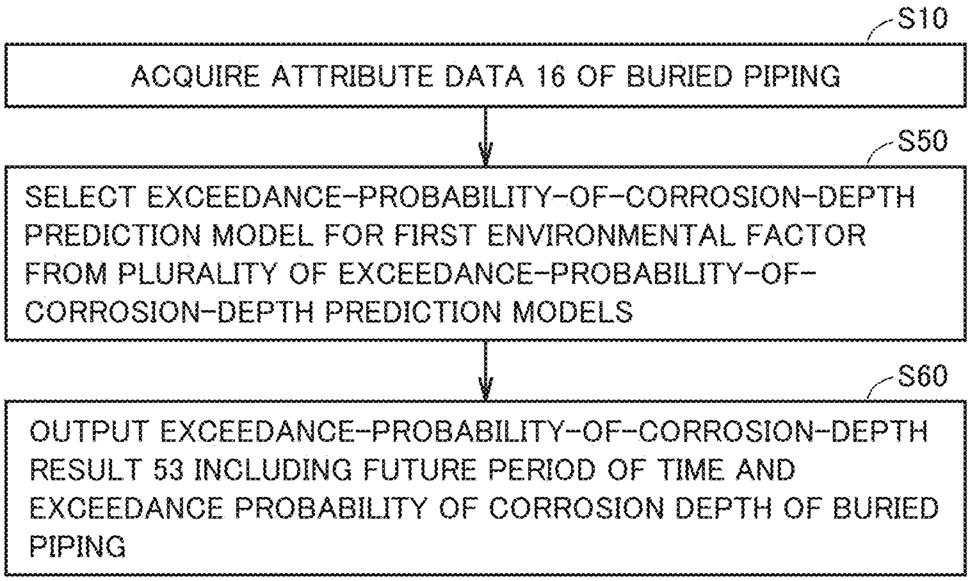
FIG. 21 is a diagram showing a flowchart of a buried piping replacement period prediction method of Embodiment 1.

With reference to FIG. 21, the buried piping replacement period prediction method of this embodiment includes a step of acquiring attribute data 16 of the buried piping (S10). As shown in FIG. 3, attribute data 16 of the buried piping includes the pipeline number, the first environmental factor, first burial period of time $T_1$, and the allowable corrosion depth of the buried piping, for example.

Figure 22:
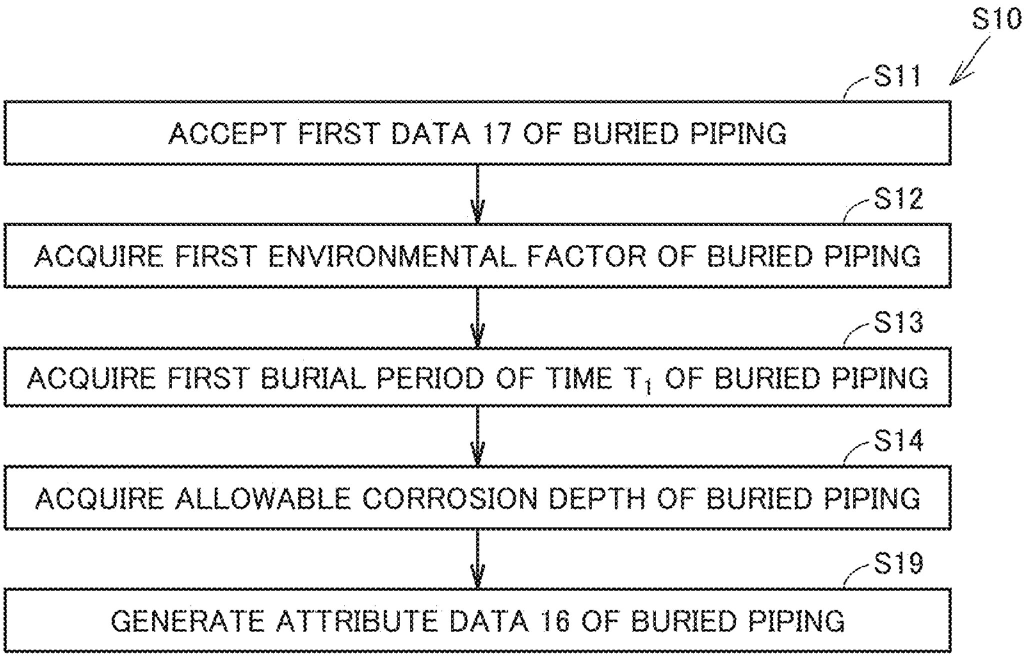
FIG. 22 is a diagram showing a flowchart of steps for acquiring attribute data of the buried piping of Embodiment 1.

With reference to FIG. 22, the step of acquiring attribute data 16 of the buried piping (S10) includes a step of accepting first data 17 of the buried piping (S11), a step of acquiring the first environmental factor of the buried piping (S12), a step of acquiring first burial period of time $T_1$ of the buried piping (S13), a step of acquiring the allowable corrosion depth of the buried piping (S14), and a step of generating attribute data 16 of the buried piping (S19), for example.

In the step of accepting first data 17 of the buried piping (S11), buried piping data acceptance unit 11 accepts first data 17 (see FIG. 4) of the buried piping provided from the customer. First data 17 of the buried piping may be stored in portable storage medium 7*m* provided from the customer, for example.

First data 17 of the buried piping may be stored in hard disk drive 5 in advance, for example.

In the step of acquiring the first environmental factor of the buried piping (S12), buried piping attribute data acquisition unit 10 refers to environmental factor database unit 21 (see FIG. 5) and acquires the first environmental factor of the buried piping from the burial place included in first data 17 of the buried piping.

In the step of acquiring first burial period of time $T_1$ of the buried piping (S13), buried piping attribute data acquisition unit 10 calculates first burial period of time $T_1$ by calculating a difference between the current year (the year in which the prediction of the replacement period of the buried piping is executed) and the installation year included in first data 17 of the buried piping.

Figure 23:
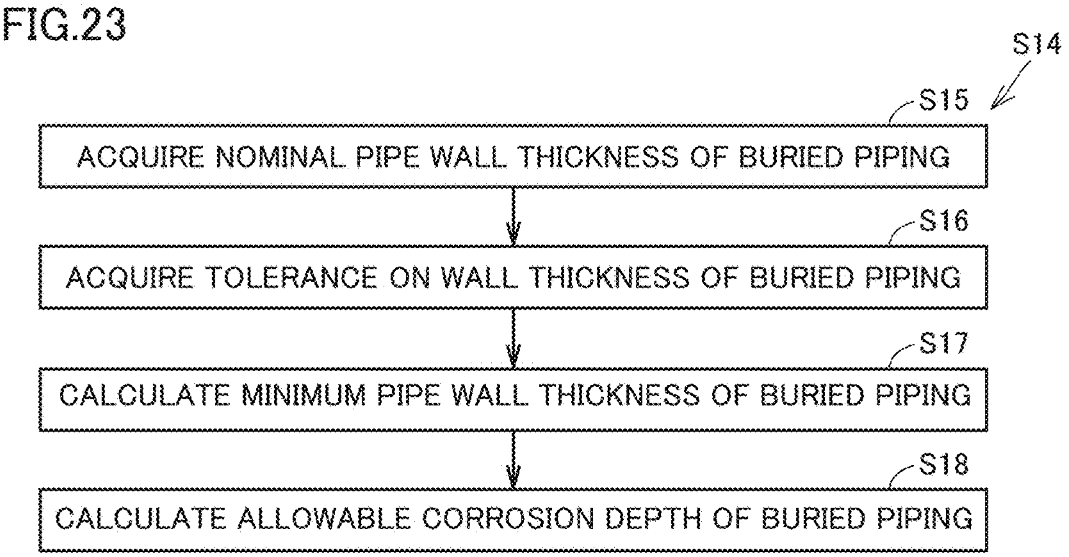
FIG. 23 is a diagram showing a flowchart of steps for acquiring an allowable corrosion depth of the buried piping of Embodiment 1.

With reference to FIG. 23, the step of acquiring the allowable corrosion depth of the buried piping (S14) includes a step of acquiring the nominal pipe wall thickness of the buried piping (S15), a step of acquiring the tolerance on wall thickness of the buried piping (S16), a step of calculating the minimum pipe wall thickness of the buried piping (S17), and a step of calculating the allowable corrosion depth of the buried piping (S18), for example.

In the step of acquiring the nominal pipe wall thickness of the buried piping (S15), buried piping attribute data acquisition unit 10 refers to nominal-pipe-wall-thickness database unit 22 (see FIG. 6) and acquires the nominal pipe wall thickness of the buried piping from the installation year, the nominal diameter, the type of joint, and the type of the pipe wall thickness of the buried piping included in first data 17 (see FIG. 4) of the buried piping.

In the step of acquiring the tolerance on wall thickness of the buried piping (S16), buried piping attribute data acquisition unit 10 refers to tolerance-on-wall-thickness database unit 23 and acquires a tolerance on wall thickness of the buried piping. In the first example, as shown in FIG. 7, data table 43 on which the nominal pipe wall thickness and the tolerance on wall thickness of the piping are caused to correspond to each other is stored in tolerance-on-wall-thickness database unit 23. Buried piping attribute data acquisition unit 10 acquires the tolerance on wall thickness of the buried piping from the nominal pipe wall thickness of the buried piping. In a second example, a data table on which the type of the pipe wall thickness and the tolerance on wall thickness are caused to correspond to each other is stored in tolerance-on-wall-thickness database unit 23. Buried piping attribute data acquisition unit 10 acquires the tolerance on wall thickness of the buried piping from the type of the pipe wall thickness of the buried piping. In a third example, a data table on which the nominal diameter and the tolerance on wall thickness are caused to correspond to each other is stored in tolerance-on-wall-thickness database unit 23. Buried piping attribute data acquisition unit 10 acquires the tolerance on wall thickness of the buried piping from the nominal diameter of the buried piping.

In the step of calculating the minimum pipe wall thickness of the buried piping (S17), minimum-pipe-wall-thickness calculation unit 12 calculates the minimum pipe wall thickness of the buried piping from first data 17 of the buried piping. The minimum pipe wall thickness is a minimum thickness required for the buried piping in order to ensure the minimum required safety for the buried piping.

In the step of calculating the allowable corrosion depth of the buried piping (S18), allowable corrosion depth calculation unit 13 calculates the allowable corrosion depth of the buried piping from the nominal pipe wall thickness, the tolerance on wall thickness, and the minimum pipe wall thickness of the buried piping. Specifically, the allowable corrosion depth of the buried piping is calculated by subtracting the tolerance on wall thickness and the minimum pipe wall thickness from the nominal pipe wall thickness of the buried piping.

With reference to FIG. 22, in the step of generating attribute data 16 of the buried piping (S19), attribute data generator 14 generates attribute data 16 (see FIG. 3) of the buried piping in which the pipeline number of the buried piping, the first environmental factor, first burial period of time $T_1$, and the allowable corrosion depth of the buried piping are caused to correspond to each other. Buried piping attribute data acquisition unit 10 outputs attribute data 16 of the buried piping to buried piping attribute data storage 24. Attribute data 16 of the buried piping is stored in buried piping attribute data storage 24.

When first data 17 of the buried piping includes attribute data 16 of the buried piping, the step of acquiring the first environmental factor of the buried piping (S12) to the step of generating attribute data 16 of the buried piping (S19) may be omitted.

As shown in FIG. 21, the buried piping replacement period prediction method of this embodiment includes a step of selecting an exceedance-probability-of-corrosion-depth prediction model for the first environmental factor from the plurality of exceedance-probability-of-corrosion-depth prediction models stored in exceedance-probability-of-corrosion-depth prediction model storage 26 (S50).

Specifically, exceedance-probability-of-corrosion-depth prediction model selection unit 32 identifies the first environmental factor of the buried piping from buried piping attribute data storage 24. For example, when the exceedance probability of corrosion depth of the buried piping identified by pipeline number ABC-1 (see FIG. 3) is to be acquired, exceedance-probability-of-corrosion-depth prediction model selection unit 32 refers to attribute data 16 of the buried piping stored in buried piping attribute data storage 24 and reads out the first environmental factor corresponding to pipeline number ABC-1.

Then, exceedance-probability-of-corrosion-depth prediction model selection unit 32 selects an exceedance-probability-of-corrosion-depth prediction model for the first environmental factor from the plurality of exceedance-probability-of-corrosion-depth prediction models stored in exceedance-probability-of-corrosion-depth prediction model storage 26. For example, when the exceedance probability of corrosion depth of the buried piping identified by pipeline number ABC-1 (see FIG. 3) is to be acquired, exceedance-probability-of-corrosion-depth prediction model selection unit 32 selects an exceedance-probability-of-corrosion-depth prediction model for sandy soil type (see FIG. 19) from the plurality of exceedance-probability-of-corrosion-depth prediction models stored in exceedance-probability-of-corrosion-depth prediction model storage 26.

As shown in FIG. 21, the buried piping replacement period prediction method of this embodiment includes a step of outputting exceedance-probability-of-corrosion-depth result 53 (S60). As shown in FIG. 20, exceedance-probability-of-corrosion-depth result 53 includes the pipeline number, the future period of time, and the exceedance probability of corrosion depth.

Figure 24:
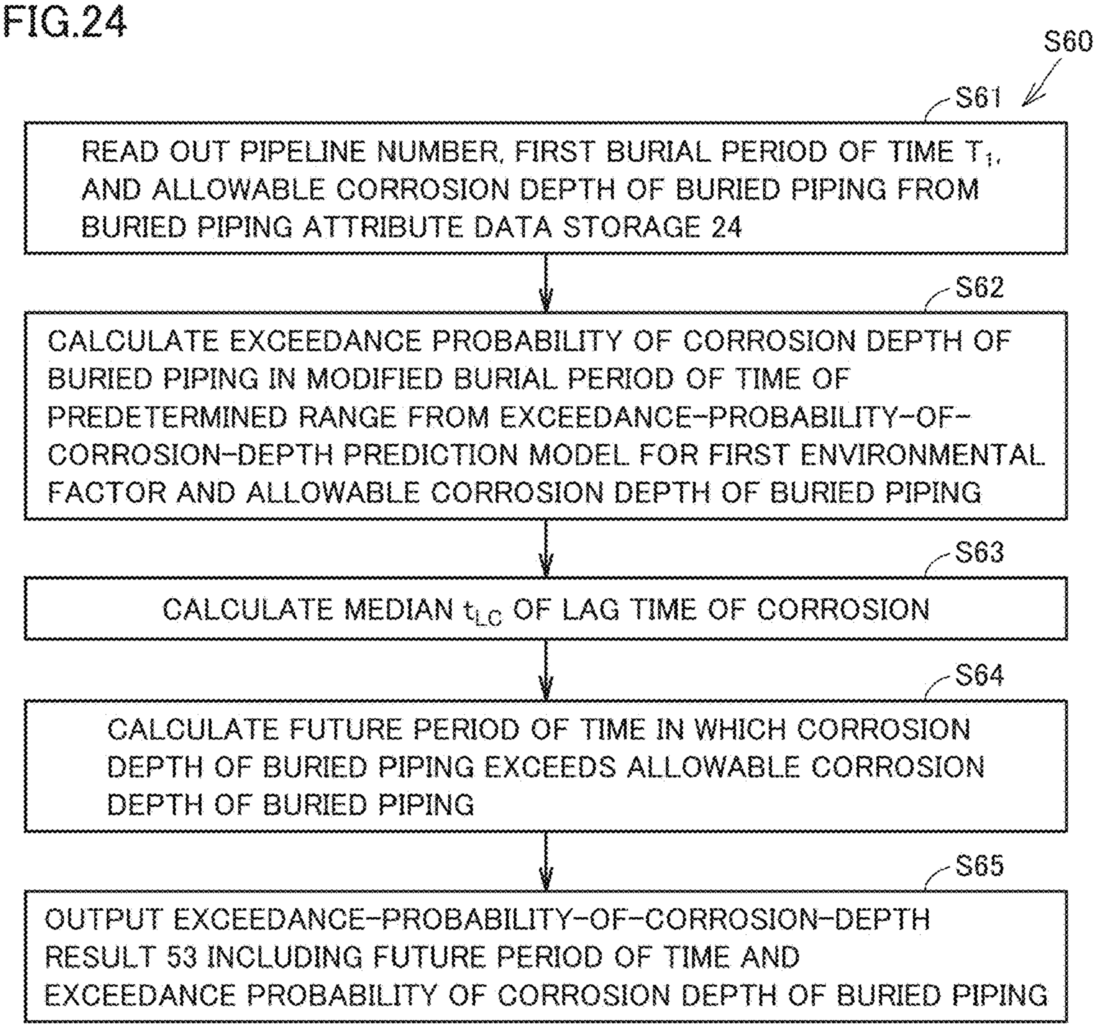
FIG. 24 is a diagram showing a flowchart of steps for calculating the exceedance-probability-of-corrosion-depth result of Embodiment 1.

Specifically, as shown in FIG. 24, exceedance-probability-of-corrosion-depth prediction unit 38 reads out the pipeline number, first burial period of time $T_1$, and the allowable corrosion depth of the buried piping of which exceedance probability of corrosion depth is to be acquired from buried piping attribute data storage 24 (S61). For example, when the exceedance probability of corrosion depth of the buried piping identified by pipeline number ABC-1 (see FIG. 3) is to be acquired, exceedance-probability-of-corrosion-depth prediction unit 38 refers to attribute data 16 of the buried piping stored in buried piping attribute data storage 24, and reads out pipeline number ABC-1, first burial period of time $T_1$ (for example, 32 years) corresponding to pipeline number ABC-1, and the allowable corrosion depth (for example, 6.0 mm) of the buried piping corresponding to pipeline number ABC-1.

As shown in FIG. 24, exceedance-probability-of-corrosion-depth prediction unit 38 calculates the exceedance probability of corrosion depth of the buried piping in the modified burial period of time of the predetermined range from the exceedance-probability-of-corrosion-depth prediction model for the first environmental factor selected by exceedance-probability-of-corrosion-depth prediction model selection unit 32 and the allowable corrosion depth of the buried piping (S62). For example, when the exceedance probability of corrosion depth of the buried piping identified by pipeline number ABC-1 (see FIG. 3) is to be acquired, exceedance-probability-of-corrosion-depth prediction unit 38 calculates an exceedance probability of corrosion depth of the buried piping that is 9% in a modified burial period of time that is 40 years or more and less than 50 years by applying the allowable corrosion depth (6.0 mm) of the buried piping corresponding to pipeline number ABC-1 to the exceedance-probability-of-corrosion-depth prediction model for sandy soil type (see FIG. 19) selected by exceedance-probability-of-corrosion-depth prediction model selection unit 32.

As described above, the modified burial period of time is obtained by subtracting the amount of lag time $t_L$ of corrosion depending on second burial period of time $T_2$ and the reference corrosion depth from second burial period of time $T_2$. A difference between the calculated modified burial period of time and second burial period of time $T_2$ needs to be compensated for in order to calculate a future period of time of the calculated exceedance probability of corrosion depth. The buried piping is already buried during first burial period of time $T_1$ at a time point of calculating the exceedance probability of corrosion depth. The calculated modified burial period of time needs to be adjusted by the amount of first burial period of time $T_1$ in order to calculate the future period of time of the calculated exceedance probability of corrosion depth.

Thus, exceedance-probability-of-corrosion-depth prediction unit 38 calculates median $t_{LC}$ of the lag time of corrosion from the cumulative relative frequency (see FIG. 15) of lag time $t_L$ of corrosion stored in corrosion lag time storage 28 (S63). Specifically, as indicated by a long-dashed short-dashed line in FIG. 15, exceedance-probability-of-corrosion-depth prediction unit 38 calculates a value of lag time $t_L$ of corrosion with which the cumulative relative frequency of lag time $t_L$ of corrosion (FIG. 15) becomes 0.5 as median $t_{LC}$ (for example, 15.5 years) of the lag time of corrosion.

Exceedance-probability-of-corrosion-depth prediction unit 38 saves median $t_{LC}$ of the lag time of corrosion in corrosion lag time storage 28.

Exceedance-probability-of-corrosion-depth prediction unit 38 calculates the future period of time in which the corrosion depth of the buried piping exceeds the allowable corrosion depth of the buried piping by adding median $t_{LC}$ of the lag time of corrosion to the modified burial period of time of which exceedance probability of corrosion depth is calculated and further subtracting first burial period of time $T_1$ of the buried piping therefrom (S64). Specifically, exceedance-probability-of-corrosion-depth prediction unit 38 acquires a future period of time that is 23.5 years or more and less than 33.5 years (FIG. 20) by adding median $t_{LC}$ (15.5 years) of lag time of corrosion for sandy soil type to the modified burial period of time that is 40 years or more and less than 50 years (see FIG. 19) and further subtracting first burial period of time $T_1$ (32 years) of the buried piping corresponding to pipeline number ABC-1 therefrom.

Exceedance-probability-of-corrosion-depth prediction unit 38 generates exceedance-probability-of-corrosion-depth result 53 (see FIG. 20) in which the pipeline number, the future period of time, and the exceedance probability of corrosion depth of the buried piping are caused to correspond to each other. Exceedance-probability-of-corrosion-depth prediction unit 38 outputs exceedance-probability-of-corrosion-depth result 53 including the pipeline number, the future period of time, and the exceedance probability of corrosion depth of the buried piping (S65). Exceedance-probability-of-corrosion-depth result 53 is output to at least one of RAM 4, hard disk drive 5, portable storage medium 7*m*, and monitor 8*b*, for example. Exceedance-probability-of-corrosion-depth result 53 is stored in at least one of RAM 4, hard disk drive 5, and portable storage medium 7*m*. Exceedance-probability-of-corrosion-depth result 53 is displayed on monitor 8*b*.

A program of this embodiment causes processor 2 to execute the buried piping replacement period prediction method of this embodiment. The program that causes processor 2 to execute the buried piping replacement period prediction method of this embodiment is recorded on a computer-readable recording medium (for example, a non-transitory computer-readable recording medium) of this embodiment.

Effects of buried piping replacement period prediction apparatus 1, the buried piping replacement period prediction method, the program, and the computer-readable recording medium of this embodiment are described.

Buried piping replacement period prediction apparatus 1 of this embodiment includes buried piping attribute data acquisition unit 10 and exceedance-probability-of-corrosion-depth prediction unit 38. Buried piping attribute data acquisition unit 10 acquires attribute data 16 of the buried piping. Attribute data 16 includes the first environmental factor, first burial period of time $T_1$, and the allowable corrosion depth of the buried piping. Exceedance-probability-of-corrosion-depth prediction unit 38 calculates the exceedance probability of corrosion depth of the buried piping that is the probability of the corrosion depth of the buried piping exceeding the allowable corrosion depth in the future period of time from the exceedance-probability-of-corrosion-depth prediction model for the first environmental factor, first burial period of time $T_1$, and the allowable corrosion depth. Exceedance-probability-of-corrosion-depth prediction unit 38 outputs the future period of time and the exceedance probability of corrosion depth of the buried piping. Reference data 18 of the plurality of pieces of reference piping includes a second environmental factor, second burial period of time $T_2$, and a reference corrosion depth of the plurality of pieces of reference piping. The exceedance-probability-of-corrosion-depth prediction model is a model that predicts the exceedance probability of corrosion depth of the buried piping in a future period of time. The exceedance-probability-of-corrosion-depth prediction model is generated on the basis of reference data 18 having the second environmental factor that is same as the first environmental factor and lag time $t_L$ of corrosion. Lag time $t_L$ of corrosion is a period of time from when the plurality of pieces of reference piping are buried to when the plurality of pieces of reference piping start corroding. Lag time $t_L$ of corrosion is calculated in accordance with second burial period of time $T_2$ and the reference corrosion depth from reference data 18 having the second environmental factor that is same as the first environmental factor.

As above, in buried piping replacement period prediction apparatus 1, the exceedance probability of corrosion depth of the buried piping in the future period of time is calculated with use of the exceedance-probability-of-corrosion-depth prediction model generated on the basis of reference data 18 and lag time $t_L$ of corrosion. According to buried piping replacement period prediction apparatus 1, the replacement period of the buried piping can be predicted more accurately. According to buried piping replacement period prediction apparatus 1, the exceedance probability of corrosion depth of the buried piping in the future period of time that makes it easy for the customer to draw up a replacement plan for the buried piping can be provided to the customer.

The buried piping replacement period prediction method of this embodiment includes a step of acquiring attribute data 16 of the buried piping by buried piping attribute data acquisition unit 10 (S10). Attribute data 16 includes the first environmental factor, first burial period of time $T_1$, and the allowable corrosion depth of the buried piping. The buried piping replacement period prediction method of this embodiment includes a step of outputting the future period of time and the exceedance probability of corrosion depth of the buried piping by calculating the exceedance probability of corrosion depth of the buried piping that is the probability of the corrosion depth of the buried piping exceeding the allowable corrosion depth in the future period of time from the exceedance-probability-of-corrosion-depth prediction model for the first environmental factor, first burial period of time $T_1$, and the allowable corrosion depth by exceedance-probability-of-corrosion-depth prediction unit 38 (S60). Reference data 18 of the plurality of pieces of reference piping includes a second environmental factor, second burial period of time $T_2$, and a reference corrosion depth of the plurality of pieces of reference piping. The exceedance-probability-of-corrosion-depth prediction model is a model that predicts the exceedance probability of corrosion depth of the buried piping in a future period of time. The exceedance-probability-of-corrosion-depth prediction model is generated on the basis of reference data 18 having the second environmental factor that is same as the first environmental factor and lag time $t_L$ of corrosion. Lag time $t_L$ of corrosion is a period of time from when the plurality of pieces of reference piping are buried to when the plurality of pieces of reference piping start corroding. Lag time $t_L$ of corrosion is calculated in accordance with second burial period of time $T_2$ and the reference corrosion depth from reference data 18 having the second environmental factor that is same as the first environmental factor.

As above, in the buried piping replacement period prediction method of this embodiment, the exceedance probability of corrosion depth of the buried piping in the future period of time is calculated with use of the exceedance-probability-of-corrosion-depth prediction model generated on the basis of reference data 18 and lag time $t_L$ of corrosion. According to the buried piping replacement period prediction method of this embodiment, the replacement period of the buried piping can be predicted more accurately. According to the buried piping replacement period prediction method of this embodiment, the exceedance probability of corrosion depth of the buried piping in the future period of time that makes it easy for the customer to draw up a replacement plan for the buried piping can be provided to the customer.

The program of this embodiment causes processor 2 to execute each step of the buried piping replacement period prediction method of this embodiment. The program of this embodiment is recorded on the computer-readable recording medium of this embodiment. According to the program and the computer-readable recording medium of this embodiment, the replacement period of the buried piping can be predicted more accurately.

Embodiment 2

Figure 25:
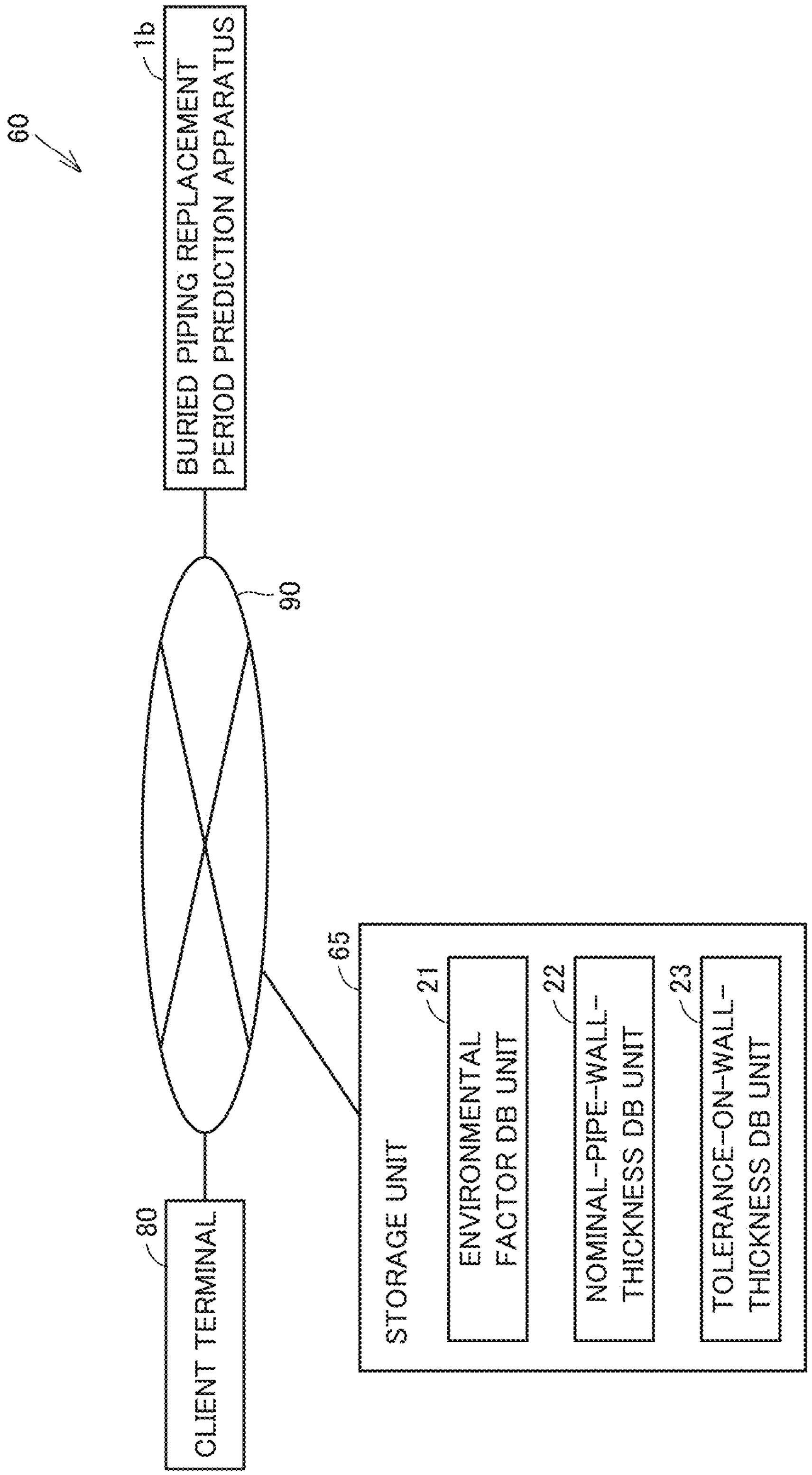
FIG. 25 is a block diagram describing a functional configuration of a buried piping replacement period prediction system of Embodiment 2.
Figure 26:
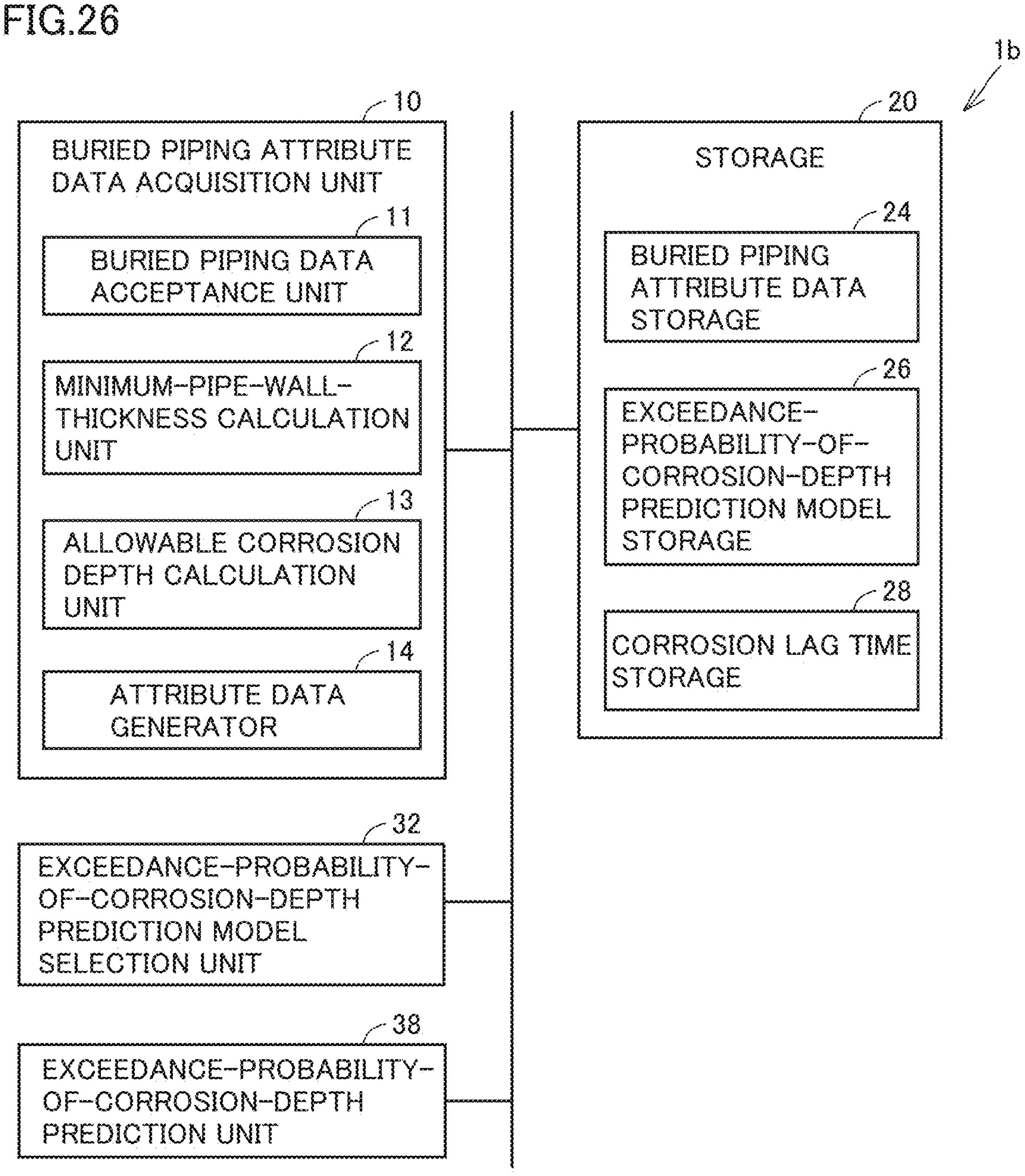
FIG. 26 is a block diagram describing a functional configuration of a buried piping replacement period prediction apparatus of Embodiment 2.

With reference to FIG. 25 and FIG. 26, a buried piping replacement period prediction apparatus 1*b* of Embodiment 2 is described. Buried piping replacement period prediction apparatus 1*b* of this embodiment includes a configuration similar to that of buried piping replacement period prediction apparatus 1 of Embodiment 1, but is mainly different from buried piping replacement period prediction apparatus 1 of Embodiment 1 in the following points.

As shown in FIG. 25, buried piping replacement period prediction apparatus 1*b* is communicably connected to a client terminal 80 over a communication network 90 such as the Internet. Buried piping replacement period prediction apparatus 1*b* is a personal computer (PC) terminal or a server, for example. Buried piping replacement period prediction apparatus 1*b* receives first data 17 (see FIG. 4) of the buried piping from client terminal 80 via communication network 90 such as the Internet.

Figure 27:
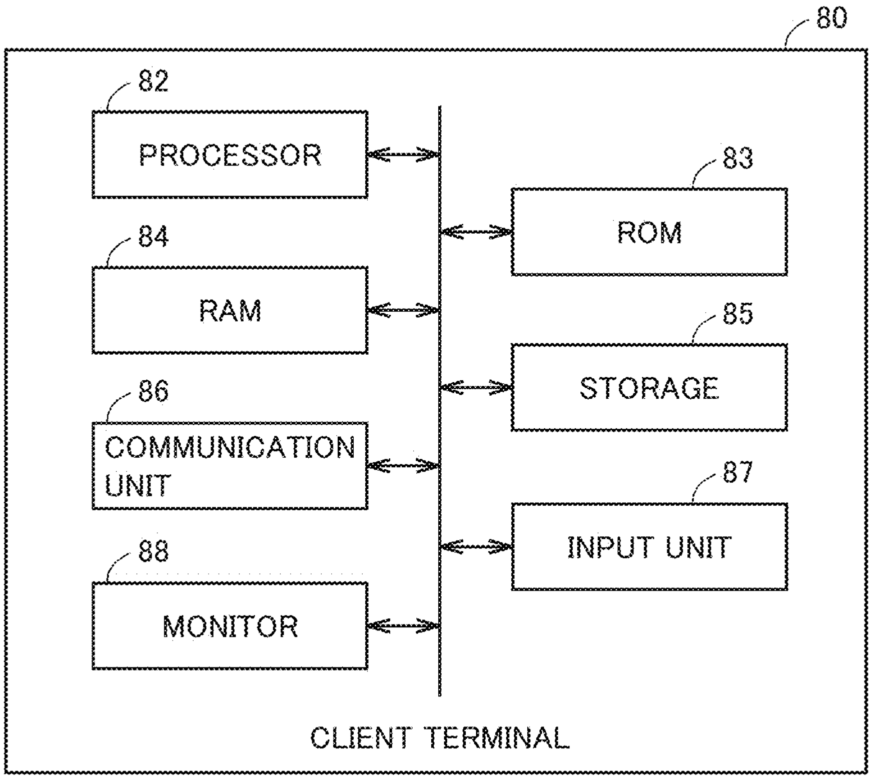
FIG. 27 is a schematic diagram showing a hardware configuration of a client terminal of Embodiment 2.

With reference to FIG. 27, a hardware configuration of client terminal 80 is described. Client terminal 80 is a personal computer (PC) terminal or a mobile terminal such as a smartphone or a tablet terminal, for example. Specifically, client terminal 80 includes a processor 82 (for example, a CPU), a ROM 83, a RAM 84, a storage 85, a communication unit 86, an input unit 87, and a monitor 88. Processor 82 is an arithmetic device that functions as a control device of client terminal 80. ROM 83 stores therein a program to be executed by processor 82 and the like in a non-volatile manner. RAM 84 functions as a working area when the program is executed by processor 82.

Storage 85 is a hard disk drive or a flash memory, for example. Storage 85 stores therein first data 17 (see FIG. 4) of the buried piping. Communication unit 86 is used by client terminal 80 to perform communication with buried piping replacement period prediction apparatus 1*b* over communication network 90. First data 17 (see FIG. 4) of the buried piping stored in storage 85 is transmitted to buried piping replacement period prediction apparatus 1*b* from communication unit 86 via communication network 90. Input unit 87 includes a mouse, a keyboard, or a touch screen, for example. Monitor 88 is a liquid crystal display, for example.

With reference to FIG. 25, a storage unit 65 includes environmental factor database unit 21, nominal-pipe-wall-thickness database unit 22, and tolerance-on-wall-thickness database unit 23. With reference to FIG. 26, storage 20 of buried piping replacement period prediction apparatus 1*b* is similar to storage 20 of buried piping replacement period prediction apparatus 1 of Embodiment 1 but does not include environmental factor database unit 21, nominal-pipe-wall-thickness database unit 22, and tolerance-on-wall-thickness database unit 23.

Figure 34:
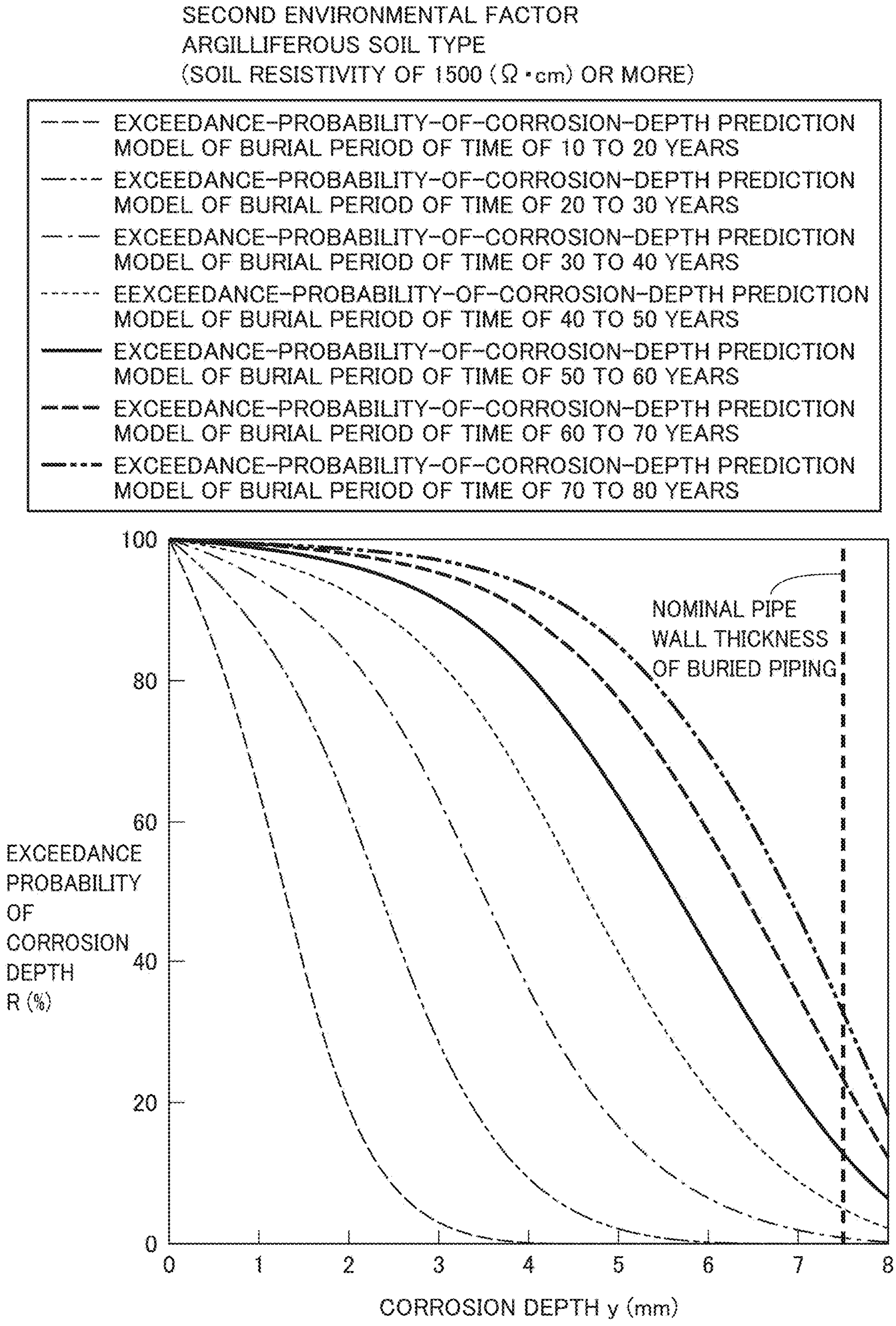
FIG. 34 is a diagram showing a plurality of exceedance-probability-of-corrosion-depth prediction models (for argilliferous soil type) of Embodiment 4.

With reference to FIG. 25 and FIG. 34, buried piping data acceptance unit 11 receives first data 17 (see FIG. 4) of the buried piping from client terminal 80 via communication network 90. Exceedance-probability-of-corrosion-depth prediction unit 38 transmits exceedance-probability-of-corrosion-depth result 53 (see FIG. 20) to client terminal 80 via communication network 90. Client terminal 80 receives exceedance-probability-of-corrosion-depth result 53. Exceedance-probability-of-corrosion-depth result 53 is stored in storage 85 (see FIG. 27). Exceedance-probability-of-corrosion-depth result 53 is displayed on monitor 88 (see FIG. 27).

In this embodiment, buried piping replacement period prediction apparatus 1*b* and storage unit 65 configure a buried piping replacement period prediction system 60.

A buried piping replacement period prediction method of this embodiment is described. The buried piping replacement period prediction method of this embodiment includes steps similar to those of the buried piping replacement period prediction method of Embodiment 1 but is mainly different from the buried piping replacement period prediction method of Embodiment 1 in the following points.

In the step of accepting first data 17 of the buried piping (S11), buried piping data acceptance unit 11 receives first data 17 (see FIG. 4) of the buried piping from client terminal 80 via communication network 90.

In the step of acquiring the first environmental factor of the buried piping (S12), buried piping attribute data acquisition unit 10 refers to environmental factor database unit 21 included in storage unit 65 via communication network 90. Buried piping attribute data acquisition unit 10 acquires the first environmental factor of the buried piping from the burial place included in first data 17 (see FIG. 4) of the buried piping.

In the step of acquiring the nominal pipe wall thickness of the buried piping (S15), buried piping attribute data acquisition unit 10 refers to nominal-pipe-wall-thickness database unit 22 included in storage unit 65 via communication network 90. Buried piping attribute data acquisition unit 10 acquires the nominal pipe wall thickness of the buried piping from the installation year, the nominal diameter, the type of joint, and the type of the pipe wall thickness of the buried piping included in first data 17 (see FIG. 4) of the buried piping.

In the step of acquiring the tolerance on wall thickness of the buried piping (S16), buried piping attribute data acquisition unit 10 refers to tolerance-on-wall-thickness database unit 23 included in storage unit 65 via communication network 90 and acquires the tolerance on wall thickness of the buried piping.

In the step of outputting exceedance-probability-of-corrosion-depth result 53 (S60), exceedance-probability-of-corrosion-depth prediction unit 38 transmits exceedance-probability-of-corrosion-depth result 53 (see FIG. 20) to client terminal 80 via communication network 90. Client terminal 80 receives exceedance-probability-of-corrosion-depth result 53. Exceedance-probability-of-corrosion-depth result

53 is stored in storage 85 (see FIG. 27). Exceedance-probability-of-corrosion-depth result 53 is displayed on monitor 88 (see FIG. 27).

The program of this embodiment causes processor 2 to execute the buried piping replacement period prediction method of this embodiment. The program that causes processor 2 to execute the buried piping replacement period prediction method of this embodiment is recorded on a computer-readable recording medium (for example, a non-transitory computer-readable recording medium) of this embodiment.

Buried piping replacement period prediction apparatus 1*b*, the buried piping replacement period prediction method, the program, and the computer-readable recording medium of this embodiment exhibit effects similar to those of buried piping replacement period prediction apparatus 1, the buried piping replacement period prediction method, the program, and the computer-readable recording medium of Embodiment 1.

Embodiment 3

Figure 28:
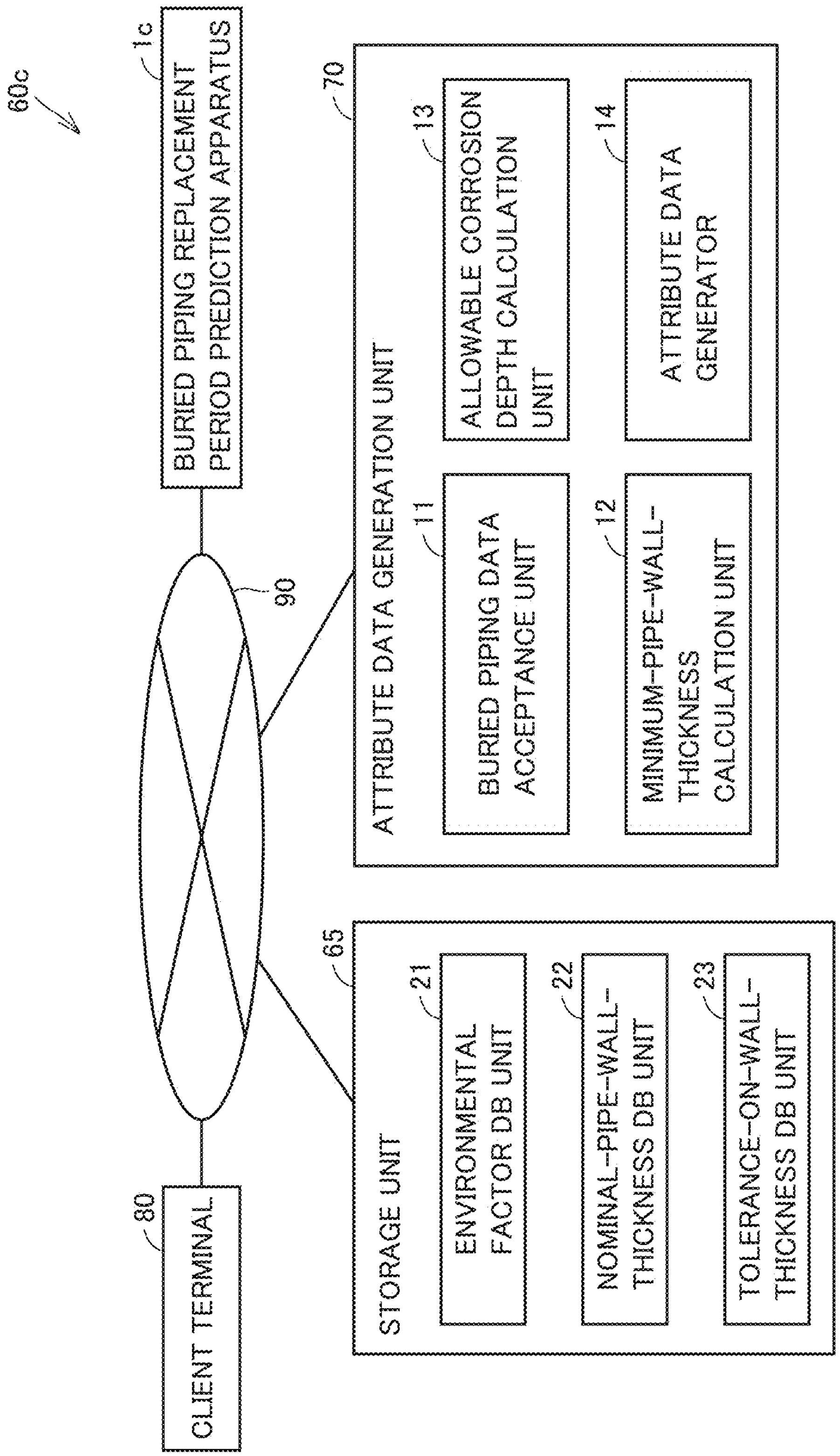
FIG. 28 is a block diagram describing a functional configuration of a buried piping replacement period prediction system of Embodiment 3.
Figure 29:
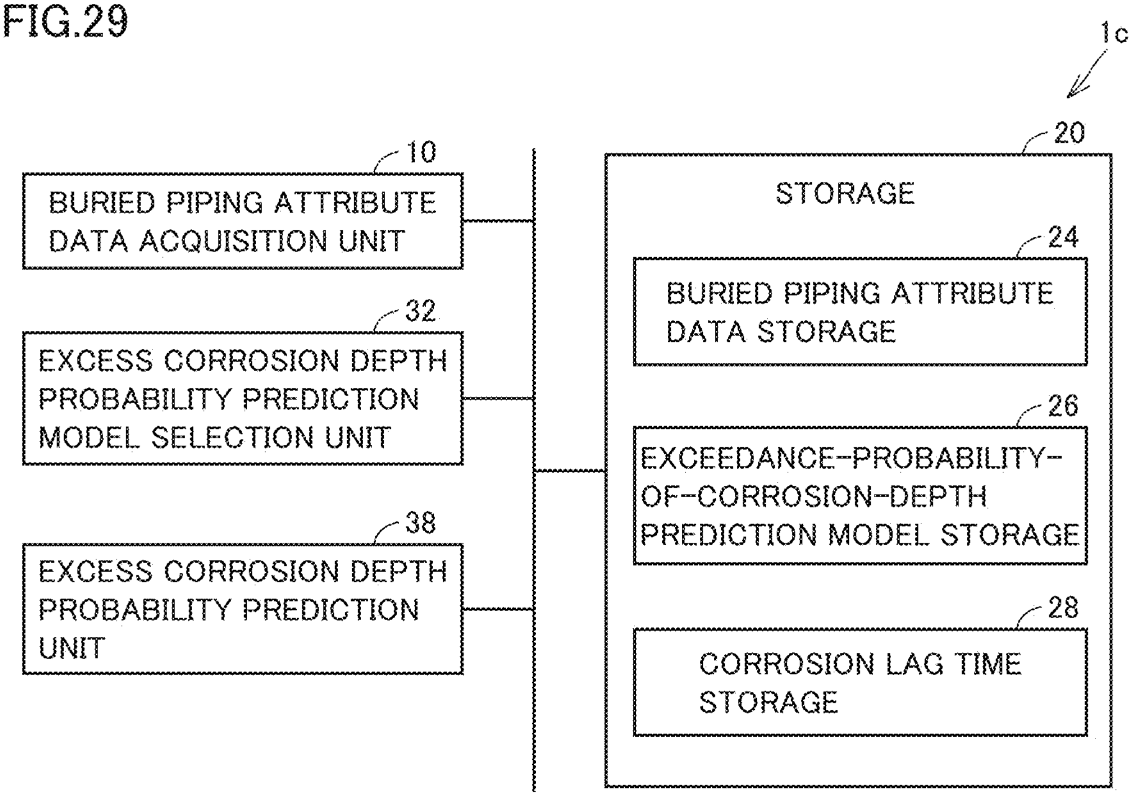
FIG. 29 is a block diagram describing a functional configuration of a buried piping replacement period prediction apparatus of Embodiment 3.

With reference to FIG. 28 and FIG. 29, a buried piping replacement period prediction apparatus 1*c* of Embodiment 3 is described. Buried piping replacement period prediction apparatus 1*c* of this embodiment includes a configuration similar to that of buried piping replacement period prediction apparatus 1*b* of Embodiment 2, but is mainly different from buried piping replacement period prediction apparatus 1*b* of Embodiment 2 in the following points.

As shown in FIG. 29, buried piping replacement period prediction apparatus 1*c* is communicably connected to an attribute data generation unit 70 over communication network 90 such as the Internet. Buried piping replacement period prediction apparatus 1*c* is a personal computer (PC) terminal or a server, for example. Buried piping replacement period prediction apparatus 1*c* is similar to buried piping replacement period prediction apparatus 1*b* of Embodiment 2, but does not include buried piping data acceptance unit 11, allowable corrosion depth calculation unit 13, minimum-pipe-wall-thickness calculation unit 12, and attribute data generator 14.

Exceedance-probability-of-corrosion-depth prediction unit 38 transmits exceedance-probability-of-corrosion-depth result 53 (see FIG. 20) to attribute data generation unit 70 via communication network 90. Attribute data generation unit 70 transmits exceedance-probability-of-corrosion-depth result 53 to client terminal 80 via communication network 90. Attribute data generation unit 70 functions as a transmission/reception server with respect to client terminal 80.

As shown in FIG. 28, attribute data generation unit 70 is communicably connected to buried piping replacement period prediction apparatus 1*c*, storage unit 65, and client terminal 80 over communication network 90. Attribute data generation unit 70 includes buried piping data acceptance unit 11, minimum-pipe-wall-thickness calculation unit 12, allowable corrosion depth calculation unit 13, and attribute data generator 14.

Figure 30:
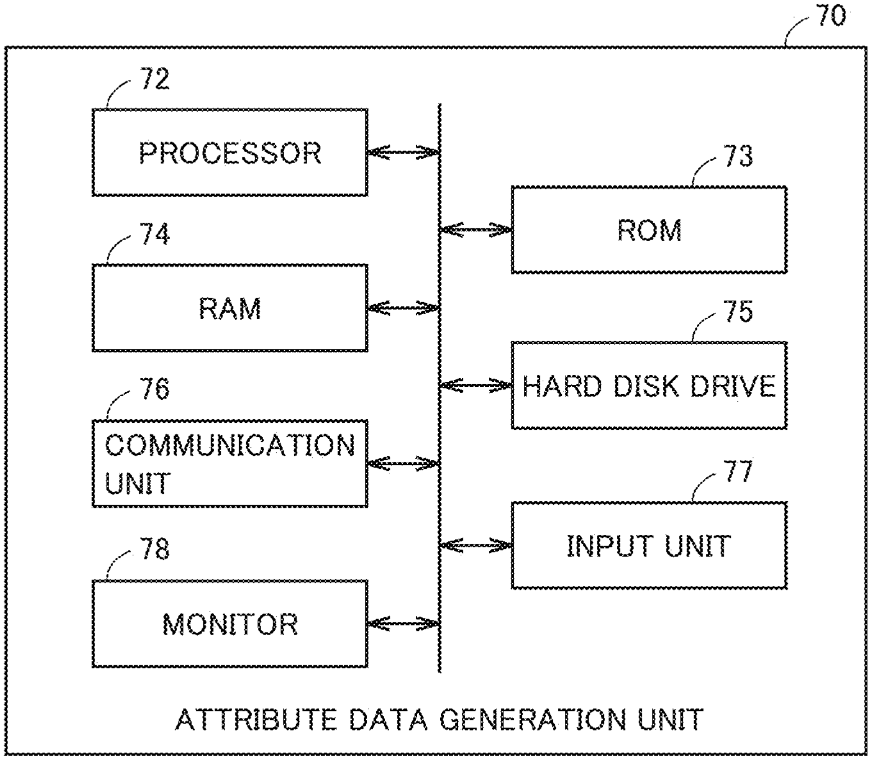
FIG. 30 is a schematic diagram showing a hardware configuration of an attribute data generation unit of Embodiment 3.

With reference to FIG. 30, a hardware configuration of attribute data generation unit 70 is described. Attribute data generation unit 70 is a personal computer (PC) terminal or a server, for example. Specifically, attribute data generation unit 70 includes a processor 72, a ROM 73, a RAM 74, a hard disk drive 75, a communication unit 76, an input unit 77, and a monitor 78. Processor 72 is an arithmetic device that functions as a control device of attribute data generation unit 70. ROM 73 stores therein a program to be executed by processor 72 and the like in a non-volatile manner. RAM 74 functions as a working area when the program is executed by processor 72.

Hard disk drive 75 stores therein first data 17 (see FIG. 4) of the buried piping received from client terminal 80. Hard disk drive 75 stores therein attribute data 16 of the buried piping. Communication unit 76 is used by attribute data generation unit 70 to communicate with buried piping replacement period prediction apparatus 1*c*, storage unit 65, and client terminal 80 over communication network 90. Input unit 77 includes a mouse, a keyboard, or a touch screen, for example. Monitor 78 is a liquid crystal display, for example.

In this embodiment, buried piping replacement period prediction apparatus 1*c*, storage unit 65, and attribute data generator 70 configure a buried piping replacement period prediction system 60*c*.

A buried piping replacement period prediction method of this embodiment is described. The buried piping replacement period prediction method of this embodiment includes steps similar to those of the buried piping replacement period prediction method of Embodiment 2 but is mainly different from the buried piping replacement period prediction method of Embodiment 2 in the following points.

In the buried piping replacement period prediction method of this embodiment, the step of acquiring attribute data 16 of the buried piping (S10) is performed by attribute data generation unit 70. In other words, the step of accepting first data 17 of the buried piping (S11), the step of acquiring the first environmental factor of the buried piping (S12), the step of acquiring first burial period of time $T_1$ of the buried piping (S13), the step of acquiring the allowable corrosion depth of the buried piping (S14), and the step of generating attribute data 16 of the buried piping (S19) are performed by attribute data generation unit 70. Attribute data 16 of the buried piping is generated by attribute data generation unit 70. Attribute data generation unit 70 transmits attribute data 16 of the buried piping to buried piping replacement period prediction apparatus 1*c* via communication network 90. Buried piping attribute data acquisition unit 10 included in buried piping replacement period prediction apparatus 1*c* receives attribute data 16 of the buried piping from attribute data generation unit 70 via communication network 90.

In the step of outputting exceedance-probability-of-corrosion-depth result 53 (S60), exceedance-probability-of-corrosion-depth prediction unit 38 transmits exceedance-probability-of-corrosion-depth result 53 (see FIG. 20) to attribute data generation unit 70 via communication network 90. Attribute data generation unit 70 transmits exceedance-probability-of-corrosion-depth result 53 to client terminal 80 via communication network 90.

The program of this embodiment causes processor 2 to execute the buried piping replacement period prediction method of this embodiment. The program that causes processor 2 to execute the buried piping replacement period prediction method of this embodiment is recorded on a computer-readable recording medium (for example, a non-transitory computer-readable recording medium) of this embodiment.

Exceedance-probability-of-corrosion-depth prediction model storage 26 and corrosion lag time storage 28 are included in storage 20 of buried piping replacement period prediction apparatus 1*c* in this embodiment, but exceedance-probability-of-corrosion-depth prediction model storage 26 and corrosion lag time storage 28 may be included in storage unit 65.

Buried piping attribute data acquisition unit 10, exceedance-probability-of-corrosion-depth prediction model selection unit 32, and exceedance-probability-of-corrosion-depth prediction unit 38 are implemented in one computer device in this embodiment, but buried piping attribute data acquisition unit 10, exceedance-probability-of-corrosion-depth prediction model selection unit 32, and exceedance-probability-of-corrosion-depth prediction unit 38 may be implemented in a plurality of computer devices and those plurality of computers may be communicably connected to each other over communication network 90. In other words, a plurality of computers in which buried piping attribute data acquisition unit 10, exceedance-probability-of-corrosion-depth prediction model selection unit 32, and exceedance-probability-of-corrosion-depth prediction unit 38 are implemented may configure a buried piping replacement period prediction subsystem. Buried piping replacement period prediction apparatus 1*c* of the present specification also includes such buried piping replacement period prediction subsystem.

Buried piping replacement period prediction apparatus 1*c*, the buried piping replacement period prediction method, the program, and the computer-readable recording medium of this embodiment exhibit effects similar to those of buried piping replacement period prediction apparatus 1, the buried piping replacement period prediction method, the program, and the computer-readable recording medium of Embodiment 1.

Embodiment 4

With reference to FIG. 31 to FIG. 44, a buried piping replacement period prediction apparatus 1*d* and a buried piping replacement period prediction method of Embodiment 4 are described. Buried piping replacement period prediction apparatus 1*d* of this embodiment has a configuration similar to that of buried piping replacement period prediction apparatus 1 of Embodiment 1, and the buried piping replacement period prediction method of this embodiment includes steps similar to those of the buried piping replacement period prediction method of Embodiment 1. However, buried piping replacement period prediction apparatus 1*d* and the buried piping replacement period prediction method of this embodiment are mainly different from buried piping replacement period prediction apparatus 1 and the buried piping replacement period prediction method of Embodiment 1 in the following points.

Figure 31:
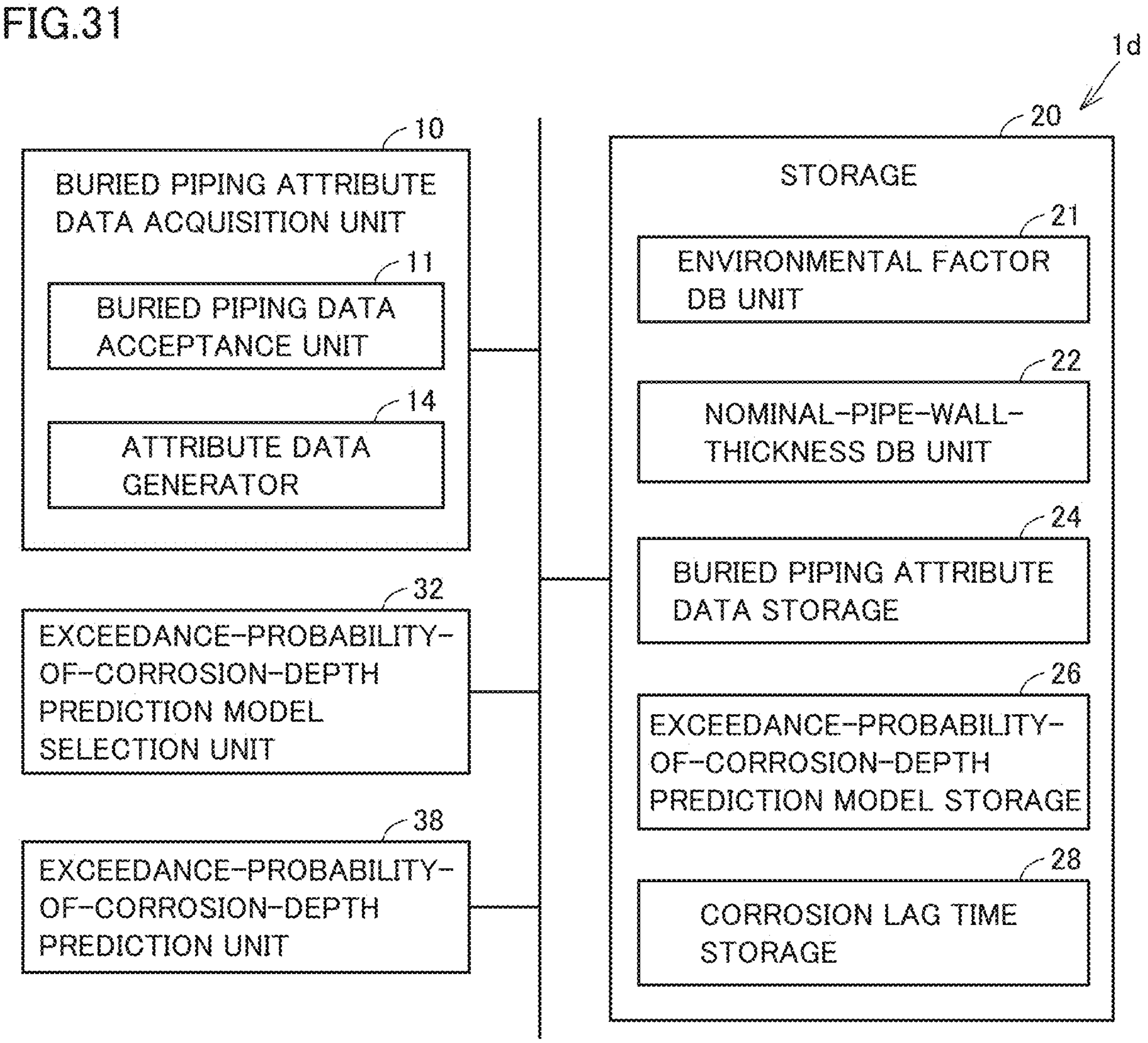
FIG. 31 is a block diagram describing a functional configuration of a buried piping replacement period prediction apparatus of Embodiment 4.

With reference to FIG. 31, in buried piping replacement period prediction apparatus 1*d*, buried piping attribute data acquisition unit 10 does not include minimum-pipe-wall-thickness calculation unit 12 (see FIG. 2) and allowable corrosion depth calculation unit 13 (see FIG. 2). Storage 20 does not include tolerance-on-wall-thickness database unit 23 (see FIG. 2).

Attribute data generator 14 generates attribute data 16 of the buried piping from first data 17 (see FIG. 4) of the buried piping provided from the customer, environmental factor database unit 21, and nominal-pipe-wall-thickness database unit 22. With reference to FIG. 32, attribute data 16 of the buried piping includes the pipeline number, the first environmental factor, first burial period of time $T_1$, and the nominal pipe wall thickness of the buried piping, for example.

Buried piping attribute data acquisition unit 10 (attribute data generator 14) refers to nominal-pipe-wall-thickness database unit 22 and acquires the nominal pipe wall thickness of the buried piping from the installation year, the nominal diameter, the type of joint, and the type of the pipe wall thickness of the buried piping included in first data 17 of the buried piping. Buried piping attribute data acquisition unit 10 (attribute data generator 14) calculates a difference between the installation year of the buried piping included in first data 17 and the current year (the year in which the prediction of the replacement period of the buried piping is executed) stored in storage 20 as first burial period of time $T_1$. Buried piping attribute data acquisition unit 10 (attribute data generator 14) outputs attribute data 16 of the buried piping to buried piping attribute data storage 24. Attribute data 16 of the buried piping is stored in buried piping attribute data storage 24.

Exceedance-probability-of-corrosion-depth prediction unit 38 calculates the exceedance probability of corrosion depth of the buried piping in a certain period (for example, the current year, a future year, or a future period of time) from the exceedance-probability-of-corrosion-depth prediction model selected by exceedance-probability-of-corrosion-depth prediction model selection unit 32, and first burial period of time $T_1$ and the nominal pipe wall thickness of the buried piping included in attribute data 16 of the buried piping.

Figure 33:
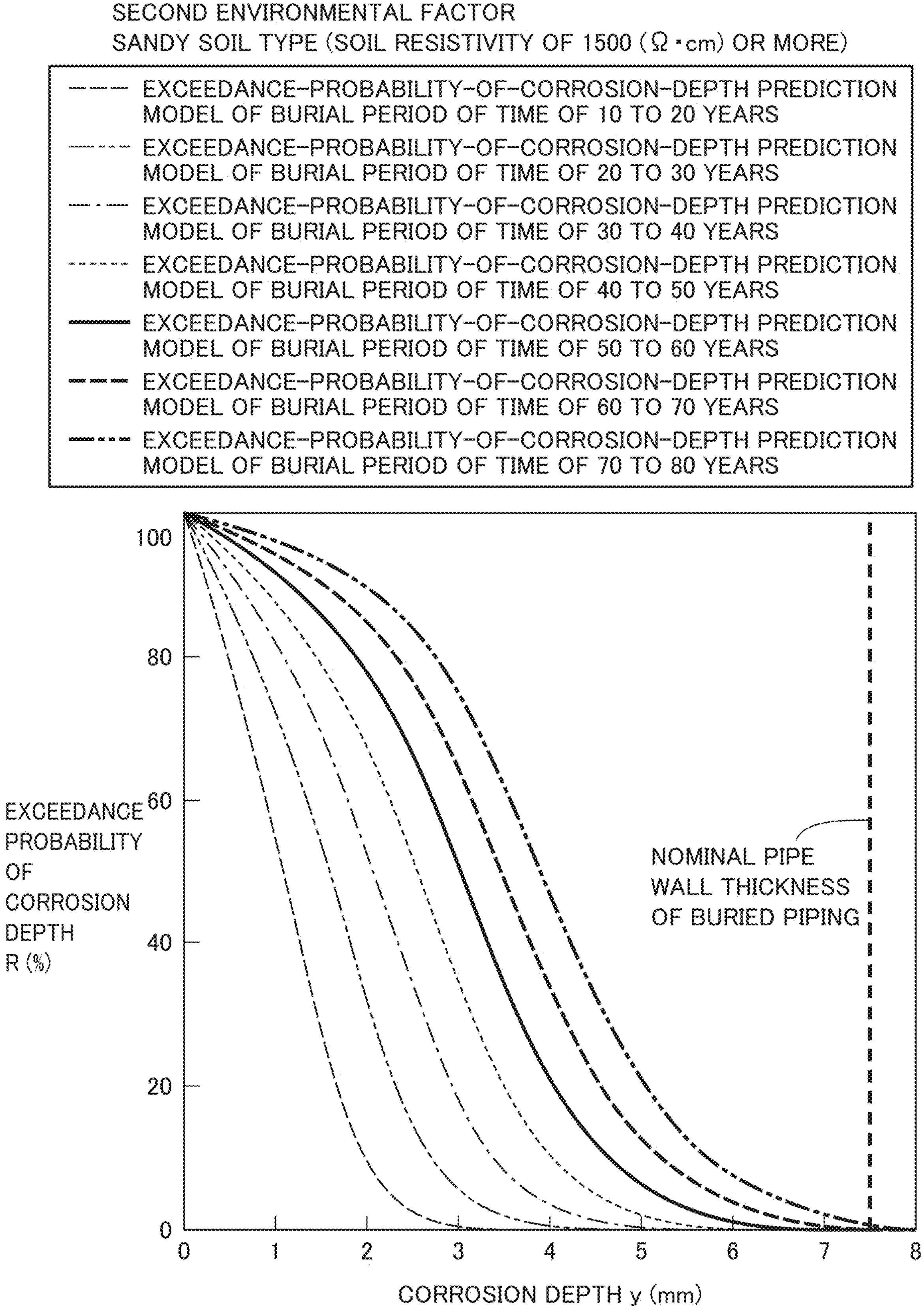
FIG. 33 is a diagram showing a plurality of exceedance-probability-of-corrosion-depth prediction models (for sandy soil type) of Embodiment 4.

Exceedance-probability-of-corrosion-depth prediction model storage 26 (see FIG. 31) store therein a plurality of exceedance-probability-of-corrosion-depth prediction models exemplified in FIG. 33 and FIG. 34. Exceedance-probability-of-corrosion-depth prediction model storage 26 stores therein an exceedance-probability-of-corrosion-depth prediction model for silty soil type (not shown) and an exceedance-probability-of-corrosion-depth prediction model for low-specific-resistance soil type (not shown) having a soil resistivity less than 1500 Ω·cm in addition to exceedance-probability-of-corrosion-depth prediction models for sandy soil type (see FIG. 33) and exceedance-probability-of-corrosion-depth prediction models for argilliferous soil type (see FIG. 34), for example.

Figure 36:
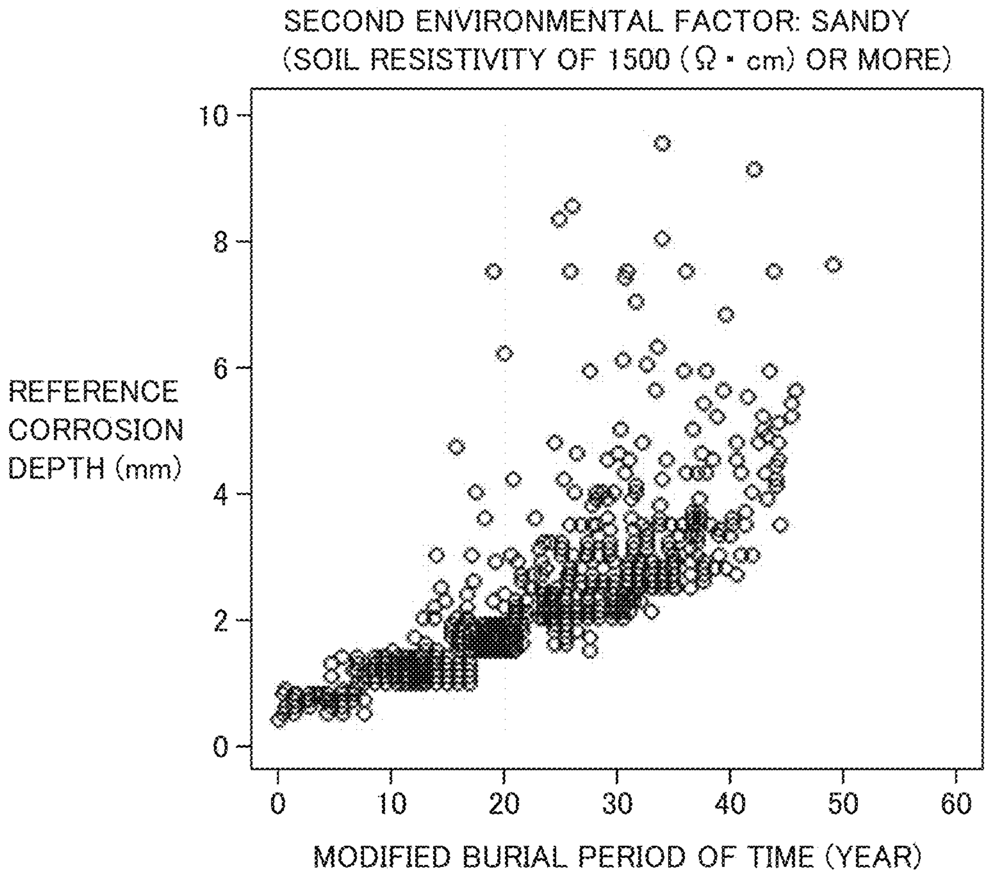
FIG. 36 is a diagram showing modified reference data (a relationship between a modified burial period of time and a reference corrosion depth of the plurality of pieces of reference piping) of Embodiment 4.

The plurality of exceedance-probability-of-corrosion-depth prediction models are generated from modified reference data (see FIG. 36). In the modified reference data (see FIG. 36) of this embodiment, data of which reference depth is 0 mm is deleted from the modified reference data (see FIG. 17) of Embodiment 1. The modified reference data includes the modified burial period of time and the reference corrosion depth.

Figure 35:
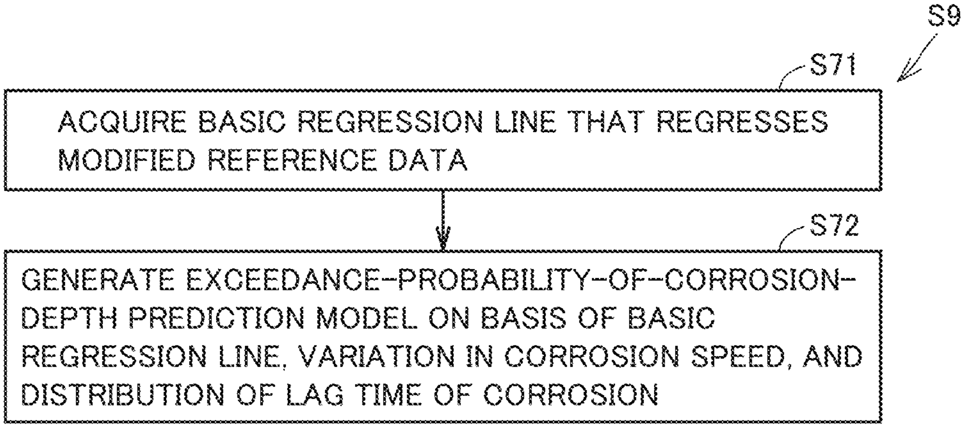
FIG. 35 is a diagram showing a flowchart of steps for acquiring the exceedance-probability-of-corrosion-depth prediction model of Embodiment 4.

With reference to FIG. 35, one example of the step of acquiring the exceedance-probability-of-corrosion-depth prediction model for sandy soil type (S9) is described.

Processor 2 (see FIG. 1) acquires a basic regression line that regresses the modified reference data (S71). As one example, the basic regression line is acquired by regressing the modified reference data by an exponential model expressed by Expression (4).

$$y=jt^k \quad (4)$$

Here, y represents the reference corrosion depth of the reference piping, j, k represents coefficients, and t represents the modified burial period of time of the reference piping.

Figure 37:
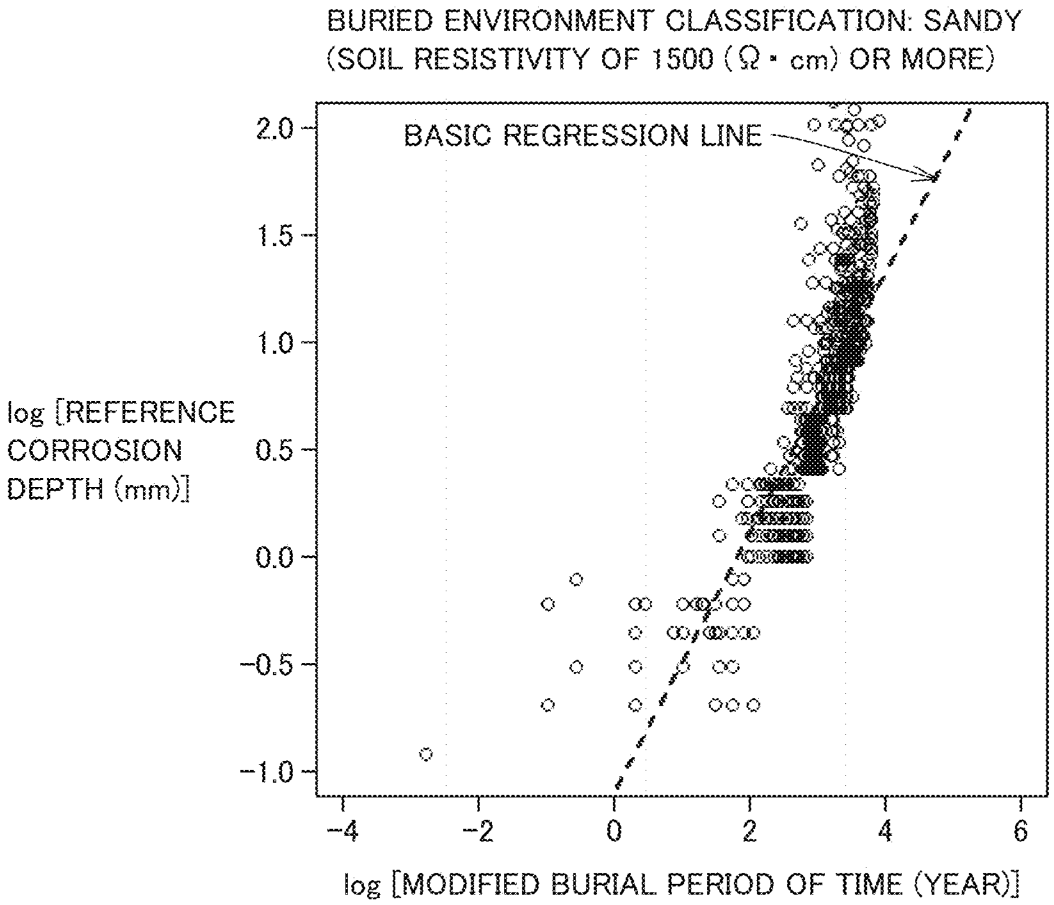
FIG. 37 is a diagram showing the modified reference data and a basic regression line of Embodiment 4.

Specifically, a logarithm of the modified burial period of time and a logarithm of the reference corrosion depth are calculated, to thereby acquire log-log data of the modified reference data (see FIG. 37). Expression (5) is acquired as a double logarithmic relational expression of Expression (4).

$$\log y=\log j+k\times\log t \quad (5)$$

A basic regression line is acquired by regressing log-log data of the modified reference data by Expression (5) with use of a least squares method (see FIG. 37). With reference to FIG. 37, there is a large number of the modified reference data greatly diverging from the basic regression line. The reason thereof is presumed to be due to (i) a variation in the corrosion speed of reference piping under the same environmental factor and (ii) a distribution of lag time $t_L$ of corrosion under the same environmental factor.

With reference to FIG. 35, processor 2 (see FIG. 1) generates a corrosion depth exceedance prediction model of this embodiment on the basis of the basic regression line, (i) the variation in corrosion speed, and (ii) the distribution of lag time $t_L$ of corrosion (S72). In particular, the corrosion depth exceedance prediction model of this embodiment is generated, considering that the basic regression line has a certain distribution for each of corrosion speed and lag time $t_L$ of corrosion (for example, the basic regression line varies at a certain probability density for each of the corrosion speed and lag time $t_L$ of corrosion).

Specifically, (i) the variation in the corrosion speed is mainly reflected in the distribution of the basic regression line due to the variation in the reference corrosion depth in the modified reference data. The distribution of the basic regression line is reflected in the distribution of coefficients j, k in Expression (4) or Expression (5). The distribution of the basic regression line due to the variation in the reference corrosion depth in the modified reference data may be expressed by the probability density function of the distribution of the basic regression line due to the variation in the reference corrosion depth in the modified reference data, for example.

Figure 38:
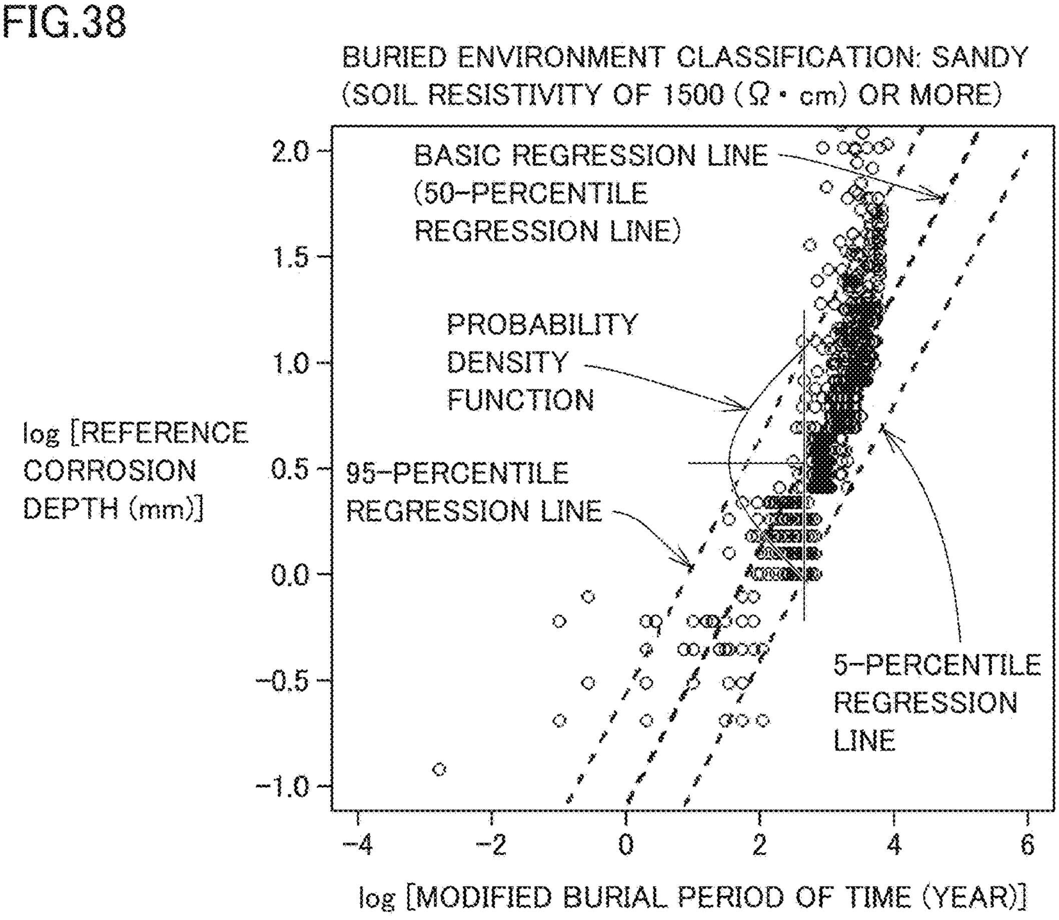
FIG. 38 is a diagram showing the modified reference data and a plurality of percentile regression lines of Embodiment 4.
Figure 39:
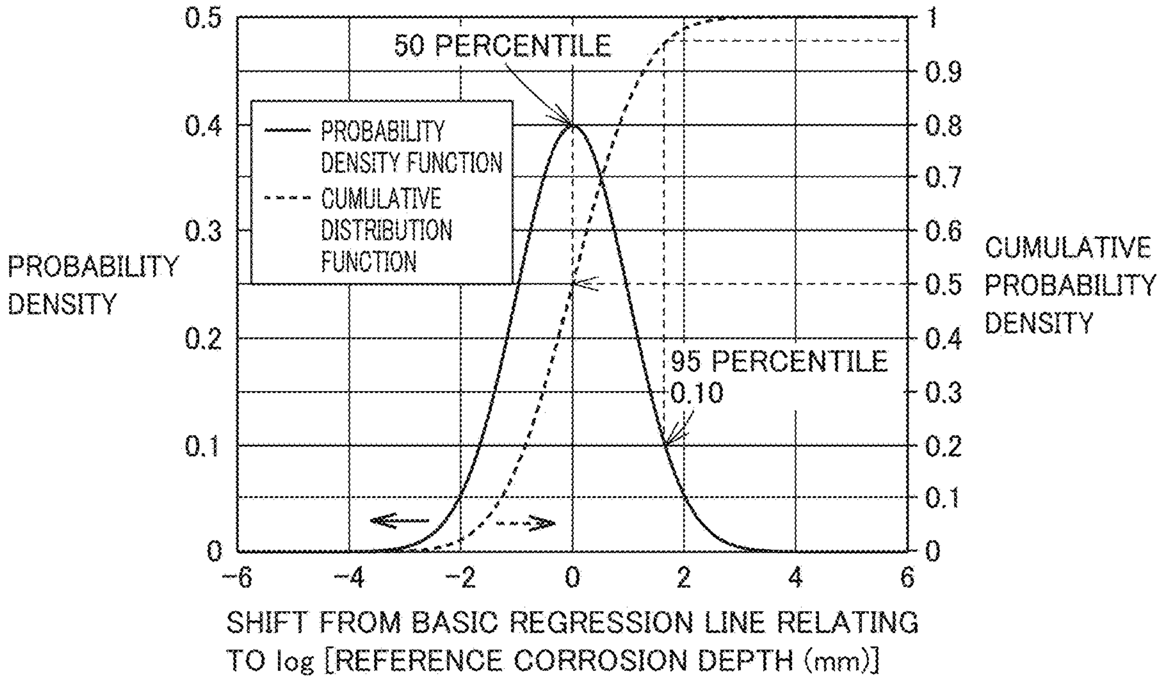
FIG. 39 is a diagram showing a probability density function and a cumulative distribution function of the distribution of the basic regression line.

For example, with reference to FIG. 38 and FIG. 39, it is assumed that the probability density function of the distribution of the basic regression line is a normal distribution. Processor 2 (see FIG. 1) calculates, for each of log-log data of the modified reference data, a shift amount of log-log data of the modified reference data from the basic regression line and calculates a standard deviation σ of the shift. The standard deviation of the probability density function is considered to be equal to calculated standard deviation a. An integrated value of the probability density function across all of the shift amounts from the basic regression line is equal to 1 and is a normal distribution of standard deviation σ of the probability density function, and hence processor 2 can acquire the probability density function. Processor 2 integrates the probability density function from a shift amount of a negative infinity to a predetermined shift amount, to thereby acquire the cumulative distribution function of the distribution of the basic regression line in the predetermined shift amount.

The basic regression line is a regression line in which a value (cumulative probability density) of the cumulative distribution function of the distribution of the basic regression line is 50 percentile and is referred to as a 50-percentile regression line. A regression line in which a value (cumulative probability density) of the cumulative distribution function of the distribution of the basic regression line is p percentile is referred to as a p-percentile regression line. Processor 2 (see FIG. 1) acquires a plurality of percentile regression lines from the basic regression line, the probability density function of the distribution of the basic regression line, and the cumulative distribution function of the distribution of the basic regression line. The plurality of percentile regression lines include a 5-percentile regression line, a 6.25-percentile regression line, a 12.5-percentile regression line, an 18.75-percentile regression line, a 25-percentile regression line, a 31.25-percentile regression line, a 37.5-percentile regression line, a 43.75-percentile regression line, a 50-percentile regression line, a 56.25-percentile regression line, a 62.5-percentile regression line, a 68.75-percentile regression line, a 75-percentile regression line, an 81.25-percentile regression line, an 87.5-percentile regression line, a 93.75-percentile regression line, and a 95-percentile regression line, for example.

Processor 2 (see FIG. 1) calculates coefficients j, k (see Items (B) and (C) in FIG. 40) of each of the plurality of percentile regression lines and a value (probability density) of the probability density function of each of the plurality of percentile regression lines (see Item (D) in FIG. 40) from the plurality of percentile regression lines and the probability density function of the distribution of the basic regression line.

When the modified burial period of time corresponding to the plurality of percentile regression lines is returned to second burial period of time $T_2$, (ii) distribution of lag time $t_L$ of corrosion is taken into consideration for each of the plurality of percentile regression lines.

Specifically, processor 2 (see FIG. 1) calculates a modified burial period of time for a case where the reference corrosion depth is a predetermined depth for each of the plurality of percentile regression lines. Processor 2 sets a predetermined depth from 0 mm to 10 mm for every 0.125 mm, for example (see Item (E) in FIG. 40). Processor 2 calculates a modified burial period of time corresponding to a predetermined depth by substituting the predetermined depth in Expression (4) or Expression (5) defining each of the plurality of percentile regression lines (see Item (F) in FIG. 40).

Due to the distribution of lag time $t_L$ of corrosion, the modified burial periods of time (see Item (F) in FIG. 40) acquired from each of the plurality of percentile regression lines correspond to various second burial periods of time $T_2$. The distribution of lag time $t_L$ of corrosion may be expressed as a probability of each modified burial period of time acquired from each of the plurality of percentile regression lines corresponding to second burial period of time $T_2$, for example. Thus, processor 2 (see FIG. 1) calculates the probability of each modified burial period of time acquired from each of the plurality of percentile regression lines corresponding to second burial period of time $T_2$.

Specifically, processor 2 sets lag time $t_L$ of corrosion from 0 years to 80 years for each year (see Item (G) in FIG. 40). Processor 2 calculates a sum of lag time $t_L$ of corrosion and the modified burial period of time acquired from each of the plurality of percentile regression lines as second burial period of time $T_2$ (see Item (H) in FIG. 40). The probability of the modified burial period of time corresponding to second burial period of time $T_2$ is given by probability $Q(t_L)$ of lag time $t_L$ of corrosion that corresponds thereto (see Item (I) in FIG. 40). The probability of lag time $t_L$ of corrosion is given by a differential of $1-P(T_2)$ (see FIG. 13) described above in Embodiment 1, in other words, probability $Q(T_2)$ of the lag time of corrosion (see FIG. 14). Probability $Q(T_2)$ of the lag time of corrosion is stored in corrosion lag time storage 28 (see FIG. 31). Processor 2 refers to corrosion lag time storage 28 and sets probability $Q(T_2)$ of the lag time of corrosion to be the probability of the modified burial period of time corresponding to second burial period of time $T_2$.

Processor 2 (see FIG. 1) calculates a product of the probability density of the percentile regression line (see Item (D) in FIG. 40) and the probability of the modified burial period of time corresponding to second burial period of time $T_2$, in other words, probability $Q(t_L)$ of the lag time of corrosion (see Item (I) in FIG. 40) as a probability index (see Item (J) in FIG. 40). This product is proportional to an existence probability of a certain percentile regression line having lag time $t_L$ of corrosion and can be considered to be a probability index of a certain percentile regression line having lag time $t_L$ of corrosion.

Processor 2 (see FIG. 1) calculates a sum of the probability index (see Item (J) in FIG. 40) as a corrosion depth reaching probability index for each reference corrosion depth (see Item (E) in FIG. 40) and each second burial period of time $T_2$ of a predetermined range (for example, 0 years or more and 10 years or less). The corrosion depth reaching probability index is an index of a probability of reaching a certain reference corrosion depth in second burial period of time $T_2$ of a predetermined range (for example, 0 years or more and 10 years or less). Then, processor 2 calculates a corrosion depth reaching probability by normalizing the corrosion depth reaching probability index such that a sum total of the corrosion depth reaching probability index across all reference corrosion depths becomes 1 in second burial period of time $T_2$ of a predetermined range (see FIG. 41). The corrosion depth reaching probability is a probability of reaching a certain reference corrosion depth in second burial period of time $T_2$ of a predetermined range (for example, 0 years or more and 10 years or less).

Processor 2 (see FIG. 1) calculates an exceedance probability of corrosion depth for each of second burial period of time $T_2$ of a predetermined range (for example, 0 years or more and 10 years or less). For example, the exceedance probability of corrosion depth of the corrosion depth exceeding r (mm) in the burial period of time of 0 years to 10 years is given by a sum of the corrosion depth reaching probability of the corrosion depth exceeding r (mm) in the burial period of time of 0 years to 10 years. As above, processor 2 acquires the exceedance-probability-of-corrosion-depth prediction model shown in FIG. 33. Processor 2 acquires an exceedance-probability-of-corrosion-depth prediction model for silty soil type, an exceedance-probability-of-corrosion-depth prediction model for argilliferous soil type (see FIG. 34), and an exceedance-probability-of-corrosion-depth prediction model for low-specific-resistance soil type having a soil resistivity less than 1500 Ω·cm by performing similar arithmetic processing.

A buried piping replacement period prediction method in this embodiment is described. The buried piping replacement period prediction method in this embodiment is similar to the buried piping replacement period prediction method using the exceedance-probability-of-corrosion-depth prediction model in Embodiment 1, but is different from the buried piping replacement period prediction method using the exceedance-probability-of-corrosion-depth prediction model in Embodiment 1 in that the exceedance-probability-of-corrosion-depth prediction model of this embodiment is used and the nominal pipe wall thickness (see FIG. 32 to FIG. 34) of the buried piping is used when the exceedance probability of corrosion depth is calculated.

Figure 42:
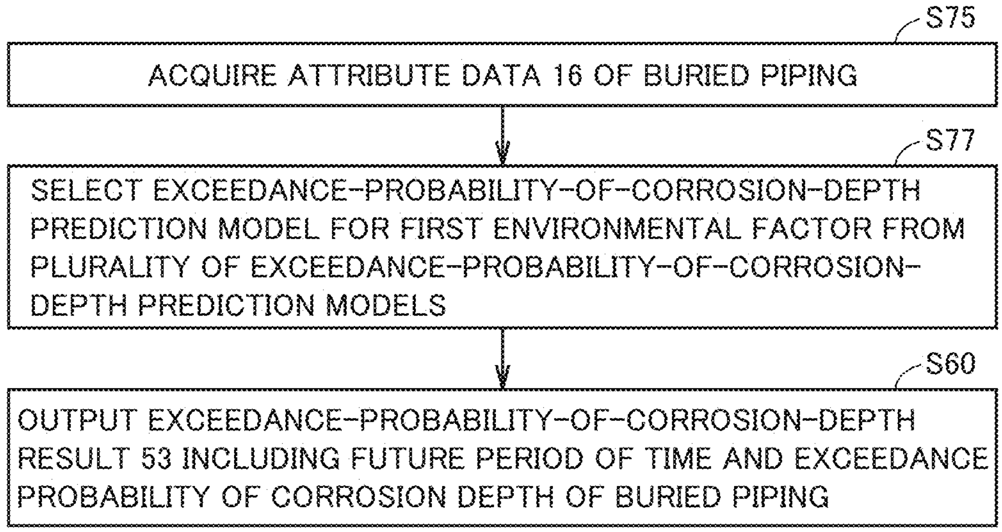
FIG. 42 is a diagram showing a flowchart of a buried piping replacement period prediction method of Embodiment 4.

With reference to FIG. 42, in the buried piping replacement period prediction method of this embodiment, attribute data 16 of the buried piping is acquired (S75).

Figure 43:
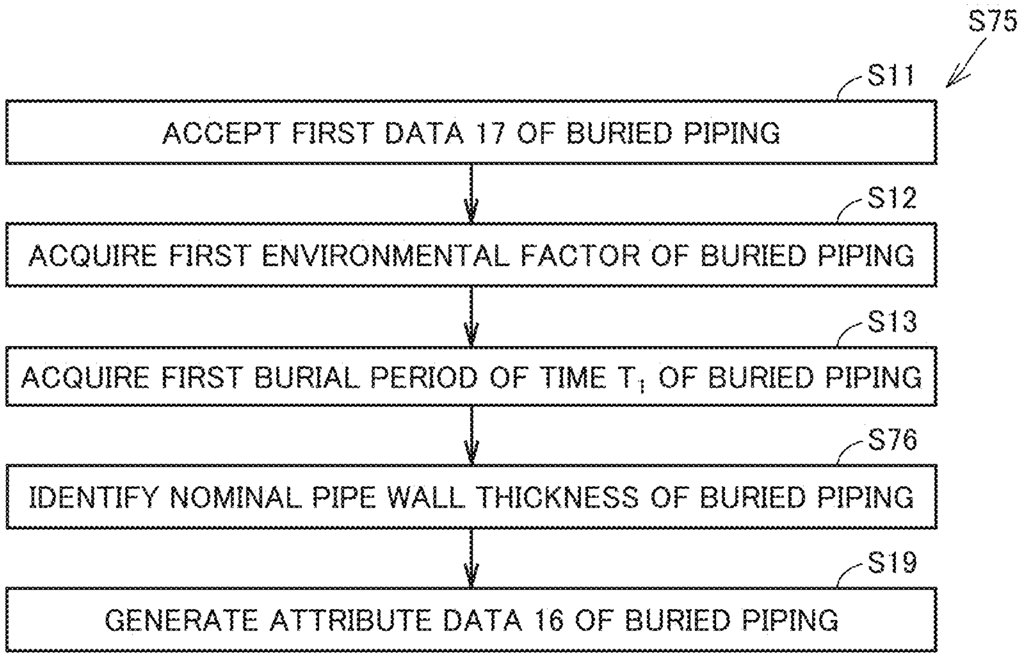
FIG. 43 is a diagram showing a flowchart of steps for acquiring attribute data of the buried piping of Embodiment 4.

Specifically, with reference to FIG. 43, buried piping data acceptance unit 11 accepts first data 17 of the buried piping provided from the customer (S11). First data 17 of the buried piping includes the pipeline number, the burial place, the installation (burial) year, the nominal diameter, the type of joint, and the type of the pipe wall thickness (see FIG. 4) of the buried piping, for example. First data 17 of the buried piping does not necessarily need to include the depth of earth cover, the hydrostatic pressure, and the water hammer pressure (see FIG. 4).

Buried piping attribute data acquisition unit 10 (attribute data generator 14) refers to environmental factor database unit 21 (see FIG. 5) and acquires the first environmental factor of the buried piping from the burial place included in first data 17 of the buried piping (S12). Buried piping attribute data acquisition unit 10 (attribute data generator 14) calculates a difference between the installation year of the buried piping included in first data 17 and the current year (the year in which the prediction of the replacement period of the buried piping is executed) stored in storage 20 as first burial period of time $T_1$ (S13). Buried piping attribute data acquisition unit 10 (attribute data generator 14) identifies the nominal pipe wall thickness for each pipeline number of the buried piping from the installation (burial) year, the nominal diameter, the type of joint, and the type of the pipe wall thickness (see FIG. 4) included in first data 17 and nominal-pipe-wall-thickness database unit 22 (S76).

Attribute data generator 14 generates attribute data 16 (see FIG. 32) of the buried piping in which the pipeline number of the buried piping, the first environmental factor, first burial period of time $T_1$, and the nominal pipe wall thickness of the buried piping are caused to correspond to each other (S19). Buried piping attribute data acquisition unit 10 outputs attribute data 16 of the buried piping to buried piping attribute data storage 24. Attribute data 16 of the buried piping is stored in buried piping attribute data storage 24.

With reference to FIG. 42, exceedance-probability-of-corrosion-depth prediction model selection unit 32 selects an exceedance-probability-of-corrosion-depth prediction model for the first environmental factor from the plurality of exceedance-probability-of-corrosion-depth prediction models of this embodiment stored in exceedance-probability-of-corrosion-depth prediction model storage 26 (S77).

Specifically, exceedance-probability-of-corrosion-depth prediction model selection unit 32 identifies the first environmental factor of the buried piping from buried piping attribute data storage 24. For example, when the exceedance probability of corrosion depth of the buried piping identified by pipeline number ABC-1 (see FIG. 32) is to be acquired, exceedance-probability-of-corrosion-depth prediction model selection unit 32 refers to attribute data 16 of the buried piping stored in buried piping attribute data storage 24 and reads out the first environmental factor corresponding to pipeline number ABC-1.

Then, exceedance-probability-of-corrosion-depth prediction model selection unit 32 selects an exceedance-probability-of-corrosion-depth prediction model for the first environmental factor from the plurality of exceedance-probability-of-corrosion-depth prediction models stored in exceedance-probability-of-corrosion-depth prediction model storage 26. For example, when the exceedance probability of corrosion depth of the buried piping identified by pipeline number ABC-1 (see FIG. 32) is to be acquired, exceedance-probability-of-corrosion-depth prediction model selection unit 32 selects an exceedance-probability-of-corrosion-depth prediction model for sandy soil type (see FIG. 33) from the plurality of exceedance-probability-of-corrosion-depth prediction models stored in exceedance-probability-of-corrosion-depth prediction model storage 26.

With reference to FIG. 42, exceedance-probability-of-corrosion-depth prediction unit 38 outputs exceedance-probability-of-corrosion-depth result 53 (S60). As shown in FIG. 20, exceedance-probability-of-corrosion-depth result 53 includes the pipeline number, the future period of time, and the exceedance probability of corrosion depth.

Figure 44:
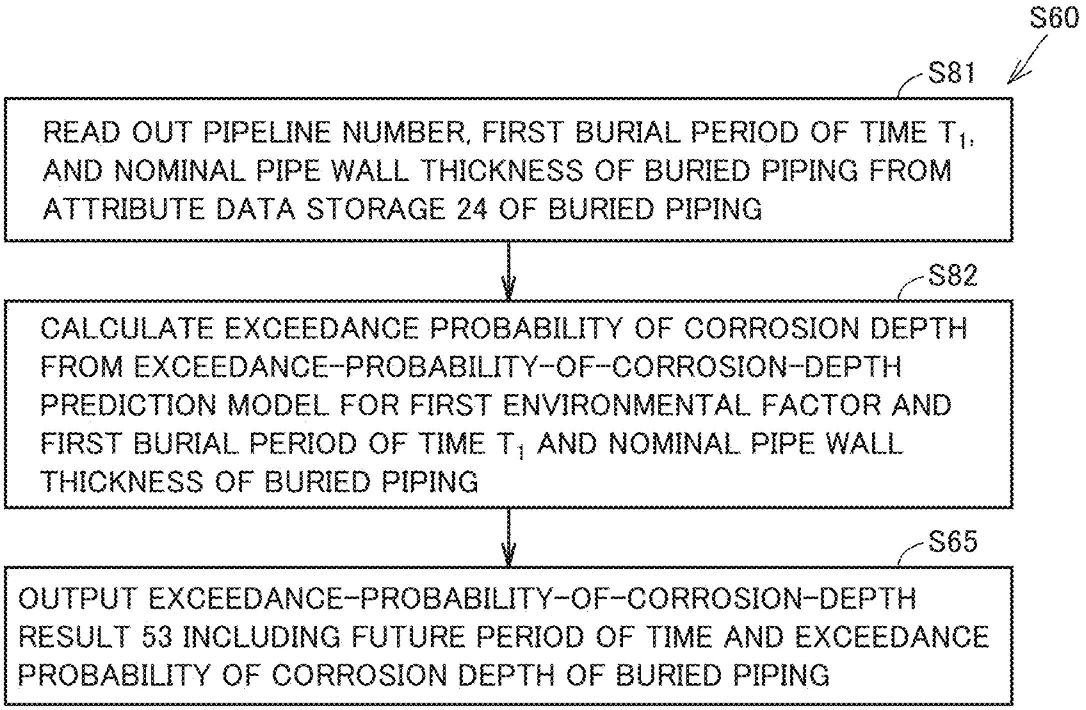
FIG. 44 is a diagram showing a flowchart of steps for calculating the exceedance-probability-of-corrosion-depth result of Embodiment 4.

Specifically, as shown in FIG. 44, exceedance-probability-of-corrosion-depth prediction unit 38 reads out the pipeline number, first burial period of time $T_1$, and the nominal pipe wall thickness of the buried piping from buried piping attribute data storage 24 (S81).

Exceedance-probability-of-corrosion-depth prediction unit 38 calculates the exceedance probability of corrosion depth of the buried piping from the exceedance-probability-of-corrosion-depth prediction model for the first environmental factor selected by exceedance-probability-of-corrosion-depth prediction model selection unit 32 and first burial period of time $T_1$ and the nominal pipe wall thickness of the buried piping included in attribute data 16 of the buried piping (S82).

The exceedance probability of corrosion depth of the buried piping in the current year is obtained as follows. Exceedance-probability-of-corrosion-depth prediction unit 38 selects an exceedance-probability-of-corrosion-depth prediction model corresponding to first burial period of time $T_1$ of the buried piping out of exceedance-probability-of-corrosion-depth prediction models selected by exceedance-probability-of-corrosion-depth prediction model selection unit 32. The nominal pipe wall thickness of the buried piping is applied to the exceedance-probability-of-corrosion-depth prediction model. As above, exceedance-probability-of-corrosion-depth prediction unit 38 calculates the exceedance probability of corrosion depth of the buried piping in the current year for each pipeline number.

An exceedance probability of corrosion depth of the buried piping n years later in the future is obtained as follows. Exceedance-probability-of-corrosion-depth prediction unit 38 selects an exceedance-probability-of-corrosion-depth prediction model corresponding to a sum of first burial period of time $T_1$ of the buried piping and n years out of exceedance-probability-of-corrosion-depth prediction models selected by exceedance-probability-of-corrosion-depth prediction model selection unit 32. The nominal pipe wall thickness of the buried piping is applied to the exceedance-probability-of-corrosion-depth prediction model. As a result, exceedance-probability-of-corrosion-depth prediction unit 38 calculates the exceedance probability of corrosion depth of the buried piping n years later in the future for each pipeline number.

Exceedance-probability-of-corrosion-depth prediction unit 38 generates exceedance-probability-of-corrosion-depth result 53 (see FIG. 20) in which the pipeline number, the future period of time, and the exceedance probability of corrosion depth of the buried piping are caused to correspond to each other. Exceedance-probability-of-corrosion-depth prediction unit 38 outputs exceedance-probability-of-corrosion-depth result 53 including the pipeline number, the future period of time, and the exceedance probability of corrosion depth of the buried piping (S65). Exceedance-probability-of-corrosion-depth result 53 is output to at least one of RAM 4, hard disk drive 5, portable storage medium 7*m*, and monitor 8*b*, for example. Exceedance-probability-of-corrosion-depth result 53 is stored in at least one of RAM 4, hard disk drive 5, and portable storage medium 7*m*. Exceedance-probability-of-corrosion-depth result 53 is displayed on monitor 8*b*.

The program of this embodiment causes processor 2 to execute the buried piping replacement period prediction method of this embodiment. The program that causes processor 2 to execute the buried piping replacement period prediction method of this embodiment is recorded on a computer-readable recording medium (for example, a non-transitory computer-readable recording medium) of this embodiment.

In this embodiment, attribute data 16 of the buried piping may include the allowable corrosion depth of the buried piping instead of the nominal pipe wall thickness of the buried piping. Buried piping replacement period prediction apparatus 1*d* may include minimum-pipe-wall-thickness calculation unit 12, allowable corrosion depth calculation unit 13, and tolerance-on-wall-thickness database unit 23. The exceedance probability of corrosion depth may be calculated by applying first burial period of time $T_1$ and the allowable corrosion depth of the buried piping to the exceedance-probability-of-corrosion-depth prediction model. The model that predicts the exceedance probability of corrosion depth of the buried piping may be generated by regressing the modified reference data (see FIG. 17) in Embodiment 1 instead of the modified reference data (FIG. 36).

Effects of buried piping replacement period prediction apparatus 1*d*, the buried piping replacement period prediction method, the program, and the computer-readable recording medium of this embodiment are described.

Buried piping replacement period prediction apparatus 1*d* of this embodiment includes buried piping attribute data acquisition unit 10 and exceedance-probability-of-corrosion-depth prediction unit 38. Buried piping attribute data acquisition unit 10 acquires attribute data 16 of the buried piping. Attribute data 16 of the buried piping includes the first environmental factor of the buried piping, first burial period of time $T_1$ of the buried piping, and the nominal pipe wall thickness or the allowable corrosion depth of the buried piping. Exceedance-probability-of-corrosion-depth prediction unit 38 calculates an exceedance probability of corrosion depth of the buried piping in a certain period from the exceedance-probability-of-corrosion-depth prediction model for the first environmental factor, first burial period of time $T_1$, and the nominal pipe wall thickness or the allowable corrosion depth. The exceedance probability of corrosion depth of the buried piping in a certain period is probability of the corrosion depth of the buried piping exceeding the nominal pipe wall thickness or the allowable corrosion depth of the buried piping in a certain period. Reference data 18 of the plurality of pieces of reference piping includes a second environmental factor, second burial period of time $T_2$, and a reference corrosion depth of the plurality of pieces of reference piping. The modified reference data of the plurality of pieces of reference piping includes the modified burial period of time and the reference corrosion depth of the plurality of pieces of reference piping. The modified burial period of time is calculated by subtracting the lag time of corrosion depending on second burial period of time $T_2$ and the reference corrosion depth from second burial period of time $T_2$. The lag time of corrosion is a period of time from when the plurality of pieces of reference piping are buried to when the plurality of pieces of reference piping start corroding. The exceedance-probability-of-corrosion-depth prediction model is a model that predicts the exceedance probability of corrosion depth of the buried piping and is generated on the basis of a basic regression line that regresses the modified reference data having the second environmental factor that is same as the first environmental factor, the variation in corrosion speed of the plurality of pieces of reference piping, and the distribution of lag time $t_L$ of corrosion. The variation in corrosion speed is given by a distribution of the basic regression line due to a variation in the reference corrosion depth in the modified reference data. The distribution of lag time $t_L$ of corrosion is given by a differential of a change in the rate of the number of data of which reference corrosion depth is more than 0 mm out of reference data 18 having the second environmental factor that is same as the first environmental factor with respect to second burial period of time $T_2$.

In buried piping replacement period prediction apparatus 1*d*, the exceedance probability of corrosion depth of the buried piping is calculated with use of the exceedance-probability-of-corrosion-depth prediction model. The exceedance-probability-of-corrosion-depth prediction model is generated on the basis of a basic regression line that regresses the modified reference data having the second environmental factor that is same as the first environmental factor, the variation in corrosion speed of the plurality of pieces of reference piping, and the distribution of lag time $t_L$ of corrosion. According to buried piping replacement period prediction apparatus 1*d*, the replacement period of the buried piping can be predicted more accurately. According to buried piping replacement period prediction apparatus 1*d*, the exceedance probability of corrosion depth of the buried piping that makes it easy for the customer to draw up a replacement plan for the buried piping can be provided to the customer.

The buried piping replacement period prediction method of this embodiment includes a step of acquiring attribute data 16 of the buried piping by buried piping attribute data acquisition unit 10. Attribute data 16 of the buried piping includes the first environmental factor of the buried piping, first burial period of time $T_1$ of the buried piping, and the nominal pipe wall thickness or the allowable corrosion depth of the buried piping. The buried piping replacement period prediction method of this embodiment includes a step of calculating the exceedance probability of corrosion depth of the buried piping in a certain period from the exceedance-probability-of-corrosion-depth prediction model for the first environmental factor, first burial period of time $T_1$, and the nominal pipe wall thickness or the allowable corrosion depth by exceedance-probability-of-corrosion-depth prediction unit 38. The exceedance probability of corrosion depth of the buried piping in a certain period is a probability of the corrosion depth of the buried piping exceeding the nominal pipe wall thickness or the allowable corrosion depth of the buried piping in a certain period. Reference data 18 of the plurality of pieces of reference piping includes a second environmental factor, second burial period of time $T_2$, and a reference corrosion depth of the plurality of pieces of reference piping. The modified reference data of the plurality of pieces of reference piping includes the modified burial period of time and the reference corrosion depth of the plurality of pieces of reference piping. The modified burial period of time is calculated by subtracting the lag time of corrosion depending on second burial period of time $T_2$ and the reference corrosion depth from the second burial period of time $T_2$. The lag time of corrosion is a period of time from when the plurality of pieces of reference piping are buried to when the plurality of pieces of reference piping start corroding. The exceedance-probability-of-corrosion-depth prediction model is a model that predicts the exceedance probability of corrosion depth of the buried piping and is generated on the basis of a basic regression line that regresses the modified reference data having the second environmental factor that is same as the first environmental factor, the variation in corrosion speed of the plurality of pieces of reference piping, and the distribution of lag time $t_L$ of corrosion. The variation in corrosion speed is given by a distribution of the basic regression line due to a variation in the reference corrosion depth in the modified reference data. The distribution of lag time $t_L$ of corrosion is given by a differential of a change in the rate of the number of data of which reference corrosion depth is more than 0 mm out of reference data 18 having the second environmental factor that is same as the first environmental factor with respect to second burial period of time $T_2$.

In buried piping replacement period prediction method of this embodiment, the exceedance probability of corrosion depth of the buried piping is calculated with use of the exceedance-probability-of-corrosion-depth prediction model. The exceedance-probability-of-corrosion-depth prediction model is generated on the basis of a basic regression line that regresses the modified reference data having the second environmental factor that is same as the first environmental factor, the variation in corrosion speed of the plurality of pieces of reference piping, and the distribution of lag time $t_L$ of corrosion. According to the buried piping replacement period prediction method of this embodiment, the replacement period of the buried piping can be predicted more accurately. According to the buried piping replacement period prediction method of this embodiment, the exceedance probability of corrosion depth of the buried piping that makes it easy for the customer to draw up a replacement plan for the buried piping can be provided to the customer.

The program of this embodiment causes processor 2 to execute each step of the buried piping replacement period prediction method of this embodiment. The program of this embodiment is recorded on the computer-readable recording medium of this embodiment. According to the program and the computer-readable recording medium of this embodiment, the replacement period of the buried piping can be predicted more accurately.

Embodiment 5

With reference to FIG. 45 to FIG. 54, a buried piping replacement period prediction apparatus 1*e* of Embodiment 5 is described. Buried piping replacement period prediction apparatus 1*e* of this embodiment includes a configuration similar to that of buried piping replacement period prediction apparatus 1*d* of Embodiment 4, but is mainly different from buried piping replacement period prediction apparatus 1*d* of Embodiment 4 in the following points.

Figure 45:
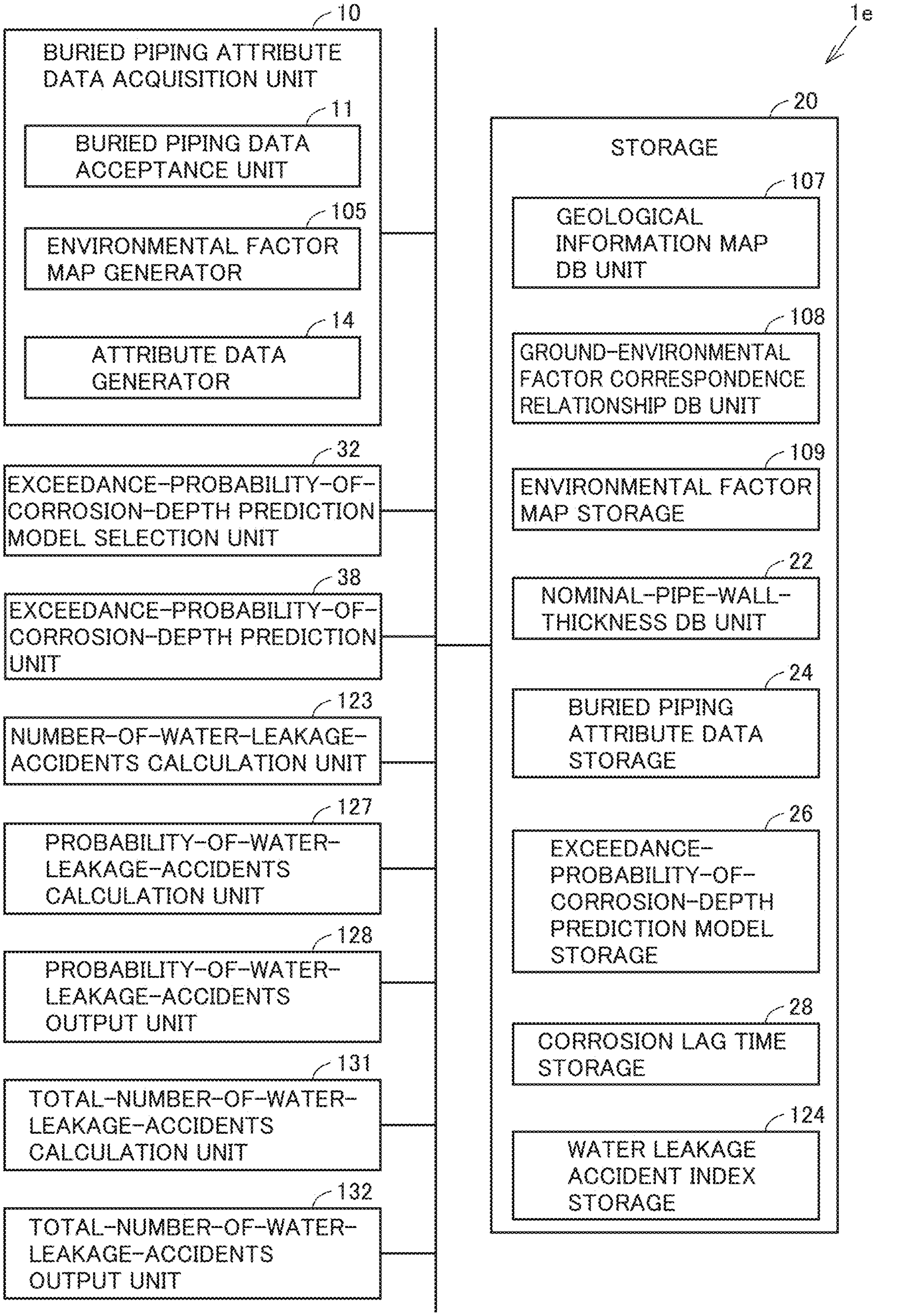
FIG. 45 is a block diagram describing a functional configuration of a buried piping replacement period prediction apparatus of Embodiment 5.
Figures 46, 47:
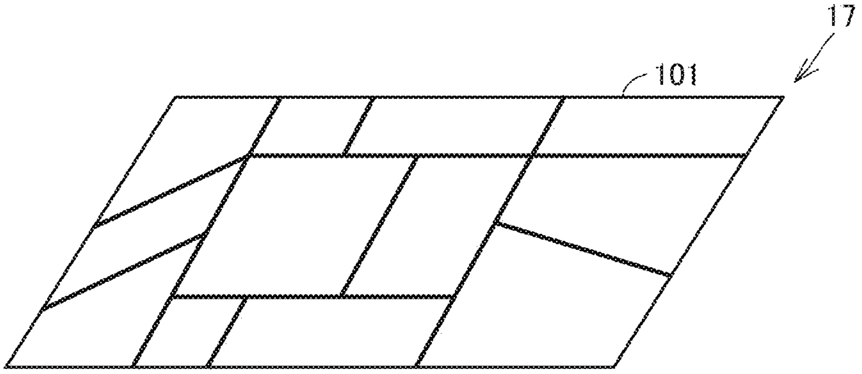
FIG. 46 is a diagram showing a pipeline map included in first data of buried piping of Embodiment 5.
FIG. 47 is a diagram showing a data structure included in the first data of the buried piping of Embodiment 5.
Figure 53:
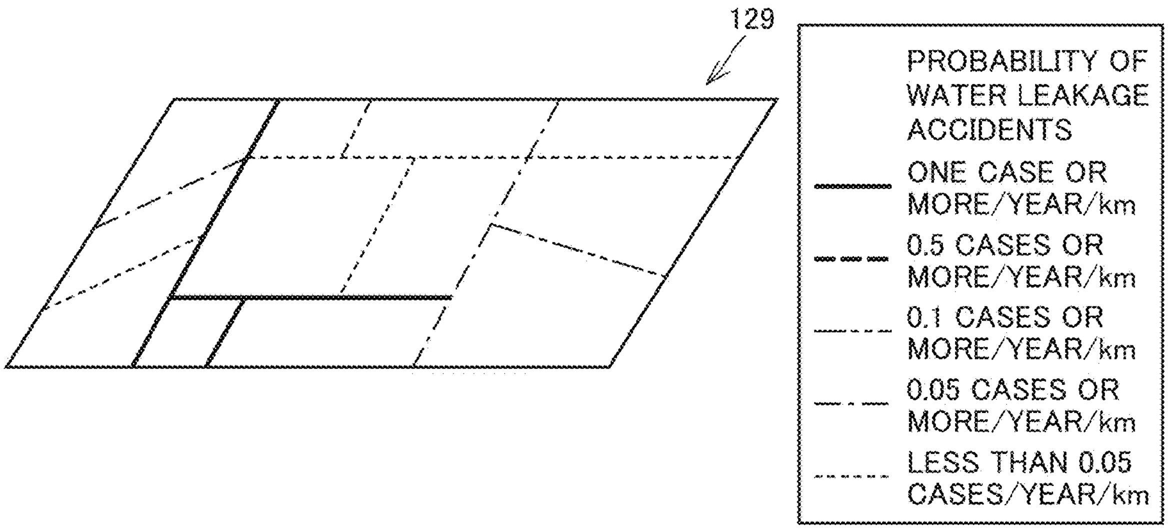
FIG. 53 is a diagram showing a probability-of-water-leakage-accidents map.

With reference to FIG. 45, buried piping replacement period prediction apparatus 1*e* further includes a number-of-water-leakage-accidents calculation unit 123, a probability-of-water-leakage-accidents calculation unit 127, a probability-of-water-leakage-accidents output unit 128, a total-number-of-water-leakage-accidents calculation unit 131, and a total-number-of-water-leakage-accidents output unit 132. In buried piping replacement period prediction apparatus 1*e*, buried piping attribute data acquisition unit 10 further includes an environmental factor map generator 105 in addition to buried piping data acceptance unit 11 and attribute data generator 14. In buried piping replacement period prediction apparatus 1*e*, storage 20 further includes a geological information map database unit 107, a ground-environmental factor correspondence relationship database unit 108, an environmental factor map storage 109, and a water leakage accident index storage 124 in addition to nominal-pipe-wall-thickness database unit 22, buried piping attribute data storage 24, exceedance-probability-of-corrosion-depth prediction model storage 26, and corrosion lag time storage 28.

Buried piping data acceptance unit 11 accepts first data 17 of the buried piping provided from the customer. First data 17 of the buried piping includes a pipeline map 101 (see FIG. 46), and the pipeline ID (for example, the pipeline number), the installation (burial) year, the nominal diameter, the type of joint, the type of the pipe wall thickness, and the pipeline length (see FIG. 47) of the buried piping, for example. In pipeline map 101, positions of the buried piping managed by the customer are displayed on a map for each pipeline ID of the buried piping. First data 17 of the buried piping may be stored in portable storage medium 7*m* (see FIG. 1) provided from the customer, for example. First data 17 of the buried piping may be stored in hard disk drive 5 (see FIG. 1) in advance, for example.

Environmental factor map generator 105 generates an environmental factor map 106 (see FIG. 48) in a region corresponding to pipeline map 101. Environmental factor map 106 is a map of the first environmental factor of the buried piping that defines the soil environment in which the buried piping is buried. As described in Embodiment 1 above, the first environmental factor of the buried piping includes four environmental factors, in other words, a sandy soil type having a soil resistivity of 1500 Ω·cm or more, a silty soil type having a soil resistivity of 1500 Ω·cm or more, an argilliferous soil type having a soil resistivity of 1500 Ω·cm or more, and a low-specific-resistance soil type having a soil resistivity less than 1500 Ω·cm.

The geological information map stored in geological information map database unit 107 is a map including geological information that is generally available such as a land classification survey provided by the Ministry of Land, Infrastructure, Transport and Tourism, for example. In the geological information map, geological information such as geological features and topography of the ground surface is shown on a map.

The inventors of the present disclosure have found that the geological information can be classified so as to be statistically correlated to the types of the environmental factor of the buried piping regarding corrosion speed. Thus, the geological information is classified into four ground classifications (Ground Classification (a), Ground Classification (b), Ground Classification (c), and Ground Classification (d)) statistically correlated to the four environmental factors (the sandy soil type, the silty soil type, the argilliferous soil type, and the low-specific-resistance soil type), and a ground-environmental factor correspondence data table 110 on which the four ground classifications are respectively caused to correspond to the four environmental factors is generated as shown in FIG. 49. Ground-environmental factor correspondence relationship database unit 108 stores ground-environmental factor correspondence data table 110.

Environmental factor map generator 105 generates environmental factor map 106 (see FIG. 48) from pipeline map 101 (see FIG. 46) provided from the customer, a geological information map stored in geological information map database unit 107, and ground-environmental factor correspondence data table 110 (see FIG. 49) stored in ground-environmental factor correspondence relationship database unit 108. Specifically, environmental factor map generator 105 refers to geological information map database unit 107 and acquires geological information in a region corresponding to pipeline map 101 from the geological information map. Environmental factor map generator 105 refers to ground-environmental factor correspondence relationship database unit 108 and identifies the first environmental factor of the buried piping in the region corresponding to pipeline map 101 from the acquired geological information and ground-environmental factor correspondence data table 110. Environmental factor map generator 105 generates environmental factor map 106 (see FIG. 48) by displaying the identified first environmental factor of the buried piping on a map corresponding to pipeline map 101. Environmental factor map generator 105 stores environmental factor map 106 in environmental factor map storage 109.

Buried piping attribute data acquisition unit 10 (attribute data generator 14) calculates a difference between the installation year of the buried piping included in first data 17 and the current year (the year in which the prediction of the replacement period of the buried piping is executed) stored in storage 20 as first burial period of time $T_1$. Buried piping attribute data acquisition unit 10 (attribute data generator 14) calculates first burial period of time $T_1$ for each pipeline ID of the buried piping. Buried piping attribute data acquisition unit 10 (attribute data generator 14) identifies the nominal pipe wall thickness for each pipeline ID of the buried piping from the installation (burial) year, the nominal diameter, the type of joint, and the type of the pipe wall thickness (see FIG. 4) included in first data 17 and nominal-pipe-wall-thickness database unit 22.

Attribute data generator 14 generates attribute data 16 of the buried piping from first data 17 of the buried piping provided from the customer (see FIG. 46 and FIG. 47), environmental factor map 106 (see FIG. 48) stored in environmental factor map storage 109, and nominal-pipe-wall-thickness database unit 22. With reference to FIG. 50, attribute data 16 of the buried piping includes the pipeline ID, the first environmental factor, first burial period of time $T_1$, and the nominal pipe wall thickness of the buried piping, for example. Buried piping attribute data acquisition unit 10 (attribute data generator 14) outputs attribute data 16 of the buried piping to buried piping attribute data storage 24. Attribute data 16 of the buried piping is stored in buried piping attribute data storage 24.

With reference to FIG. 45, exceedance-probability-of-corrosion-depth prediction model storage 26 stores therein the plurality of exceedance-probability-of-corrosion-depth prediction models of Embodiment 4. As with exceedance-probability-of-corrosion-depth prediction unit 38 of Embodiment 4, exceedance-prob ability-of-corrosion-depth prediction unit 38 of this embodiment calculates the exceedance probability of corrosion depth of the buried piping in a certain period (for example, the current year, a future year, or a future period of time) for each pipeline ID from the exceedance-probability-of-corrosion-depth prediction model selected by exceedance-probability-of-corrosion-depth prediction model selection unit 32, and first burial period of time $T_1$ and the nominal pipe wall thickness of the buried piping included in attribute data 16 of the buried piping (see FIG. 51).

Water leakage accident index storage 124 stores therein the number of water leakage accidents (see FIG. 52), the probability of water leakage accidents (see FIG. 52), the total number of water leakage accidents (see FIG. 52), the probability-of-water-leakage-accidents result (see FIG. 52 and FIG. 53), the result of the total number of water leakage accidents (see FIG. 52 and FIG. 54) described below.

With reference to FIG. 45, number-of-water-leakage-accidents calculation unit 123 calculates the number of water leakage accidents (see FIG. 52) in a certain period (for example, the current year, a future year, or a future period of time) for each pipeline ID. The number of water leakage accidents is the number by which a water leakage accident occurs in the buried piping identified by the pipeline ID for each unit time (for example, one year), for example. Number-of-water-leakage-accidents calculation unit 123 may calculate the number of water leakage accidents in the current year for each pipeline ID, may calculate the number of water leakage accidents n years later (for example, n=30) for each pipeline ID, or may calculate both of the number of water leakage accidents in the current year and the number of water leakage accidents n years later, for example.

Specifically, number-of-water-leakage-accidents calculation unit 123 calculates the number-of-water-leakage-accidents evaluation index (see FIG. 51) by calculating a product of the pipeline length included in first data 17 of the buried piping and the exceedance probability of corrosion depth of the buried piping in a certain period (for example, the current year, a future year, or a future period of time) calculated by exceedance-probability-of-corrosion-depth prediction unit 38 for each pipeline ID. The number-of-water-leakage-accidents evaluation index is a product of the pipeline length and the exceedance probability of corrosion depth, and hence is an index proportional to the number of water leakage accidents for each pipeline ID. In storage 20, a coefficient by which the number-of-water-leakage-accidents evaluation index is multiplied in order to acquire the number of water leakage accidents from the number-of-water-leakage-accidents evaluation index is stored. This coefficient is already calculated from the actual number of water leakage accidents of a certain pipeline acquired in the past and the number-of-water-leakage-accidents evaluation index of the pipeline. Number-of-water-leakage-accidents calculation unit 123 calculates the number of water leakage accidents for each pipeline ID by multiplying the number-of-water-leakage-accidents evaluation index by this coefficient. Number-of-water-leakage-accidents calculation unit 123 outputs the number of water leakage accidents for each pipeline ID to water leakage accident index storage 124. The number of water leakage accidents for each pipeline ID is stored in water leakage accident index storage 124.

The number of water leakage accidents n years later is calculated from the pipeline length of the buried piping identified by the pipeline ID and the exceedance probability of corrosion depth of the buried piping identified by the pipeline ID n years later. The exceedance probability of corrosion depth of the buried piping identified by the pipeline ID n years later is acquired by applying the nominal pipe wall thickness of the buried piping identified by the pipeline ID and a sum of first burial period of time $T_1$ of the buried piping identified by the pipeline ID and n years to an exceedance-probability-of-corrosion-depth prediction model corresponding to the first environmental factor of the buried piping identified by the pipeline ID.

Water leakage accident calculation unit 127 calculates the probability of water leakage accidents (see FIG. 52) in a certain period (for example, the current year, a future year, or a future period of time) for each pipeline ID. The probability of water leakage accidents is the number of occurrences of an water leakage accident in the buried piping identified by the pipeline ID for each unit time (for example, one year) and unit distance (for example, 1 km) in a certain period (for example, the current year, a future year, or a future period of time), for example. Probability-of-water-leakage-accidents calculation unit 127 may calculate the probability of water leakage accidents in the current year for each pipeline ID, may calculate the probability of water leakage accidents n years later (for example, n=30) for each pipeline ID, or may calculate both of the probability of water leakage accidents in the current year and the probability of water leakage accidents n years later for each pipeline ID, for example.

Specifically, probability-of-water-leakage-accidents calculation unit 127 calculates the probability of water leakage accidents by dividing the number of water leakage accidents calculated by number-of-water-leakage-accidents calculation unit 123 by the pipeline length (see FIG. 47) included in first data 17 of the buried piping for each pipeline ID. Probability-of-water-leakage-accidents calculation unit 127 outputs the probability of water leakage accidents for each pipeline ID to water leakage accident index storage 124. The probability of water leakage accidents for each pipeline ID is stored in water leakage accident index storage 124.

The probability of water leakage accidents n years later is calculated from the pipeline length of the buried piping identified by the pipeline ID and the exceedance probability of corrosion depth of the buried piping identified by the pipeline ID n years later. The exceedance probability of corrosion depth of the buried piping identified by the pipeline ID n years later is acquired by applying the nominal pipe wall thickness of the buried piping identified by the pipeline ID and a sum of first burial period of time $T_1$ of the buried piping identified by the pipeline ID and n years to an exceedance-probability-of-corrosion-depth prediction model corresponding to the first environmental factor of the buried piping identified by the pipeline ID.

Probability-of-water-leakage-accidents output unit 128 generates a probability-of-water-leakage-accidents result and outputs the probability-of-water-leakage-accidents result to water leakage accident index storage 124 and at least one of RAM 4, hard disk drive 5, portable storage medium 7*m*, and monitor 8*b* shown in FIG. 1. The probability-of-water-leakage-accidents result is stored in water leakage accident index storage 124. The probability-of-water-leakage-accidents result is a probability-of-water-leakage-accidents table (see FIG. 52) or a probability-of-water-leakage-accidents map 129 (see FIG. 53), for example. Probability-of-water-leakage-accidents output unit 128 may generate a probability-of-water-leakage-accidents table by putting together the pipeline ID and the probability of water leakage accidents corresponding to the pipeline ID on a table. Probability-of-water-leakage-accidents output unit 128 may generate a probability-of-water-leakage-accidents map 129 by displaying the probability of water leakage accidents for each pipeline ID in pipeline map 101 (see FIG. 46) included in first data 17 of the buried piping.

Total-number-of-water-leakage-accidents calculation unit 131 calculates the total number of water leakage accidents (see FIG. 52) in a certain period (for example, the current year, a future year, or a future period of time). The total number of water leakage accidents is a sum total of the number of water leakage accidents in a certain period (for example, the current year, a future year, or a future period of time) for all of the pipeline IDs (all of the pipelines included in attribute data 16 or pipeline map 101 (see FIG. 46)) included in attribute data 16. Total-number-of-water-leakage-accidents calculation unit 131 calculates the total number of water leakage accidents by adding up the number of water leakage accidents in a certain period (for example, the current year, a future year, or a future period of time) for all of the pipeline IDs included in attribute data 16. As shown in FIG. 52, total-number-of-water-leakage-accidents calculation unit 131 may calculate the total number of water leakage accidents in the current year, may calculate the total number of water leakage accidents n years later (for example, n=30), or may calculate both of the total number of water leakage accidents in the current year and the total number of water leakage accidents n years later, for example. Total-number-of-water-leakage-accidents calculation unit 131 outputs the total number of water leakage accidents to water leakage accident index storage 124. The total number of water leakage accidents is stored in water leakage accident index storage 124.

Total-number-of-water-leakage-accidents output unit 132 generates a total-number-of-water-leakage-accidents result and outputs the total-number-of-water-leakage-accidents result to water leakage accident index storage 124 and at least one of RAM 4, hard disk drive 5, portable storage medium 7*m*, and monitor 8*b* shown in FIG. 1. The total-number-of-water-leakage-accidents result is stored in water leakage accident index storage 124. The total-number-of-water-leakage-accidents result is a total-number-of-water-leakage-accidents table (see FIG. 52) or a total-number-of-water-leakage-accidents graph 133 (see FIG. 54), for example. Total-number-of-water-leakage-accidents output unit 132 may generate a total-number-of-water-leakage-accidents table indicating a secular change of the total number of water leakage accidents. Total-number-of-water-leakage-accidents output unit 132 may generate total-number-of-water-leakage-accidents graph 133 indicating a secular change of the total number of water leakage accidents.

Figure 54:
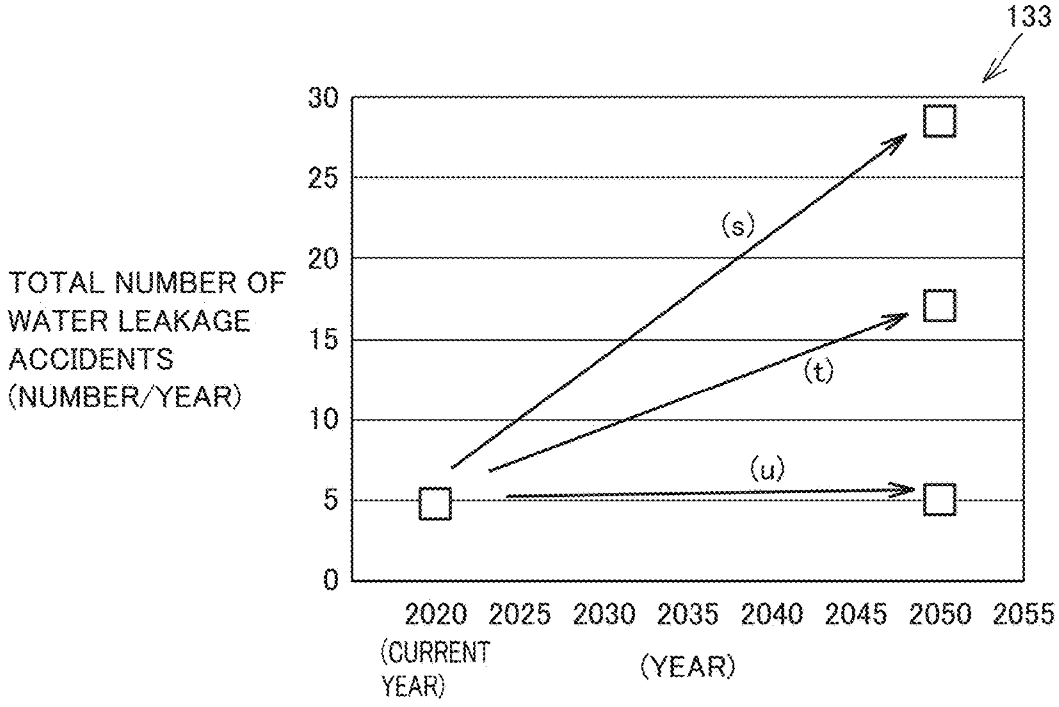
FIG. 54 is a diagram showing a total-number-of-water-leakage-accidents graph.

As shown in FIG. 54, total-number-of-water-leakage-accidents output unit 132 may output a secular change of the total number of water leakage accidents in accordance with an aspect of the replacement of the pipeline in the future. For example, total-number-of-water-leakage-accidents output unit 132 may generate and output total-number-of-water-leakage-accidents graph 133 indicating (s) a secular change of the total number of water leakage accidents when the pipeline is not replaced at all until a future period n years later (for example, n=30), (t) a secular change of the total number of water leakage accidents when the pipeline is replaced by every certain distance (for example, 100 km) each year until a future period n years later (for example, n=30) in the order from pipeline of which first burial period of time $T_1$ is the longest, and (u) a secular change of the total number of water leakage accidents when the pipeline is replaced by every certain distance (for example, 100 km) each year until a future period n years later (for example, n=30) in the order from pipeline of which probability of water leakage accidents is the highest. The secular change of the total number of water leakage accidents in accordance with the aspect of the replacement of the pipeline in the future as that in total-number-of-water-leakage-accidents graph 133 makes it easy for the customer to establish a replacement plan of the pipeline.

Figure 55:
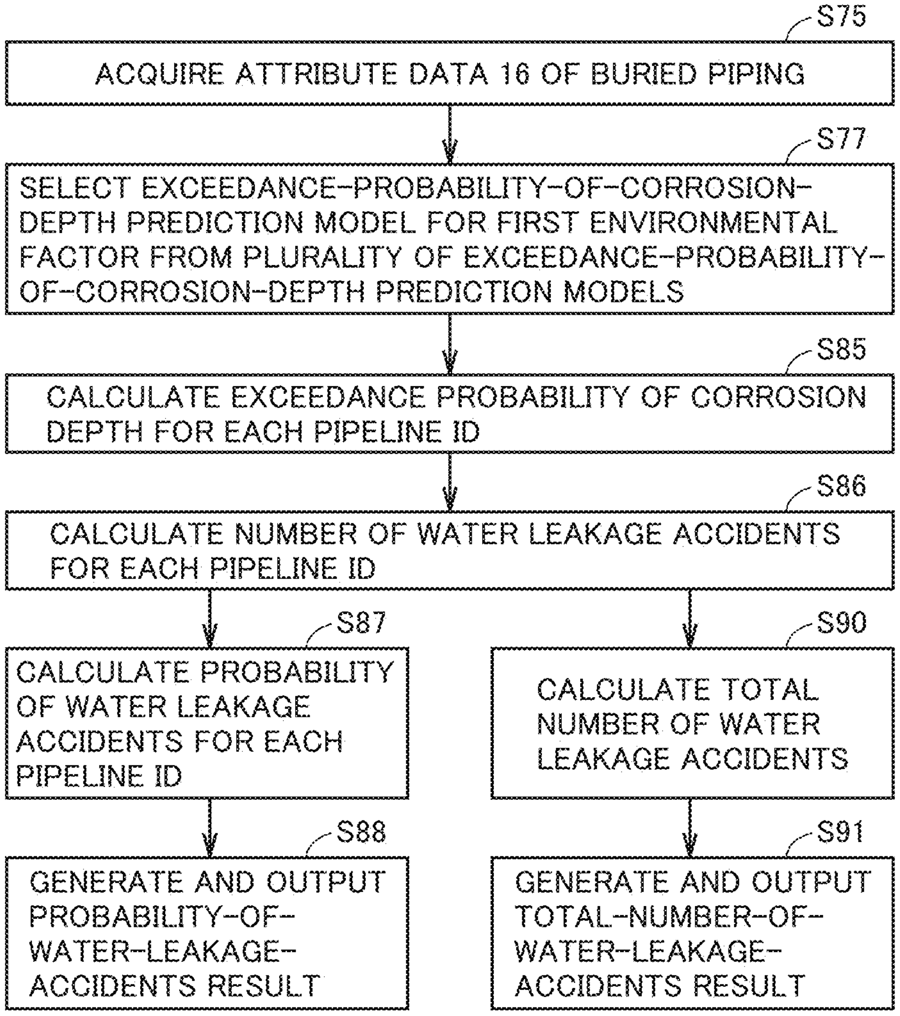
FIG. 55 is a diagram showing a flowchart of a buried piping replacement period prediction method of Embodiment 5.
Figure 56:
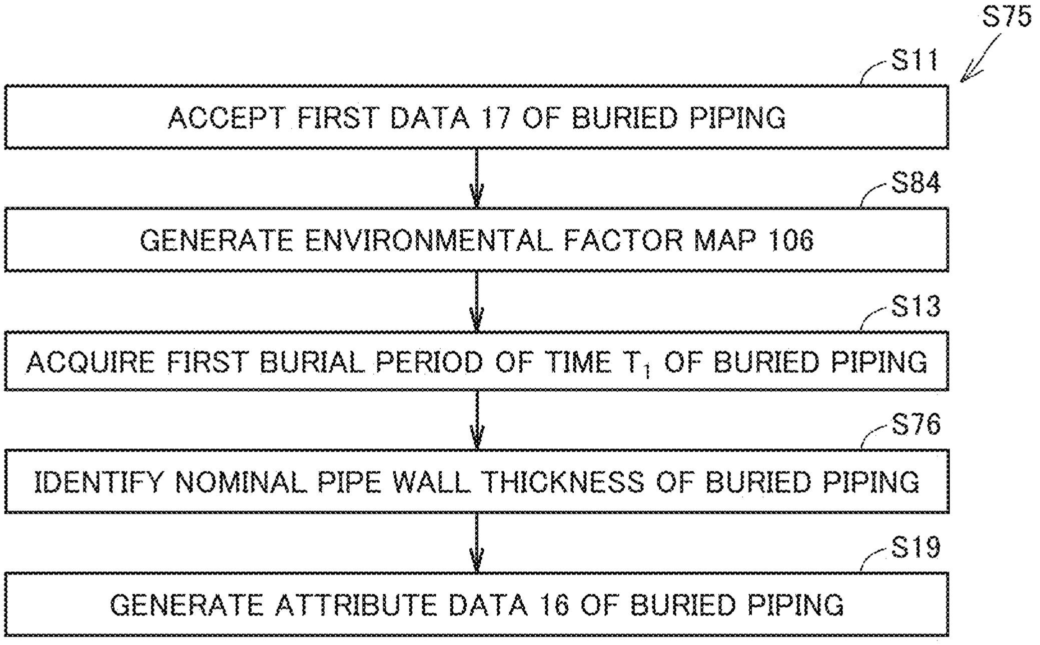
FIG. 56 is a diagram showing a flowchart of steps for acquiring the attribute data of the buried piping of Embodiment 5.
Figure 57:
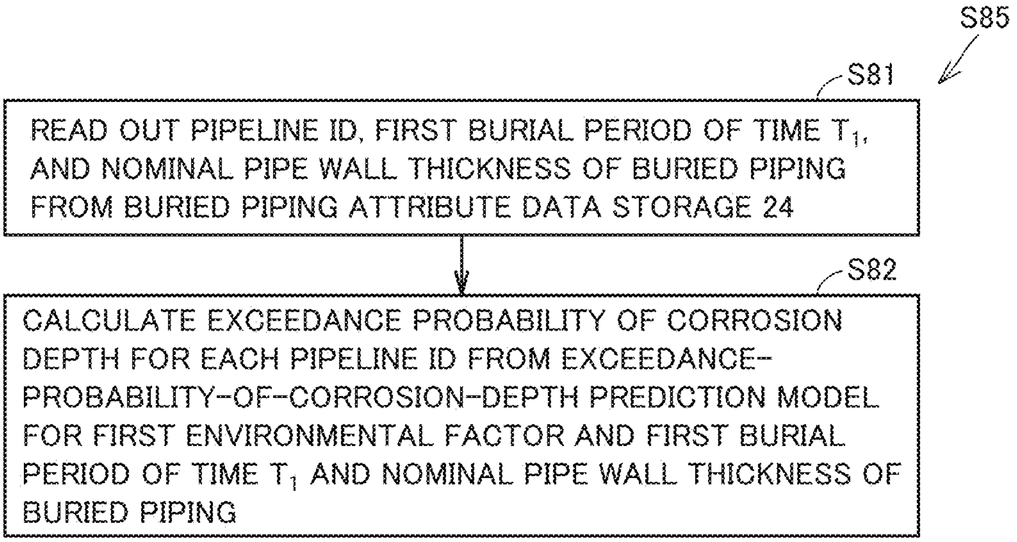
FIG. 57 is a diagram showing a flowchart of steps for calculating an exceedance probability of corrosion depth of Embodiment 5.

With reference to FIG. 55 to FIG. 57 and the like, a buried piping replacement period prediction method of this embodiment is described. The buried piping replacement period prediction method of this embodiment includes steps similar to those of the buried piping replacement period prediction method of Embodiment 4 but is mainly different from the buried piping replacement period prediction method of Embodiment 4 in the following points.

With reference to FIG. 55, in the buried piping replacement period prediction method of this embodiment, attribute data 16 of the buried piping is acquired (S75).

Specifically, with reference to FIG. 56, buried piping data acceptance unit 11 accepts first data 17 of the buried piping provided from the customer (S11). First data 17 of the buried piping includes pipeline map 101 (see FIG. 46), and the pipeline ID, the installation (burial) year, the nominal diameter, the type of joint, the type of the pipe wall thickness, and the pipeline length (see FIG. 47) of the buried piping, for example.

Environmental factor map generator 105 generates environmental factor map 106 (see FIG. 48) in a region corresponding to pipeline map 101 (S84). Specifically, environmental factor map generator 105 refers to geological information map database unit 107 and acquires geological information in a region corresponding to pipeline map 101 from the geological information map. Environmental factor map generator 105 refers to ground-environmental factor correspondence relationship database unit 108 and identifies the first environmental factor of the buried piping in the region corresponding to pipeline map 101 for each pipeline ID of the buried piping from acquired geological information and ground-environmental factor correspondence data table 110. Environmental factor map generator 105 generates environmental factor map 106 (see FIG. 48) by displaying the identified first environmental factor of the buried piping on a map corresponding to pipeline map 101. Environmental factor map generator 105 stores environmental factor map 106 in environmental factor map storage 109.

Buried piping attribute data acquisition unit 10 (attribute data generator 14) calculates a difference between the installation year of the buried piping included in first data 17 and the current year (the year in which the prediction of the replacement period of the buried piping is executed) stored in storage 20 as first burial period of time $T_1$ (S13). Buried piping attribute data acquisition unit 10 (attribute data generator 14) calculates first burial period of time $T_1$ for each pipeline ID of the buried piping. Buried piping attribute data acquisition unit 10 (attribute data generator 14) identifies the nominal pipe wall thickness for each pipeline ID of the buried piping from the installation (burial) year, the nominal diameter, the type of joint, and the type of the pipe wall thickness (see FIG. 4) included in first data 17 and nominal-pipe-wall-thickness database unit 22 (S76).

Attribute data generator 14 generates attribute data 16 (see FIG. 32) of the buried piping in which the pipeline ID of the buried piping, the first environmental factor, first burial period of time $T_1$, and the nominal pipe wall thickness of the buried piping are caused to correspond to each other (S19). Buried piping attribute data acquisition unit 10 outputs attribute data 16 of the buried piping to buried piping attribute data storage 24. Attribute data 16 of the buried piping is stored in buried piping attribute data storage 24.

With reference to FIG. 55, exceedance-probability-of-corrosion-depth prediction model selection unit 32 selects an exceedance-probability-of-corrosion-depth prediction model for the first environmental factor from the plurality of exceedance-probability-of-corrosion-depth prediction models of this embodiment stored in exceedance-probability-of-corrosion-depth prediction model storage 26 (S77). The step (S77) of this embodiment is same as the step (S77) in Embodiment 4.

With reference to FIG. 55, an exceedance probability of corrosion depth is output for each pipeline ID (S85).

Specifically, as shown in FIG. 57, exceedance-probability-of-corrosion-depth prediction unit 38 reads out the pipeline ID, first burial period of time $T_1$, and the nominal pipe wall thickness of the buried piping from buried piping attribute data storage 24 (S81).

Exceedance-probability-of-corrosion-depth prediction unit 38 calculates an exceedance probability of corrosion depth for each pipeline ID from the exceedance-probability-of-corrosion-depth prediction model for the first environmental factor selected in step (S77) and first burial period of time $T_1$ and the nominal pipe wall thickness of the buried piping (S82). The step (S82) of this embodiment is same as the step (S82) in Embodiment 4. Exceedance-probability-of-corrosion-depth prediction unit 38 may calculate the exceedance probability of corrosion depth in the current year for each pipeline ID, may calculate the exceedance probability of corrosion depth n years later in the future for each pipeline ID, or may calculate both of the exceedance probability of corrosion depth in the current year and the exceedance probability of corrosion depth n years later in the future for each pipeline ID.

With reference to FIG. 55, number-of-water-leakage-accidents calculation unit 123 calculates the number of water leakage accidents (see FIG. 52) in a certain period (for example, the current year, a future year, or a future period of time) for each pipeline ID (S86). Number-of-water-leakage-accidents calculation unit 123 may calculate the number of water leakage accidents in the current year for each pipeline ID, may calculate the number of water leakage accidents n years later (for example, n=30) for each pipeline ID, or may calculate both of the number of water leakage accidents in the current year and the number of water leakage accidents n years later for each pipeline ID, for example.

Specifically, number-of-water-leakage-accidents calculation unit 123 calculates the number-of-water-leakage-accidents evaluation index (see FIG. 51) by calculating a product of the pipeline length included in first data 17 of the buried piping and the exceedance probability of corrosion depth of the buried piping in a certain period (for example, the current year, a future year, or a future period of time) calculated by exceedance-probability-of-corrosion-depth prediction unit 38 for each pipeline ID. The number-of-water-leakage-accidents evaluation index is a product of the pipeline length and the exceedance probability of corrosion depth, and hence is an index proportional to the number of water leakage accidents for each pipeline ID. Number-of-water-leakage-accidents calculation unit 123 calculates the number of water leakage accidents for each pipeline ID by multiplying the number-of-water-leakage-accidents evaluation index by the coefficient described above. Number-of-water-leakage-accidents calculation unit 123 outputs the number of water leakage accidents for each pipeline ID to water leakage accident index storage 124. The number of water leakage accidents for each pipeline ID is stored in water leakage accident index storage 124.

With reference to FIG. 55, probability-of-water-leakage-accidents calculation unit 127 calculates the probability of water leakage accidents (see FIG. 52) in a certain period (for example, the current year, a future year, or a future period of time) for each pipeline ID (S87). Probability-of-water-leakage-accidents calculation unit 127 may calculate the probability of water leakage accidents in the current year for each pipeline ID, may calculate the probability of water leakage accidents n years later (for example, n=30) for each pipeline ID, or may calculate both of the probability of water leakage accidents in the current year and the probability of water leakage accidents n years later for each pipeline ID, for example.

Specifically, probability-of-water-leakage-accidents calculation unit 127 calculates the probability of water leakage accidents by dividing the number of water leakage accidents calculated by number-of-water-leakage-accidents calculation unit 123 by the pipeline length (see FIG. 47) included in first data 17 of the buried piping for each pipeline ID. Probability-of-water-leakage-accidents calculation unit 127 outputs the probability of water leakage accidents for each pipeline ID to water leakage accident index storage 124. The probability of water leakage accidents for each pipeline ID is stored in water leakage accident index storage 124.

With reference to FIG. 55, probability-of-water-leakage-accidents output unit 128 generates and outputs a probability-of-water-leakage-accidents result (S88). Probability-of-water-leakage-accidents output unit 128 outputs the probability-of-water-leakage-accidents result to water leakage accident index storage 124 and at least one of RAM 4, hard disk drive 5, portable storage medium 7*m*, and monitor 8*b* shown in FIG. 1. The probability-of-water-leakage-accidents result is stored in water leakage accident index storage 124. The probability-of-water-leakage-accidents result is a probability-of-water-leakage-accidents table (see FIG. 52) or a probability-of-water-leakage-accidents map 129 (see FIG. 53), for example. Probability-of-water-leakage-accidents output unit 128 may generate a probability-of-water-leakage-accidents table by putting together a pipeline ID and the probability of water leakage accidents corresponding to the pipeline ID on a table. Probability-of-water-leakage-accidents output unit 128 may generate a probability-of-water-leakage-accidents map 129 by displaying the probability of water leakage accidents for each pipeline ID in pipeline map 101 (see FIG. 46) included in first data 17 of the buried piping.

With reference to FIG. 55, total-number-of-water-leakage-accidents calculation unit 131 calculates the total number of water leakage accidents (see FIG. 52) in a certain period (for example, the current year, a future year, or a future period of time) (S90). Total-number-of-water-leakage-accidents calculation unit 131 calculates the total number of water leakage accidents by adding up the number of water leakage accidents in a certain period (for example, the current year, a future year, or a future period of time) for all of the pipeline IDs (all of the pipelines included in attribute data 16 or pipeline map 101 (see FIG. 46)) included in attribute data 16. Total-number-of-water-leakage-accidents calculation unit 131 may calculate the total number of water leakage accidents in the current year, may calculate the total number of water leakage accidents n years later (for example, n=30), or may calculate both of the total number of water leakage accidents in the current year and the total number of water leakage accidents n years later, for example. Total-number-of-water-leakage-accidents calculation unit 131 outputs the total number of water leakage accidents to water leakage accident index storage 124. The total number of water leakage accidents is stored in water leakage accident index storage 124.

With reference to FIG. 55, total-number-of-water-leakage-accidents output unit 132 generates and outputs a total-number-of-water-leakage-accidents result (S91). Total-number-of-water-leakage-accidents output unit 132 outputs the total-number-of-water-leakage-accidents result to water leakage accident index storage 124 and at least one of RAM 4, hard disk drive 5, portable storage medium 7*m*, and monitor 8*b* shown in FIG. 1. The total-number-of-water-leakage-accidents result is stored in water leakage accident index storage 124. The total-number-of-water-leakage-accidents result is a total-number-of-water-leakage-accidents table (see FIG. 52) or a total-number-of-water-leakage-accidents graph 133 (see FIG. 54), for example. Total-number-of-water-leakage-accidents output unit 132 may generate a total-number-of-water-leakage-accidents table indicating a secular change of the total number of water leakage accidents. Total-number-of-water-leakage-accidents output unit 132 may generate total-number-of-water-leakage-accidents graph 133 indicating a secular change of the total number of water leakage accidents.

As shown in FIG. 54, total-number-of-water-leakage-accidents output unit 132 may output a secular change of the total number of water leakage accidents in accordance with an aspect of the replacement of the buried piping in the future. For example, total-number-of-water-leakage-accidents output unit 132 may generate and output total-number-of-water-leakage-accidents graph 133 indicating (s) a temporal change of the total number of water leakage accidents when the pipeline is not replaced at all until a future period n years later, (t) a temporal change of the total number of water leakage accidents when the pipeline is replaced by every certain distance each year until a future period n years later in the order from pipeline of which first burial period of time $T_1$ is the longest, and (u) a temporal change of the total number of water leakage accidents when the pipeline is replaced by every certain distance each year until a future period n years later in the order from pipeline of which probability of water leakage accidents is the highest. The secular change of the total number of water leakage accidents in accordance with the aspect of the replacement of the buried piping in the future as that in total-number-of-water-leakage-accidents graph 133 makes it easy for the customer to establish a replacement plan of the pipeline.

The number of water leakage accidents, the probability of water leakage accidents, and the total number of water leakage accidents are calculated in buried piping replacement period prediction apparatus 1*e* and the buried piping replacement period prediction method of this embodiment, but it is also possible to calculate at least one of the number of water leakage accidents, the probability of water leakage accidents, or the total number of water leakage accidents.

The program of this embodiment causes processor 2 to execute the buried piping replacement period prediction method of this embodiment. The program that causes processor 2 to execute the buried piping replacement period prediction method of this embodiment is recorded on a computer-readable recording medium (for example, a non-transitory computer-readable recording medium) of this embodiment.

In this embodiment, attribute data 16 of the buried piping may include the allowable corrosion depth of the buried piping instead of the nominal pipe wall thickness of the buried piping. Buried piping replacement period prediction apparatus 1*e* may include minimum-pipe-wall-thickness calculation unit 12, allowable corrosion depth calculation unit 13, and tolerance-on-wall-thickness database unit 23. The exceedance probability of corrosion depth and at least one of the number of water leakage accidents, the probability of water leakage accidents, or the total number of water leakage accidents may be calculated by applying first burial period of time $T_1$ and the allowable corrosion depth of the buried piping to the exceedance-probability-of-corrosion-depth prediction model.

Effects of buried piping replacement period prediction apparatus 1*e*, the buried piping replacement period prediction method, the program, and the computer-readable recording medium of this embodiment exhibit the following effects in addition to the effects of buried piping replacement period prediction apparatus 1*d*, the buried piping replacement period prediction method, the program, and the computer-readable recording medium of Embodiment 4.

Buried piping replacement period prediction apparatus 1*e* of this embodiment further includes at least one of number-of-water-leakage-accidents calculation unit 123, probability-of-water-leakage-accidents calculation unit 127, or total-number-of-water-leakage-accidents calculation unit 131. Attribute data 16 further includes the pipeline ID and the pipeline length of the buried piping. Number-of-water-leakage-accidents calculation unit 123 calculates the number of water leakage accidents in a certain period for each pipeline ID from the exceedance probability of corrosion depth of the buried piping identified by the pipeline ID and the pipeline length of the buried piping identified by the pipeline ID. The number of water leakage accidents is the number by which a water leakage accident occurs in the buried piping identified by the pipeline ID for each unit time in a certain period. Probability-of-water-leakage-accidents calculation unit 127 calculates the probability of water leakage accidents in a certain period for each pipeline ID from the exceedance probability of corrosion depth of the buried piping identified by the pipeline ID and the pipeline length of the buried piping identified by the pipeline ID. The probability of water leakage accidents is the number by which a water leakage accident occurs in the buried piping identified by the pipeline ID for each unit time and unit distance in a certain period. Total-number-of-water-leakage-accidents calculation unit 131 calculates the total number of water leakage accidents in a certain period by adding up the number of water leakage accidents in a certain period for all of the pipeline IDs included in attribute data 16.

According to buried piping replacement period prediction apparatus 1*e*, at least one of the number of water leakage accidents, the probability of water leakage accidents, or the total number of water leakage accidents that makes it easy for the customer to establish a replacement plan of the pipeline can be provided to the customer.

The buried piping replacement period prediction method of this embodiment further includes a step of calculating at least one of the number of water leakage accidents, the probability of water leakage accidents, or the total number of water leakage accidents. Attribute data 16 further includes the pipeline ID and the pipeline length of the buried piping. The number of water leakage accidents is the number of occurrences of a water leakage accident in the buried piping for each unit time in a certain period and is calculated for each pipeline ID from the exceedance probability of corrosion depth of the buried piping identified by the pipeline ID and the pipeline length of the buried piping identified by the pipeline ID. The probability of water leakage accidents is the number of occurrences of a water leakage accident in the buried piping identified by the pipeline ID for each unit time and unit distance in a certain period and is calculated from the exceedance probability of corrosion depth of the buried piping identified by the pipeline ID and the pipeline length of the buried piping identified by the pipeline ID. The total number of water leakage accidents is calculated by adding up the number of water leakage accidents in a certain period for all of the pipeline IDs included in attribute data 16.

According to the buried piping replacement period prediction method of this embodiment, at least one of the number of water leakage accidents, the probability of water leakage accidents, or the total number of water leakage accidents that makes it easy for the customer to establish a replacement plan of the pipeline can be provided to the customer.

The program of this embodiment causes processor 2 to execute each step of the buried piping replacement period prediction method of this embodiment. The program of this embodiment is recorded on the computer-readable recording medium of this embodiment. According to the program and the computer-readable recording medium of this embodiment, at least one of the number of water leakage accidents, the probability of water leakage accidents, or the total number of water leakage accidents that makes it easy for the customer to establish a replacement plan of the pipeline can be provided to the customer.

Modified Examples

In Embodiment 1 to Embodiment 3, attribute data 16 of the buried piping may include the nominal pipe wall thickness (see FIG. 6) of the buried piping instead of the allowable corrosion depth of the buried piping.

In Embodiment 1 to Embodiment 4, first data 17 of the buried piping may include pipeline map 101 (see FIG. 46) instead of the burial place (see FIG. 4). In buried piping replacement period prediction apparatuses 1, 1*b*, 1*c*, 1*d* in Embodiment 1 to Embodiment 4, environmental factor map generator 105, geological information map database unit 107, ground-environmental factor correspondence relationship database unit 108, and environmental factor map storage 109 may be included.

Buried piping replacement period prediction apparatuses 1*d*, 1*e* in Embodiment 4 and Embodiment 5 may be communicably connected to client terminal 80 or attribute data generator 70 over communication network 90 as shown in Embodiment 2 or Embodiment 3.

Buried piping replacement period prediction apparatuses 1*d*, 1*e* in Embodiment 4 and Embodiment 5 may include minimum-pipe-wall-thickness calculation unit 12 (see FIG. 2), allowable corrosion depth calculation unit 13 (see FIG. 2), and tolerance-on-wall-thickness database unit 23 (see FIG. 2).

It is to be understood that Embodiments 1 to 5 and modified examples thereof disclosed above are merely examples in all aspects and in no way intended to limit the invention. The scope of the present disclosure is not limited to the description above and is defined by the scope of claims. All modifications made within the scope and spirit equivalent to those of the claims are intended to be included in the invention.

REFERENCE SIGNS LIST

1, 1*b*, 1*c*, 1*d*, 1*e* Buried piping replacement period prediction apparatus, 2, 72, 82 Processor, 3, 73, 83 ROM, 4, 74, 84 RAM, 5, 75 Hard disk drive, 6, 76, 86 Communication unit, 7 Portable storage media drive, 7*m* Portable storage medium, 8*a*, 77, 87 Input unit, 8*b*, 78, 88 Monitor, 9 Bus, 10 Buried piping attribute data acquisition unit, 11 Buried piping data acceptance unit, 12 Minimum-pipe-wall-thickness calculation unit, 13 Allowable corrosion depth calculation unit, 14 Attribute data generator, 16 Attribute data, 17 First data, 18 Reference data, 20, 85 Storage, 21 Environmental factor database unit, 22 Nominal-pipe-wall-thickness database unit, 23 Tolerance-on-wall-thickness database unit, 24 Buried piping attribute data storage, 26 Exceedance-probability-of-corrosion-depth prediction model storage, 28 Corrosion lag time storage, 32 Exceedance-probability-of-corrosion-depth prediction model selection unit, 38 Exceedance-probability-of-corrosion-depth prediction unit, 41, 42, 43, 45 Data table, 53 Exceedance-probability-of-corrosion-depth result, 60, 60*c* Buried piping replacement period prediction system, 65 Storage unit, 70 Attribute data generation unit, 80 Client terminal, 90 Communication network, 101 Pipeline map, 105 Environmental factor map generator, 106 Environmental factor map, 107 Geological information map database unit, 108 Ground-environmental factor correspondence relationship database unit, 109 Environmental factor map storage, 110 Ground-environmental factor correspondence data table, 123 Number-of-water-leakage-accidents calculation unit, 124 Water leakage accident index storage, 127 Probability-of-water-leakage-accidents calculation unit, 128 Probability-of-water-leakage-accidents output unit, 129 Probability-of-water-leakage-accidents map, 131 Total-number-of-water-leakage-accidents calculation unit, 132 Total-number-of-water-leakage-accidents output unit, 133 Total-number-of-water-leakage-accidents graph.

The invention claimed is:

1. A buried piping replacement period prediction apparatus comprising:

a buried piping attribute data acquisition unit that acquires attribute data of buried piping, the attribute data including a first environmental factor of the buried piping, a first burial period of time of the buried piping, and a nominal pipe wall thickness or an allowable corrosion depth of the buried piping; and an exceedance-probability-of-corrosion-depth prediction unit that calculates an exceedance probability of corrosion depth of the buried piping in a certain period from an exceedance-probability-of-corrosion-depth prediction model for the first environmental factor, the first burial period of time, and the nominal pipe wall thickness or the allowable corrosion depth, wherein:

the exceedance probability of corrosion depth of the buried piping in the certain period is a probability of a corrosion depth of the buried piping exceeding the nominal pipe wall thickness or the allowable corrosion depth of the buried piping in the certain period;

reference data of a plurality of pieces of reference piping includes a second environmental factor, a second burial period of time, and a reference corrosion depth of the plurality of pieces of reference piping;

modified reference data of the plurality of pieces of reference piping includes a modified burial period of time and the reference corrosion depth of the plurality of pieces of reference piping, the modified burial period of time is calculated by subtracting a lag time of corrosion depending on the second burial period of time and the reference corrosion depth from the second burial period of time, and the lag time of corrosion is a period of time from when the plurality of pieces of reference piping are buried to when the plurality of pieces of reference piping start corroding;

the exceedance-probability-of-corrosion-depth prediction model is a model that predicts the exceedance probability of corrosion depth of the buried piping and is generated on a basis of a basic regression line that regresses the modified reference data having the second environmental factor that is same as the first environmental factor, a variation in corrosion speed of the plurality of pieces of reference piping, and a distribution of the lag time of corrosion;

the variation in the corrosion speed is given by a distribution of the basic regression line due to a variation in the reference corrosion depth in the modified reference data; and the distribution of the lag time of corrosion is given by a differential of a change in a rate of number of data of which reference corrosion depth is more than 0 mm out of the reference data having the second environmental factor that is same as the first environmental factor with respect to the second burial period of time, wherein the buried piping is replaced based on the calculated exceedance probability of corrosion depth of the buried piping.

2. The buried piping replacement period prediction apparatus according to claim 1, further comprising at least one of a number-of-water-leakage-accidents calculation unit, a probability-of-water-leakage-accidents calculation unit, or a total-number-of-water-leakage-accidents calculation unit, wherein:

the attribute data further includes a pipeline ID and a pipeline length of the buried piping;

the number-of-water-leakage-accidents calculation unit calculates number of water leakage accidents in the certain period for each pipeline ID from an exceedance probability of corrosion depth of the buried piping identified by the pipeline ID and the pipeline length of the buried piping identified by the pipeline ID, and the number of water leakage accidents is number of occurrences of a water leakage accident in the buried piping identified by the pipeline ID for each unit time in the certain period;

the probability-of-water-leakage-accidents calculation unit calculates a probability of water leakage accidents in the certain period for each pipeline ID from the exceedance probability of corrosion depth of the buried piping identified by the pipeline ID and the pipeline length of the buried piping identified by the pipeline ID, and the probability of water leakage accidents is number of occurrences of the water leakage accident in the buried piping identified by the pipeline ID for each unit time and unit distance in the certain period; and the total-number-of-water-leakage-accidents calculation unit calculates a total number of water leakage accidents in the certain period by adding up the number of water leakage accidents in the certain period for all of the pipeline IDs included in the attribute data.

3. The buried piping replacement period prediction apparatus according to claim 1, further comprising an exceedance-probability-of-corrosion-depth prediction model selection unit that selects the exceedance-probability-of-corrosion-depth prediction model for the first environmental factor from a plurality of exceedance-probability-of-corrosion-depth prediction models generated for the each second environmental factor of the plurality of pieces of reference piping.

4. A buried piping replacement period prediction method, comprising:

a step of acquiring attribute data of buried piping by a buried piping attribute data acquisition unit, the attribute data including a first environmental factor of the buried piping, a first burial period of time of the buried piping, and a nominal pipe wall thickness or an allowable corrosion depth of the buried piping; and a step of calculating an exceedance probability of corrosion depth of the buried piping in a certain period from an exceedance-probability-of-corrosion-depth prediction model for the first environmental factor, the first burial period of time, and the nominal pipe wall thickness or the allowable corrosion depth, wherein:

the exceedance probability of corrosion depth of the buried piping in the certain period is a probability of a corrosion depth of the buried piping exceeding the nominal pipe wall thickness or the allowable corrosion depth of the buried piping in the certain period;

reference data of a plurality of pieces of reference piping includes a second environmental factor, a second burial period of time, and a reference corrosion depth of the plurality of pieces of reference piping;

modified reference data of the plurality of pieces of reference piping includes a modified burial period of time and the reference corrosion depth of the plurality of pieces of reference piping, the modified burial period of time is calculated by subtracting a lag time of corrosion depending on the second burial period of time and the reference corrosion depth from the second burial period of time, and the lag time of corrosion is a period of time from when the plurality of pieces of reference piping are buried to when the plurality of pieces of reference piping start corroding;

the exceedance-probability-of-corrosion-depth prediction model is a model that predicts the exceedance probability of corrosion depth of the buried piping and is generated on a basis of a basic regression line that regresses the modified reference data having the second environmental factor that is same as the first environmental factor, a variation in corrosion speed of the plurality of pieces of reference piping, and a distribution of the lag time of corrosion;

the variation in the corrosion speed is given by a distribution of the basic regression line due to a variation in the reference corrosion depth in the modified reference data; and the distribution of the lag time of corrosion is given by a differential of a change in a rate of number of data of which reference corrosion depth is more than 0 mm out of the reference data having the second environmental factor that is same as the first environmental factor with respect to the second burial period of time, wherein the buried piping is replaced based on the calculated exceedance probability of corrosion depth of the buried piping.

5. The buried piping replacement period prediction method according to claim 4, further comprising a step of calculating at least one of number of water leakage accidents, a probability of water leakage accidents, or a total number of water leakage accidents, wherein:

the attribute data further includes a pipeline ID and a pipeline length of the buried piping;

the number of water leakage accidents is number of occurrences of a water leakage accident in the buried piping identified by the pipeline ID for each unit time in the certain period and is calculated for the each pipeline ID from an exceedance probability of corrosion depth of the buried piping identified by the pipeline ID and the pipeline length of the buried piping identified by the pipeline ID;

the probability of water leakage accidents is number of occurrences of a water leakage accident in the buried piping identified by the pipeline ID for each unit time and unit distance in the certain period and is calculated for the each pipeline ID from the exceedance probability of corrosion depth of the buried piping identified by the pipeline ID and the pipeline length of the buried piping identified by the pipeline ID; and the total number of water leakage accidents is calculated by adding up the number of water leakage accidents in the certain period for all of the pipeline IDs included in the attribute data.

6. The buried piping replacement period prediction method according to claim 4, further comprising a step of selecting the exceedance-probability-of-corrosion-depth prediction model for the first environmental factor from a plurality of exceedance-probability-of-corrosion-depth prediction models generated for the each second environmental factor of the plurality of pieces of reference piping by an exceedance-probability-of-corrosion-depth prediction model selection unit.

7. A non-transitory computer-readable recording medium having instructions recorded thereon, that when executed on a processor, perform the steps of the buried piping replacement period prediction method according to claim 4.

8. A non-transitory computer-readable recording medium having instructions recorded thereon, that when executed on a processor, perform the steps of the buried piping replacement period prediction method according to claim 5.

9. A non-transitory computer-readable recording medium having instructions recorded thereon, that when executed on a processor, perform the steps of the buried piping replacement period prediction method according to claim 6.

* * * * *